(12) United States Patent
Boodhoo et al.

(10) Patent No.: US 10,200,298 B2
(45) Date of Patent: Feb. 5, 2019

(54) ARRAY GENERATION IN A RESOURCE MANAGEMENT SYSTEM

(71) Applicant: Knowlio, Inc., Austin, TX (US)

(72) Inventors: Jean-Paul Sylvain Boodhoo, Cypress County (CA); Will McGarrett Harper, Austin, TX (US)

(73) Assignee: Knowlio, Inc., Austin, TX (US)

( * ) Notice: Subject to any disclaimer, the term of this patent is extended or adjusted under 35 U.S.C. 154(b) by 169 days.

(21) Appl. No.: 15/334,241

(22) Filed: Oct. 25, 2016

(65) Prior Publication Data

US 2017/0118134 A1    Apr. 27, 2017

Related U.S. Application Data

(60) Provisional application No. 62/246,522, filed on Oct. 26, 2015, provisional application No. 62/321,706, filed on Apr. 12, 2016, provisional application No. 62/340,940, filed on May 24, 2016, provisional application No. 62/393,594, filed on Sep. 12, 2016.

(51) Int. Cl.
*H04L 12/911* (2013.01)
*H04L 29/08* (2006.01)
*G06F 17/30* (2006.01)
*G06F 9/451* (2018.01)

(52) U.S. Cl.
CPC .............. *H04L 47/70* (2013.01); *G06F 9/451* (2018.02); *G06F 17/30899* (2013.01); *H04L 67/24* (2013.01); *H04L 67/02* (2013.01); *H04L 67/10* (2013.01); *H04L 67/2838* (2013.01)

(58) Field of Classification Search
CPC ...................................................... H04L 67/02
See application file for complete search history.

(56) References Cited

U.S. PATENT DOCUMENTS

| | | | |
|---|---|---|---|
| 5,715,445 | A | 2/1998 | Wolfe |
| 5,802,292 | A | 9/1998 | Mogul |
| 5,809,247 | A | 9/1998 | Richardson et al. |
| 5,946,682 | A | 8/1999 | Wolfe |
| 6,006,252 | A | 12/1999 | Wolfe |
| 6,151,603 | A | 11/2000 | Wolfe |
| 6,297,819 | B1 | 10/2001 | Furst |
| 6,516,340 | B2 | 2/2003 | Boys |
| 6,572,662 | B2 | 6/2003 | Manohar et al. |
| 6,792,430 | B1 | 9/2004 | Kenyon et al. |

(Continued)

FOREIGN PATENT DOCUMENTS

DE    10332492 B4    2/2005

OTHER PUBLICATIONS

PCT International Search Report and Written Opinion, PCT Application No. PCT/US16/58720, dated Jan. 19, 2017, 14 pages.

(Continued)

*Primary Examiner* — Jimmy H Tran
(74) *Attorney, Agent, or Firm* — Fenwick & West LLP

(57) ABSTRACT

A process controls presentation of digital resources. Different resources or viewing components associated with viewing areas may be assigned different visual designators that affect how the digital resources are processed and presented. A user interface enables automatic generation of an array of resources that causes resources to be displayed in a particular predefined way based on their visual designators.

20 Claims, 59 Drawing Sheets

(56) References Cited

U.S. PATENT DOCUMENTS

| | | | |
|---|---|---|---|
| 6,934,737 B1* | 8/2005 | Tang | G06F 9/45512 709/204 |
| 7,165,070 B2 | 1/2007 | Page et al. | |
| 7,209,928 B2 | 4/2007 | Kenyon | |
| 7,302,638 B1 | 11/2007 | Wolfe | |
| 7,346,848 B1 | 3/2008 | Ruthfield et al. | |
| 7,389,241 B1 | 6/2008 | Bascom | |
| 7,627,826 B2 | 12/2009 | Pry | |
| 7,996,494 B2 | 8/2011 | Allamaraju et al. | |
| 8,078,972 B2* | 12/2011 | Sullivan | H04L 41/22 715/734 |
| 8,510,682 B2 | 8/2013 | Kusterer et al. | |
| 8,635,021 B2* | 1/2014 | Heng | G01C 21/00 340/995.27 |
| 8,661,361 B2 | 2/2014 | Morris | |
| 8,780,130 B2 | 7/2014 | Morris | |
| 8,856,675 B1 | 10/2014 | Agarawala et al. | |
| 8,966,373 B2 | 2/2015 | Wan | |
| 9,279,685 B1* | 3/2016 | Heng | G01C 21/00 |
| 9,727,301 B2* | 8/2017 | Sweet | G06F 3/1454 |
| 9,846,535 B2* | 12/2017 | Paine | G06F 9/451 |
| 2002/0054114 A1* | 5/2002 | Shuping | G06F 3/0481 715/764 |
| 2003/0071849 A1* | 4/2003 | Ferri | G06F 3/0483 715/777 |
| 2004/0049541 A1* | 3/2004 | Swahn | G06F 17/30905 709/203 |
| 2004/0066411 A1* | 4/2004 | Fung | G06F 3/0481 715/781 |
| 2005/0202385 A1 | 9/2005 | Coward et al. | |
| 2006/0085741 A1* | 4/2006 | Weiner | G06F 17/30893 715/246 |
| 2006/0112130 A1 | 5/2006 | Lowson | |
| 2007/0136313 A1* | 6/2007 | Dutta | G09G 5/14 |
| 2008/0005752 A1 | 1/2008 | Morris | |
| 2009/0006981 A1* | 1/2009 | Pagan | G06F 9/4443 715/752 |
| 2009/0044142 A1 | 2/2009 | Faris et al. | |
| 2009/0125819 A1* | 5/2009 | Hamilton, II | A63F 13/10 715/757 |
| 2009/0204900 A1 | 8/2009 | Champion et al. | |
| 2010/0079392 A1 | 4/2010 | Chiang et al. | |
| 2010/0138767 A1* | 6/2010 | Wang | G06F 3/0481 715/769 |
| 2012/0030664 A1 | 2/2012 | Demant et al. | |
| 2012/0042251 A1* | 2/2012 | Rodriguez | G11B 27/034 715/723 |
| 2013/0173291 A1* | 7/2013 | Kelly | G06Q 50/24 705/3 |
| 2013/0297206 A1* | 11/2013 | Heng | G01C 21/3682 701/532 |
| 2013/0305184 A1 | 11/2013 | Kim et al. | |
| 2014/0317556 A1* | 10/2014 | Ellenich | G06F 3/0485 715/784 |
| 2014/0325400 A1* | 10/2014 | Zhao | G06F 3/0482 715/760 |
| 2015/0006535 A1 | 1/2015 | Hayden | |
| 2015/0026548 A1 | 1/2015 | Morris | |
| 2015/0067605 A1* | 3/2015 | Zambetti | G06F 3/0485 715/830 |
| 2015/0186245 A1* | 7/2015 | Hoen, IV | H04L 43/04 714/45 |
| 2015/0256652 A1* | 9/2015 | Santoro | G06F 3/0481 709/203 |
| 2016/0147400 A1* | 5/2016 | Patten | G06F 3/0484 715/753 |
| 2016/0357388 A1* | 12/2016 | Paine | G06F 9/451 |
| 2016/0378272 A1* | 12/2016 | Whitlark | G06F 3/0481 715/750 |

OTHER PUBLICATIONS

PCT International Search Report and Written Opinion, PCT Application No. PCT/US17/27066, dated Jun. 29, 2017, 20 pages.

* cited by examiner

FIG. 3

1064 Array Managment Complex (AMC) XY

Data
1066 Pane Layout 1,2 and associated 1068a PCPs
1070, 1072 Visual Designators X, Y
1074 Tab Data Set
1026 Resource Data Set

Handlers
1076 General Tab and Browser Window Event
1078 Array Tab tracking
1080 Array Generation Message (AGM)
1082 Event X AMH

Other functions and logic
1084 Resource - Pane VD "matching"
1086 Browser Window sizing and positioning

FIG. 4

1065 Array Managment Complex (AMC) XY

Data
1067 Pane Layout 1,2 and associated 1069a PCPs
1070, 1072 Visual Designators X, Y
1075 Rendered View Data Set
1026 Resource Data Set

Handlers
1077 General Rendered View, Tab, and Browser Window Event
1079 Array Rendered View tracking
1081 Array Generation Message (AGM)
1083 Event X AMH

Other functions and logic
1085 Resource - Pane VD "matching"
1087 Rendered View sizing and positioning

FIG. 5

| 1090 Visual Designator Data |
| --- |
| Visual Designators |
| 1070 Visual Designator X |
| 1072 Visual Designator Y |

FIG. 6

| 1068a Pane Configuration Parameters (PCP)s and 1066 Pane Layout 1,2 | | |
|---|---|---|
| | 1092 Pane 1 (x1,y1) | 1094 Pane 2 (x2,y1) |
| Position | | |
| Size | | |
| Height | (y1,y2) | (y1,y2) |
| Width | (x1,x2) | (x2, x3) |
| Visual Designator | 1070 VD X | 1072 VD Y |

FIG. 7

| 1069a Pane Configuration Parameters (PCP)s and 1067 Pane Layout 1,2 | | |
|---|---|---|
| | 1093 Pane 1 (x1,y1) | 1095 Pane 2 (x2,y1) |
| Position | | |
| Size | | |
| Height | (y1,y2) | (y1,y2) |
| Width | (x1,x2) | (x2, x3) |
| Visual Designator | 1070 VD X | 1072 VD Y |

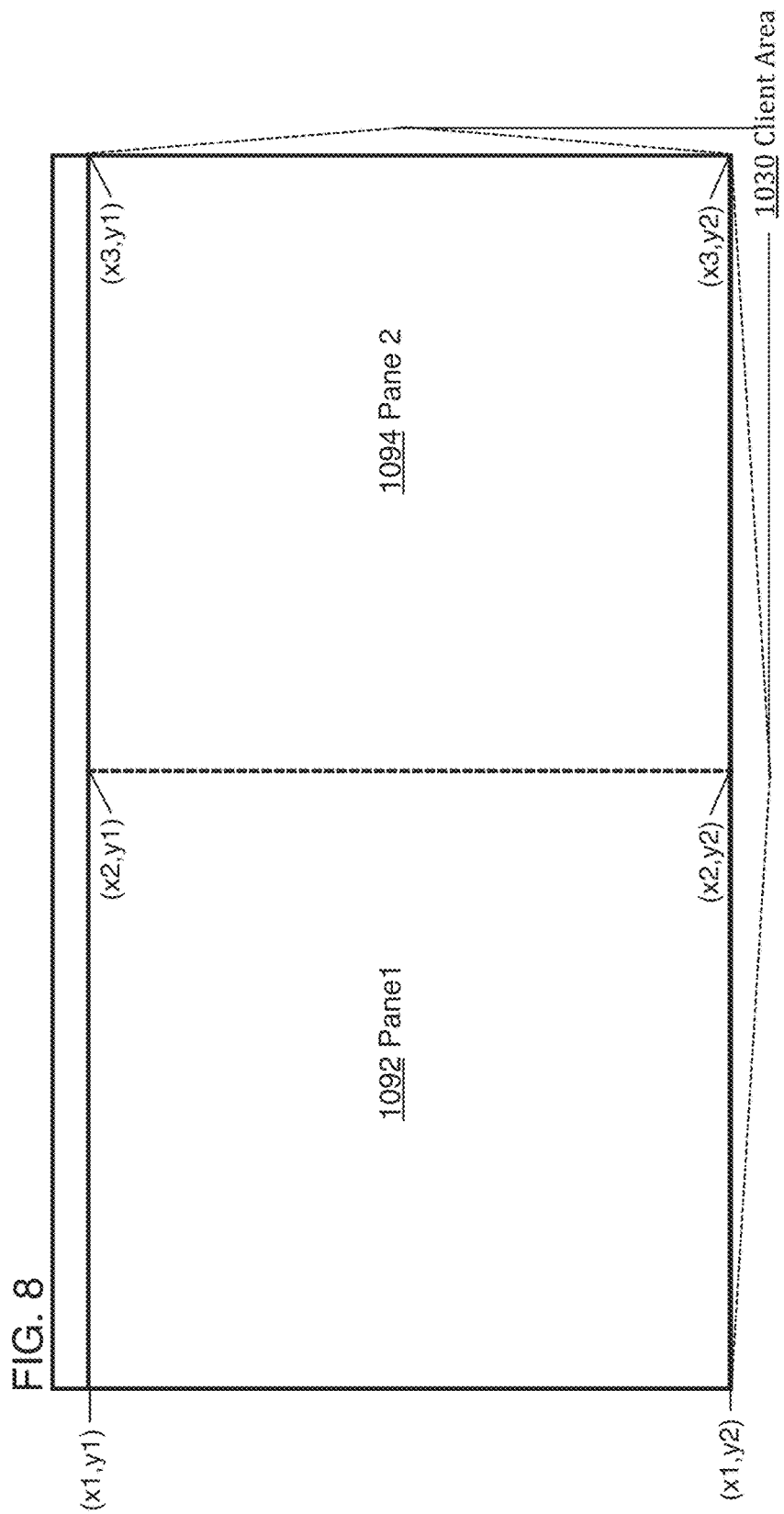

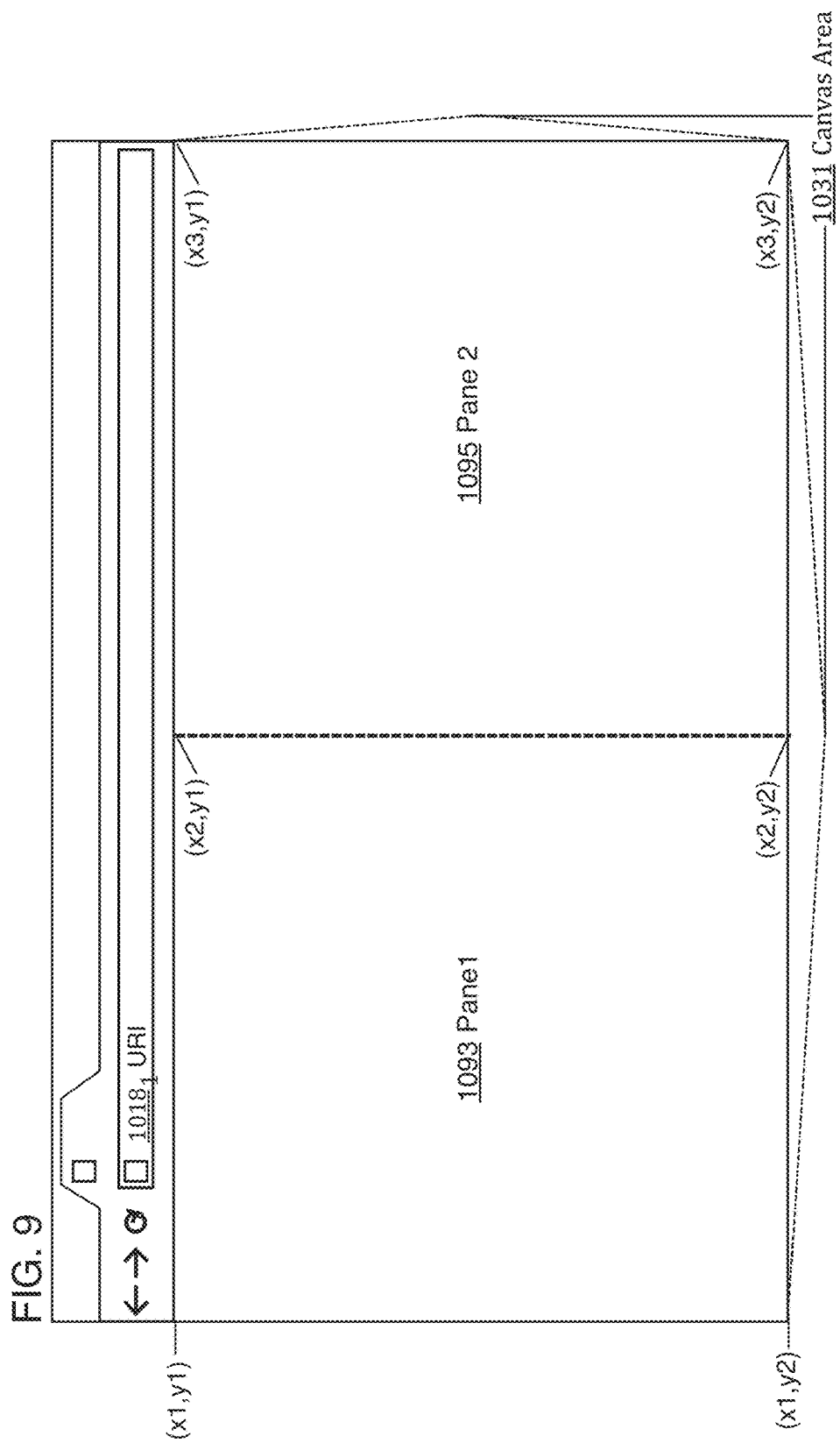

FIG. 10

1088 Resource ID Data Set

| Resource 1 | Resource 2 | Resource 3 | Resource 4 |
|---|---|---|---|
| Resource ID 1 | Resource ID 2 | Resource ID 3 | Resource ID 4 |
| URI 1 | URI 3 | URI 5 | URI 6 |
| URI 2 | URI 4 | | |
| Group 2 | Group 2 | Group 1 | Group 1 |
| --- | --- | Tag 1A | Tag 1A |
| Resource 8 | VD Y | VD X | VD X |
| VD Z | | | |

| Resource 5 | Resource 6 | Resource 7 | Resource 8 |
|---|---|---|---|
| Resource ID 5 | Resource ID 6 | Resource ID 7 | Resource ID 8 |
| URI 7 | URI 8 | URI 9 | URI 11 |
| | | URI 10 | |
| Group 1 | Group 1 | Group 3 | Group 2 |
| --- | --- | Tag 2C | --- |
| Resource 3 | Resource 4 | VD X | Resource 2 |
| VD Y | VD Y | | VD X |

FIG. 12

1074a Tab Data Set

| Tab "1" | Tab "2" | Tab "3" | Tab "4" | Tab "5" | Tab "6" |
|---|---|---|---|---|---|
| Tab ID 1 | Tab ID 2 | Tab ID 3 | Tab ID 4 | Tab ID 5 | Tab ID 6 |
| Window ID 1 | Window ID 2 | Window ID 1 | Window ID 1 | Window ID 1 | Window ID 1 |
| Resource ID 1 | Resource ID 2 | google.com | Resource ID 4 | Resource ID 12 | yahoo.com |
| VD Z | VD Y | None | VD X | VD Y | None |
| Related Tab ID 2 | Related Tab ID 1 | None | None | Related Tab ID 8 | None |
| Related Tab ID 9 | Related Tab ID 9 | None | None | None | None |
| AMC ID ZYX | AMC ID ZYX | TNAT | None | AMC ID XY | None |

| Tab "7" | Tab "8" | Tab "9" | Tab "10" | Tab "11" | Tab "12" |
|---|---|---|---|---|---|
| Tab ID 7 | Tab ID 8 | Tab ID 9 | Tab ID 10 | Tab ID 11 | Tab ID 12 |
| Window ID 1 | Window ID 1 | Window ID 2 | Window ID 2 | Window ID 2 | Window ID 3 |
| URI 33 | Resource ID 20 | Resource ID 8 | Resource ID 8 | Resource ID 21 | Resource ID 7 |
| None | VD X | VD X | VD X | VD Y | VD Z |
| None | Related Tab ID 5 | Related Tab ID 1 | None | Related Tab ID 13 | None |
| None | None | Related Tab ID 2 | None | None | None |
| None | AMC ID XY | AMC ID ZYX | TNAT ZYX | AMC ID YX | None |

| Tab "13" | Tab "14" | Tab "15" | Tab "16" |
|---|---|---|---|
| Tab ID 13 | Tab ID 14 | Tab ID 15 | Tab ID 16 |
| Window ID 4 | Window ID 5 | Window ID 6 | Window ID 3 |
| Resource ID 20 | URI 41 | google.com | Resource ID 6 |
| VD X | None | None | VD Y |
| Related Tab ID 11 | None | None | None |
| None | None | None | None |
| AMC ID YX | None | TNAT | None |

FIG. 13

1074a Tab Data Set

| | | | |
|---|---|---|---|
| Tab "1" | Tab "2" | Tab "3" | Tab "4" |
| Tab ID 1 | Tab ID 2 | Tab ID 3 | Tab ID 4 |
| Window ID 1 | Window ID 2 | Window ID 1 | Window ID 1 |
| Resource ID 1 | Resource ID 2 | Resource ID 3 | Resource ID 4 |
| VD Z | VD Y | VD X | VD X |
| Related Tab ID 2 | Related Tab ID 1 | None | None |
| Related Tab ID 9 | Related Tab ID 9 | None | None |
| AMC ID ZYX | AMC ID ZYX | None | None |
| | | | |
| Tab "5" | Tab "6" | | |
| Tab ID 5 | Tab ID 6 | | |
| Window ID 1 | Window ID 1 | | |
| Resource ID 12 | yahoo.com | | |
| VD Y | None | | |
| Related Tab ID 8 | None | | |
| None | None | | |
| AMC ID XY | None | | |
| | | | |
| Tab "7" | Tab "8" | Tab "9" | Tab "10" |
| Tab ID 7 | Tab ID 8 | Tab ID 9 | Tab ID 10 |
| Window ID 1 | Window ID 1 | Window ID 2 | Window ID 2 |
| URI 33 | Resource ID 20 | Resource ID 8 | Resource ID 8 |
| None | VD X | VD X | VD X |
| None | Related Tab ID 5 | Related Tab ID 1 | None |
| None | None | Related Tab ID 2 | None |
| None | AMC ID XY | AMC ID ZYX | TNAT ZYX |
| | | | |
| Tab "11" | Tab "12" | | |
| Tab ID 11 | Tab ID 12 | | |
| Window ID 2 | Window ID 3 | | |
| Resource ID 21 | Resource ID 7 | | |
| VD Y | VD Z | | |
| Related Tab ID 13 | None | | |
| None | None | | |
| AMC ID YX | None | | |
| | | | |
| Tab "13" | Tab "14" | Tab "15" | Tab "16" |
| Tab ID 13 | Tab ID 14 | Tab ID 15 | Tab ID 16 |
| Window ID 4 | Window ID 5 | Window ID 6 | Window ID 3 |
| Resource ID 20 | URI 41 | google.com | Resource ID 6 |
| VD X | None | None | VD Y |
| Related Tab ID 11 | None | None | None |
| None | None | None | None |
| AMC ID YX | None | TNAT | None |

FIG. 14

1074a Tab Data Set

Tab "1"
Tab ID 1
Window ID 1
Resource ID 1
VD Z
Related Tab ID 2
Related Tab ID 9
AMC ID ZYX

Tab "2"
Tab ID 2
Window ID 2
Resource ID 2
VD Y
Related Tab ID 1
Related Tab ID 9
AMC ID ZYX

Tab "3"
Tab ID 3
Window ID 1
Resource ID 3
VD X
Related Tab ID 15
None
AMC ID XY

Tab "4"
Tab ID 4
Window ID 1
Resource ID 4
VD X
None
None
None

Tab "5"
Tab ID 5
Window ID 1
Resource ID 12
VD Y
Related Tab ID 8
None
AMC ID XY

Tab "6"
Tab ID 6
Window ID 1
google.com
None
None
None
None

Tab "7"
Tab ID 7
Window ID 1
URI 33
None
None
None
None

Tab "8"
Tab ID 8
Window ID 1
Resource ID 20
VD X
Related Tab ID 5
None
AMC ID XY

Tab "9"
Tab ID 9
Window ID 2
Resource ID 8
VD X
Related Tab ID 1
Related Tab ID 2
AMC ID ZYX

Tab "10"
Tab ID 10
Window ID 2
Resource ID 8
VD X
None
None
TNAT ZYX

Tab "11"
Tab ID 11
Window ID 2
Resource ID 21
VD Y
Related Tab ID 13
None
AMC ID YX

Tab "12"
Tab ID 12
Window ID 3
Resource ID 7
VD Z
None
None
None

Tab "13"
Tab ID 13
Window ID 4
Resource ID 20
VD X
Related Tab ID 11
None
AMC ID YX

Tab "14"
Tab ID 14
Window ID 5
URI 41
None
None
None
None

Tab "15"
Tab ID 15
Window ID 6
Resource ID 5
VD Y
Related Tab ID 3
None
AMC ID XY

Tab "16"
Tab ID 16
Window ID 3
Resource ID 6
VD Y
None
None
None

FIG. 15

1074a Tab Data Set

| Tab "1" | Tab "2" | Tab "3" | Tab "4" | Tab "5" | Tab "6" |
|---|---|---|---|---|---|
| Tab ID 1 | Tab ID 2 | Tab ID 3 | Tab ID 4 | Tab ID 5 | Tab ID 6 |
| Window ID 1 | Window ID 2 | Window ID 1 | Window ID 1 | Window ID 1 | Window ID 1 |
| Resource ID 1 | Resource ID 2 | Resource ID 4 | Resource ID 4 | Resource ID 12 | google.com |
| VD Z | VD Y | VD X | VD X | VD Y | None |
| Related Tab ID 2 | Related Tab ID 1 | Related Tab ID 15 | None | Related Tab ID 8 | None |
| Related Tab ID 9 | Related Tab ID 9 | None | None | None | None |
| AMC ID ZYX | AMC ID XY | AMC ID XY | TNAT XY | AMC ID XY | None |

| Tab "7" | Tab "8" | Tab "9" | Tab "10" | Tab "11" | Tab "12" |
|---|---|---|---|---|---|
| Tab ID 7 | Tab ID 8 | Tab ID 9 | Tab ID 10 | Tab ID 11 | Tab ID 12 |
| Window ID 1 | Window ID 1 | Window ID 2 | Window ID 2 | Window ID 2 | Window ID 3 |
| URI 33 | Resource ID 20 | Resource ID 8 | Resource ID 8 | Resource ID 21 | Resource ID 7 |
| None | VD X | VD X | VD X | VD Y | VD Z |
| None | Related Tab ID 5 | Related Tab ID 1 | None | Related Tab ID 13 | None |
| None | None | Related Tab ID 2 | None | None | None |
| None | AMC ID XY | AMC ID ZYX | TNAT ZYX | AMC ID YX | None |

| Tab "13" | Tab "14" | Tab "15" | Tab "16" |
|---|---|---|---|
| Tab ID 13 | Tab ID 14 | Tab ID 15 | Tab ID 16 |
| Window ID 4 | Window ID 5 | Window ID 6 | Window ID 3 |
| Resource ID 20 | URI 41 | Resource ID 6 | Resource ID 6 |
| VD X | None | VD Y | VD Y |
| Related Tab ID 11 | None | Related Tab ID 3 | None |
| None | None | None | None |
| AMC ID YX | None | AMC ID XY | TNAT XY |

FIG. 16

1074a Tab Data Set

| Tab "1" | Tab "2" | Tab "3" | Tab "4" | Tab "5" | Tab "6" |
|---|---|---|---|---|---|
| Tab ID 1 | Tab ID 2 | Tab ID 3 | Tab ID 4 | Tab ID 5 | Tab ID 6 |
| Window ID 1 | Window ID 2 | Window ID 1 | Window ID 1 | Window ID 1 | Window ID 1 |
| Resource ID 1 | Resource ID 2 | Resource ID 4 | Resource ID 4 | Resource ID 12 | google.com |
| VD Z | VD Y | VD X | VD X | VD Y | None |
| Related Tab ID 2 | Related Tab ID 1 | Related Tab ID 16 | None | Related Tab ID 8 | None |
| Related Tab ID 9 | Related Tab ID 9 | None | None | None | None |
| AMC ID ZYX | AMC ID ZYX | AMC ID XY | TNAT XY | AMC ID XY | None |

| Tab "7" | Tab "8" | Tab "9" | Tab "10" | Tab "11" | Tab "12" |
|---|---|---|---|---|---|
| Tab ID 7 | Tab ID 8 | Tab ID 9 | Tab ID 10 | Tab ID 11 | Tab ID 12 |
| Window ID 1 | Window ID 1 | Window ID 2 | Window ID 2 | Window ID 2 | Window ID 3 |
| URI 33 | Resource ID 20 | Resource ID 8 | Resource ID 8 | Resource ID 21 | Resource ID 7 |
| None | VD X | VD X | VD X | VD Y | VD Z |
| None | Related Tab ID 5 | Related Tab ID 1 | None | Related Tab ID 13 | None |
| None | None | Related Tab ID 2 | None | None | None |
| None | AMC ID XY | AMC ID ZYX | TNAT ZYX | AMC ID YX | None |

| Tab "13" | Tab "14" | | Tab "16" | | |
|---|---|---|---|---|---|
| Tab ID 13 | Tab ID 14 | | Tab ID 16 | | |
| Window ID 4 | Window ID 5 | | Window ID 3 | | |
| Resource ID 20 | URI 41 | | Resource ID 6 | | |
| VD X | None | | VD Y | | |
| Related Tab ID 11 | None | | Related Tab ID 3 | | |
| None | None | | None | | |
| AMC ID YX | None | | AMC ID XY | | |

FIG. 17

1075a Rendered View Data Set

| RV "1" | RV "2" | RV "3" | RV "4" | RV "5" | RV "6" |
|---|---|---|---|---|---|
| RV ID 1 | RV ID 2 | RV ID 3 | RV ID 4 | RV ID 5 | RV ID 6 |
| Tab ID 1 | Tab ID 1 | Tab ID 3 | Tab ID 4 | Tab ID 5 | Tab ID 6 |
| Window ID 1 | Window ID 1 | Window ID 1 | Window ID 1 | Window ID 1 | Window ID 1 |
| Resource ID 1 | Resource ID 2 | google.com | Resource ID 4 | Resource ID 12 | yahoo.com |
| VD Z | VD Y | None | VD X | VD Y | None |
| Related RV ID 2 | Related RV 1 | None | None | Related RV ID 8 | None |
| Related RV ID 9 | Related RV 9 | None | None | None | None |
| AMC ID ZYX | AMC ID ZYX | TNARV | None | AMC ID XY | None |

| RV "7" | RV "8" | RV "9" | RV "10" | RV "11" | RV "12" |
|---|---|---|---|---|---|
| RV ID 7 | RV ID 8 | RV ID 9 | RV ID 10 | RV ID 11 | RV ID 12 |
| Tab ID 7 | Tab ID 5 | Tab ID 9 | Tab ID 10 | Tab ID 11 | Tab ID 12 |
| Window ID 1 | Window ID 1 | Window ID 2 | Window ID 3 | Window ID 4 | Window ID 3 |
| URI 33 | Resource ID 20 | Resource ID 8 | Resource ID 8 | Resource ID 21 | Resource ID 7 |
| None | VD X | VD X | VD X | VD Y | VD Z |
| None | Related RV 5 | Related RV ID 1 | None | Related RV ID 13 | None |
| None | None | Related RV ID 2 | None | None | None |
| None | AMC ID XY | AMC ID ZYX | TNARV ZYX | AMC ID YX | None |

| RV "13" | RV "14" | RV "15" | RV "16" | | |
|---|---|---|---|---|---|
| RV ID 13 | RV ID 14 | RV ID 15 | RV ID 16 | | |
| Tab ID 11 | Tab ID 14 | Tab ID 3 | Tab ID 16 | | |
| Window ID 4 | Window ID 5 | Window ID 1 | Window ID 3 | | |
| Resource ID 20 | URI 41 | bing.com | Resource ID 6 | | |
| VD X | None | None | VD Y | | |
| Related RV ID 11 | None | None | None | | |
| None | None | None | None | | |
| AMC ID YX | None | TNARV | None | | |

FIG. 18

1075a Rendered View Data Set

RV "1"
RV ID 1
Tab ID 1
Window ID 1
Resource ID 1
VD Z
Related RV ID 2
Related RV ID 9
AMC ID ZYX

RV "2"
RV ID 2
Tab ID 1
Window ID 1
Resource ID 2
VD Y
Related RV 1
Related RV 9
AMC ID ZYX

RV "3"
RV ID 3
Tab ID 3
Window ID 1
Resource ID 3
None
None
None
None

RV "4"
RV ID 4
Tab ID 4
Window ID 1
Resource ID 4
VD X
None
None
None

RV "5"
RV ID 5
Tab ID 5
Window ID 1
Resource ID 12
VD Y
Related RV ID 8
None
AMC ID XY

RV "6"
RV ID 6
Tab ID 6
Window ID 1
yahoo.com
None
None
None
None

RV "7"
RV ID 7
Tab ID 7
Window ID 1
URI 33
None
None
None
None

RV "8"
RV ID 8
Tab ID 5
Window ID 1
Resource ID 20
VD X
Related RV 5
None
AMC ID XY

RV "9"
RV ID 9
Tab ID 9
Window ID 2
Resource ID 8
VD X
Related RV ID 1
Related RV ID 2
AMC ID ZYX

RV "10"
RV ID 10
Tab ID 10
Window ID 3
Resource ID 8
VD X
None
None
TNARV ZYX

RV "11"
RV ID 11
Tab ID 11
Window ID 4
Resource ID 21
VD Y
Related RV ID 13
None
AMC ID YX

RV "12"
RV ID 12
Tab ID 12
Window ID 3
Resource ID 7
VD Z
None
None
None

RV "13"
RV ID 13
Tab ID 11
Window ID 4
Resource ID 20
VD X
Related RV ID 11
None
AMC ID YX

RV "14"
RV ID 14
Tab ID 14
Window ID 5
URI 41
None
None
None

RV "15"
RV ID 15
Tab ID 3
Window ID 1
bing.com
None
None
None
TNARV

RV "16"
RV ID 16
Tab ID 16
Window ID 3
Resource ID 6
VD Y
None
None
None

FIG. 19

1075a Rendered View Data Set

| RV "1" | RV "2" | RV "3" | RV "4" | RV "5" | RV "6" |
|---|---|---|---|---|---|
| RV ID 1 | RV ID 2 | RV ID 3 | RV ID 4 | RV ID 5 | RV ID 6 |
| Tab ID 1 | Tab ID 1 | Tab ID 3 | Tab ID 4 | Tab ID 5 | Tab ID 6 |
| Window ID 1 | Window ID 1 | Window ID 1 | Window ID 1 | Window ID 1 | Window ID 1 |
| Resource ID 1 | Resource ID 2 | Resource ID 3 | Resource ID 4 | Resource ID 12 | yahoo.com |
| VD Z | VD Y | VD X | VD X | VD Y | None |
| Related RV ID 2 | Related RV 1 | Related RV ID 15 | None | Related RV ID 8 | None |
| Related RV ID 9 | Related RV 9 | None | None | None | None |
| AMC ID ZYX | AMC ID ZYX | AMC ID XY | None | AMC ID XY | None |

| RV "7" | RV "8" | RV "9" | RV "10" | RV "11" | RV "12" |
|---|---|---|---|---|---|
| RV ID 7 | RV ID 8 | RV ID 9 | RV ID 10 | RV ID 11 | RV ID 12 |
| Tab ID 7 | Tab ID 5 | Tab ID 9 | Tab ID 10 | Tab ID 11 | Tab ID 12 |
| Window ID 1 | Window ID 1 | Window ID 2 | Window ID 3 | Window ID 4 | Window ID 3 |
| URI 33 | Resource ID 20 | Resource ID 8 | Resource ID 8 | Resource ID 21 | Resource ID 7 |
| None | VD X | VD X | VD X | VD Y | VD Z |
| None | Related RV 5 | Related RV ID 1 | None | Related RV ID 13 | None |
| None | None | Related RV ID 2 | None | None | None |
| None | AMC ID XY | AMC ID ZYX | TNARV ZYX | AMC ID YX | None |

| RV "13" | RV "14" | RV "15" | RV "16" | | |
|---|---|---|---|---|---|
| RV ID 13 | RV ID 14 | RV ID 15 | RV ID 16 | | |
| Tab ID 11 | Tab ID 14 | Tab ID 3 | Tab ID 16 | | |
| Window ID 4 | Window ID 5 | Window ID 1 | Window ID 3 | | |
| Resource ID 20 | URI 41 | Resource ID 5 | Resource ID 6 | | |
| VD X | None | VD Y | VD Y | | |
| Related RV ID 11 | None | Related RV ID 3 | None | | |
| None | None | None | None | | |
| AMC ID YX | None | AMC ID XY | None | | |

FIG. 20

1075a Rendered View Data Set

RV "1"
RV ID 1
Tab ID 1
Window ID 1
Resource ID 1
VD Z
Related RV ID 2
Related RV ID 9
AMC ID ZYX

RV "2"
RV ID 2
Tab ID 1
Window ID 1
Resource ID 2
VD Y
Related RV 1
Related RV 9
AMC ID ZYX

RV "3"
RV ID 3
Tab ID 3
Window ID 1
Resource ID 4
VD X
Related RV ID 15
None
AMC ID XY

RV "4"
RV ID 4
Tab ID 4
Window ID 1
Resource ID 4
VD X
None
None
TNARV XY

RV "5"
RV ID 5
Tab ID 5
Window ID 1
Resource ID 12
VD Y
Related RV ID 8
None
AMC ID XY

RV "6"
RV ID 6
Tab ID 6
Window ID 1
yahoo.com
None
None
None

RV "7"
RV ID 7
Tab ID 7
Window ID 1
URI 33
None
None
None

RV "8"
RV ID 8
Tab ID 5
Window ID 1
Resource ID 20
VD X
Related RV 5
None
AMC ID XY

RV "9"
RV ID 9
Tab ID 9
Window ID 2
Resource ID 8
VD X
Related RV ID 1
Related RV ID 2
AMC ID ZYX

RV "10"
RV ID 10
Tab ID 10
Window ID 3
Resource ID 8
VD X
None
None
TNARV ZYX

RV "11"
RV ID 11
Tab ID 11
Window ID 4
Resource ID 21
VD Y
Related RV ID 13
None
AMC ID YX

RV "12"
RV ID 12
Tab ID 12
Window ID 3
Resource ID 7
VD Z
None
None
None

RV "13"
RV ID 13
Tab ID 11
Window ID 4
Resource ID 20
VD X
Related RV ID 11
None
AMC ID YX

RV "14"
RV ID 14
Tab ID 14
Window ID 5
URI 41
None
None
None

RV "15"
RV ID 15
Tab ID 3
Window ID 1
Resource ID 6
VD Y
Related RV ID 3
None
AMC ID XY

RV "16"
RV ID 16
Tab ID 16
Window ID 3
Resource ID 6
VD Y
None
None
TNARV XY

FIG. 21

1075a Rendered View Data Set

| RV "1" | RV "2" | RV "3" | RV "4" | RV "5" | RV "6" |
|---|---|---|---|---|---|
| RV ID 1 | RV ID 2 | RV ID 3 | RV ID 4 | RV ID 5 | RV ID 6 |
| Tab ID 1 | Tab ID 1 | Tab ID 3 | Tab ID 4 | Tab ID 5 | Tab ID 6 |
| Window ID 1 | Window ID 1 | Window ID 1 | Window ID 1 | Window ID 1 | Window ID 1 |
| Resource ID 1 | Resource ID 2 | Resource ID 4 | Resource ID 4 | Resource ID 12 | yahoo.com |
| VD Z | VD Y | VD X | VD X | VD Y | None |
| Related RV ID 2 | Related RV 1 | Related RV ID 16 | None | Related RV ID 8 | None |
| Related RV ID 9 | Related RV 9 | None | None | None | None |
| AMC ID ZYX | AMC ID ZYX | AMC ID XY | TNARV XY | AMC ID XY | None |

| RV "7" | RV "8" | RV "9" | RV "10" | RV "11" | RV "12" |
|---|---|---|---|---|---|
| RV ID 7 | RV ID 8 | RV ID 9 | RV ID 10 | RV ID 11 | RV ID 12 |
| Tab ID 7 | Tab ID 5 | Tab ID 9 | Tab ID 10 | Tab ID 11 | Tab ID 12 |
| Window ID 1 | Window ID 1 | Window ID 2 | Window ID 3 | Window ID 4 | Window ID 3 |
| URI 33 | Resource ID 20 | Resource ID 8 | Resource ID 8 | Resource ID 21 | Resource ID 7 |
| None | VD X | VD X | VD X | VD Y | VD Z |
| None | Related RV 5 | Related RV ID 1 | None | Related RV ID 13 | None |
| None | None | Related RV ID 2 | None | None | None |
| None | AMC ID XY | AMC ID ZYX | TNARV ZYX | AMC ID YX | None |

| RV "13" | RV "14" | | RV "16" | | |
|---|---|---|---|---|---|
| RV ID 13 | RV ID 14 | | RV ID 16 | | |
| Tab ID 11 | Tab ID 14 | | Tab ID 16 | | |
| Window ID 4 | Window ID 5 | | Window ID 3 | | |
| Resource ID 20 | URI 41 | | Resource ID 6 | | |
| VD X | None | | VD Y | | |
| Related RV ID 11 | None | | Related RV ID 3 | | |
| None | None | | None | | |
| AMC ID YX | None | | AMC ID XY | | |

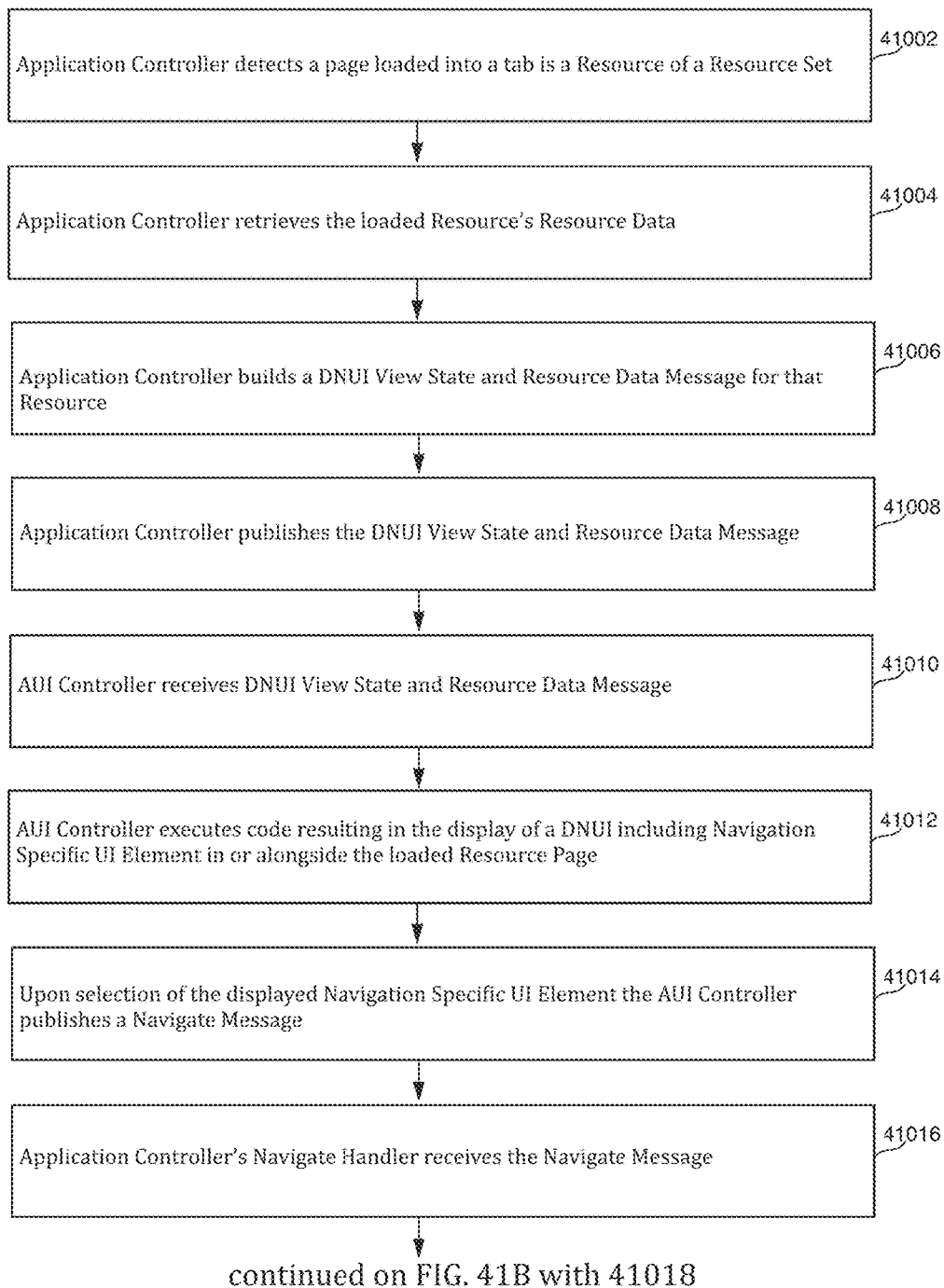

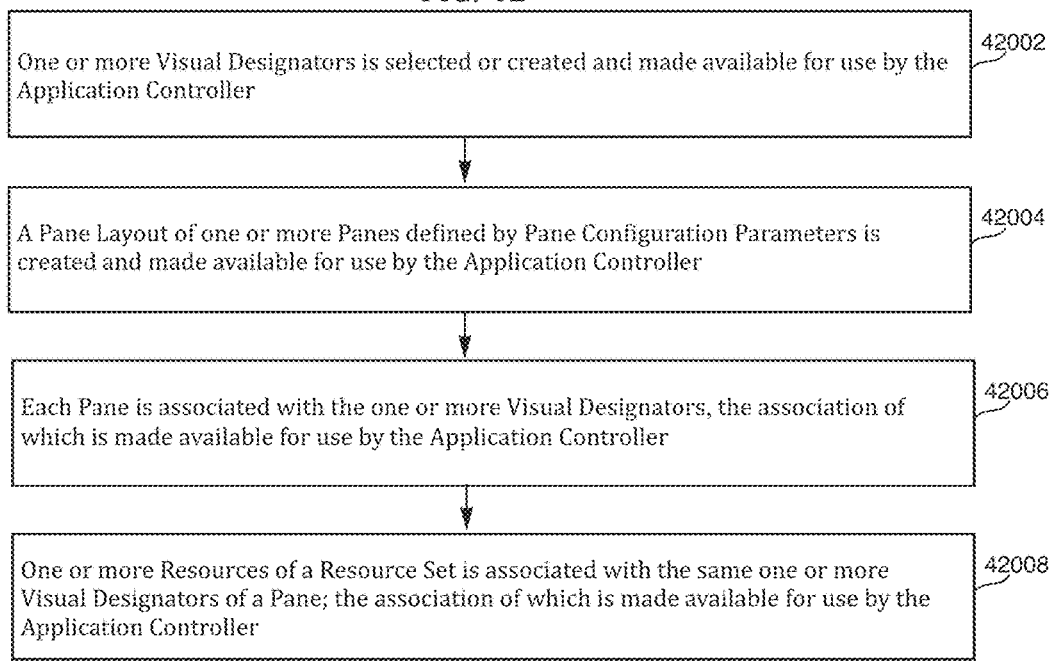

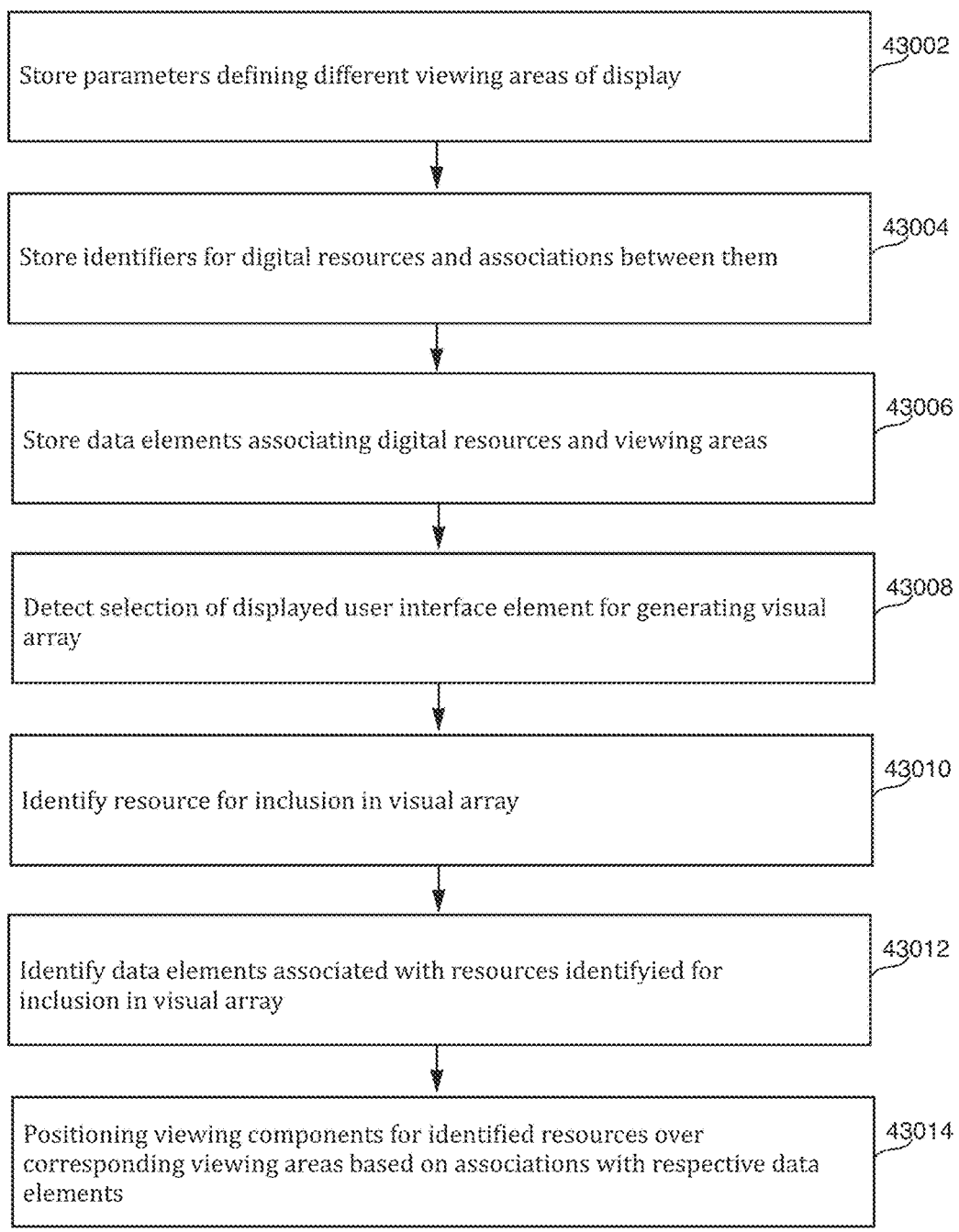

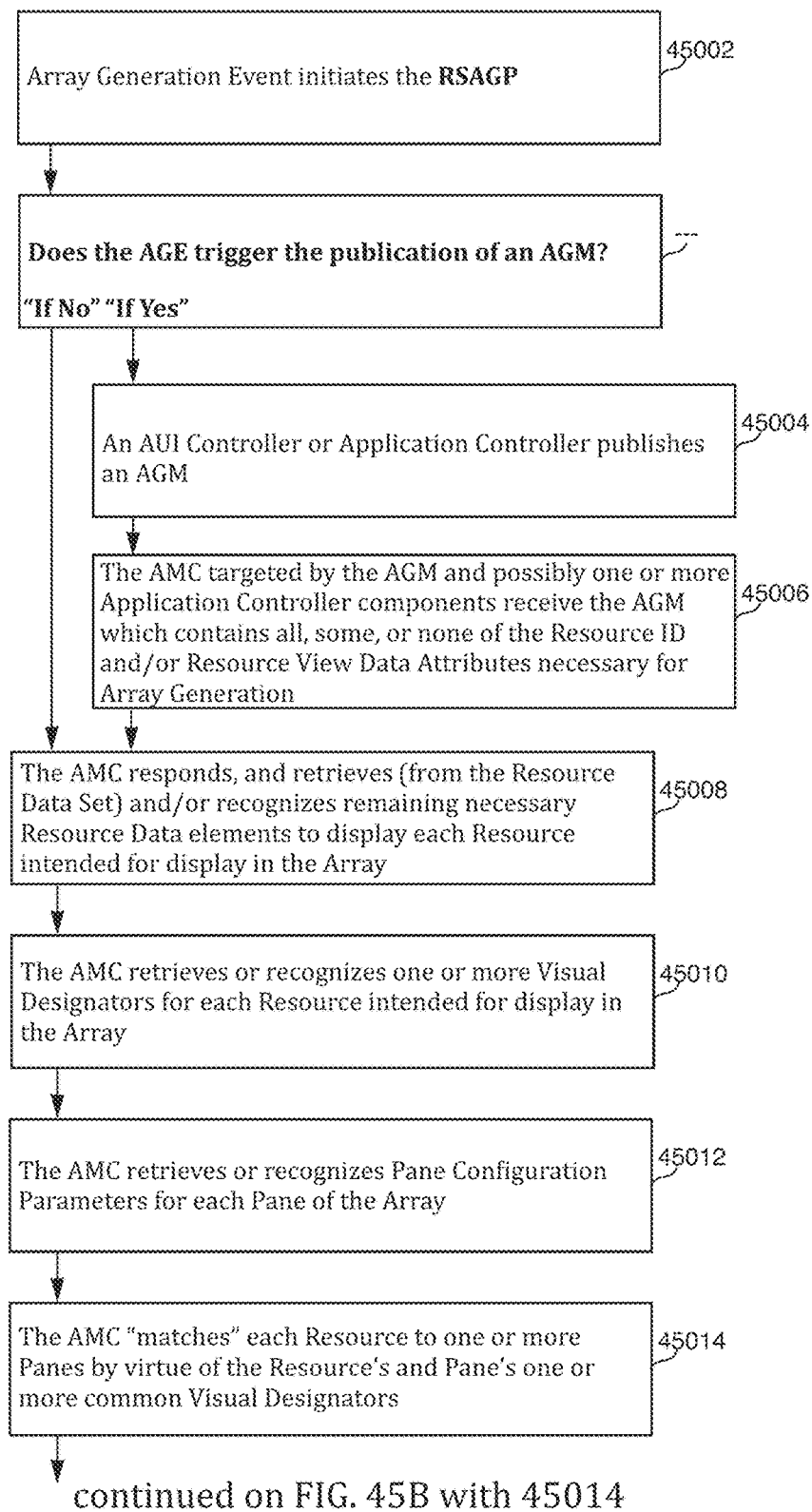

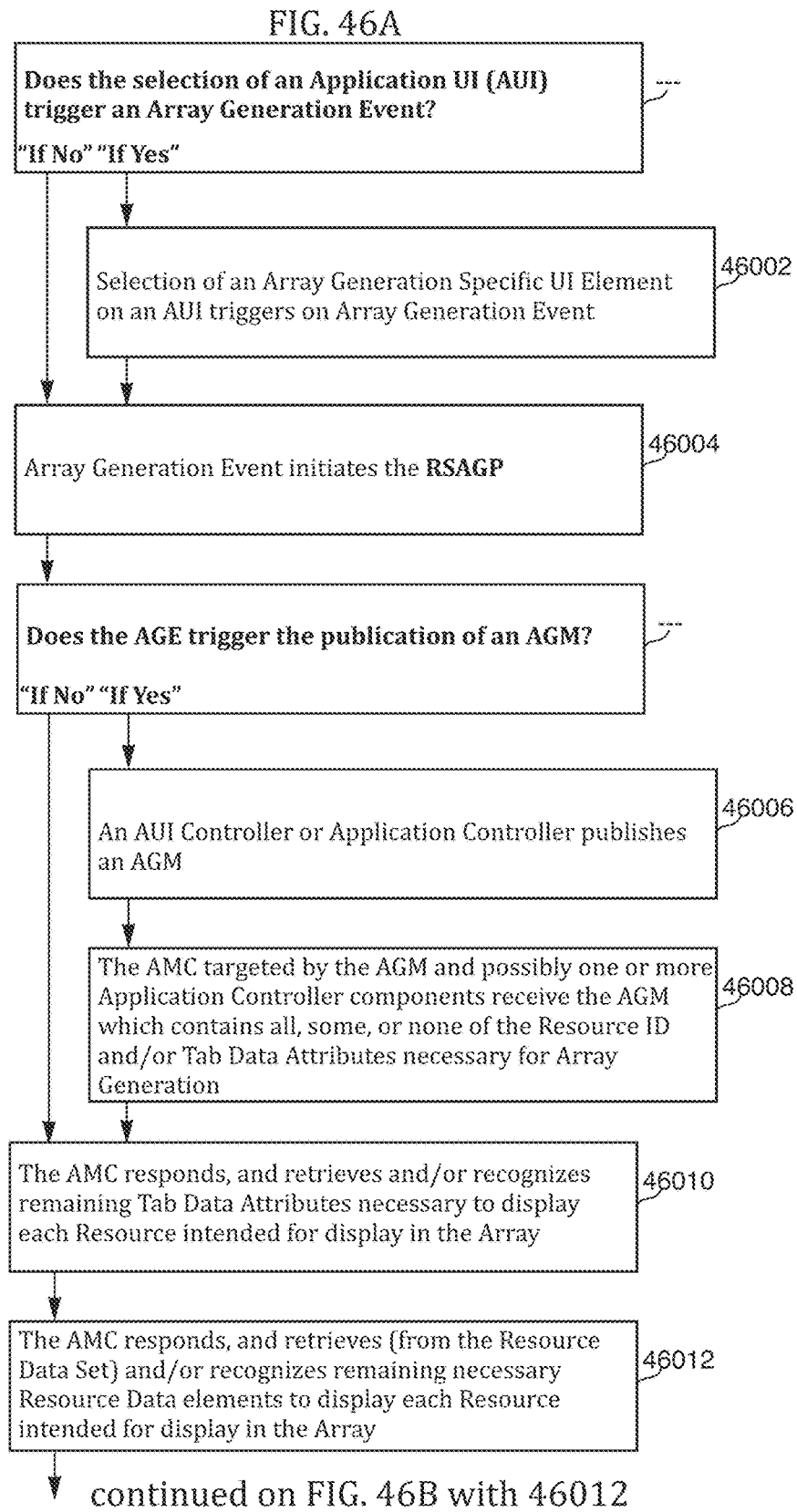

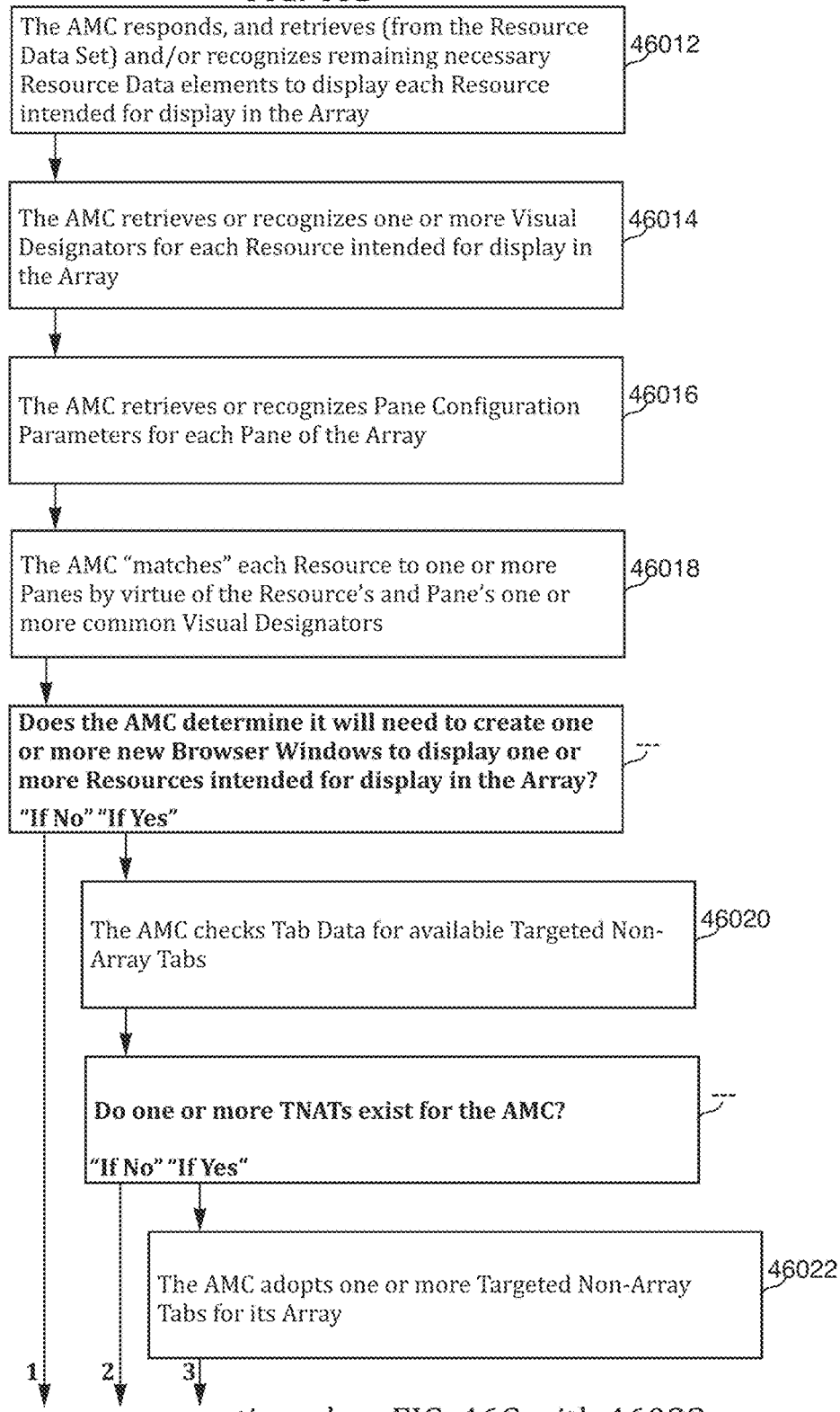

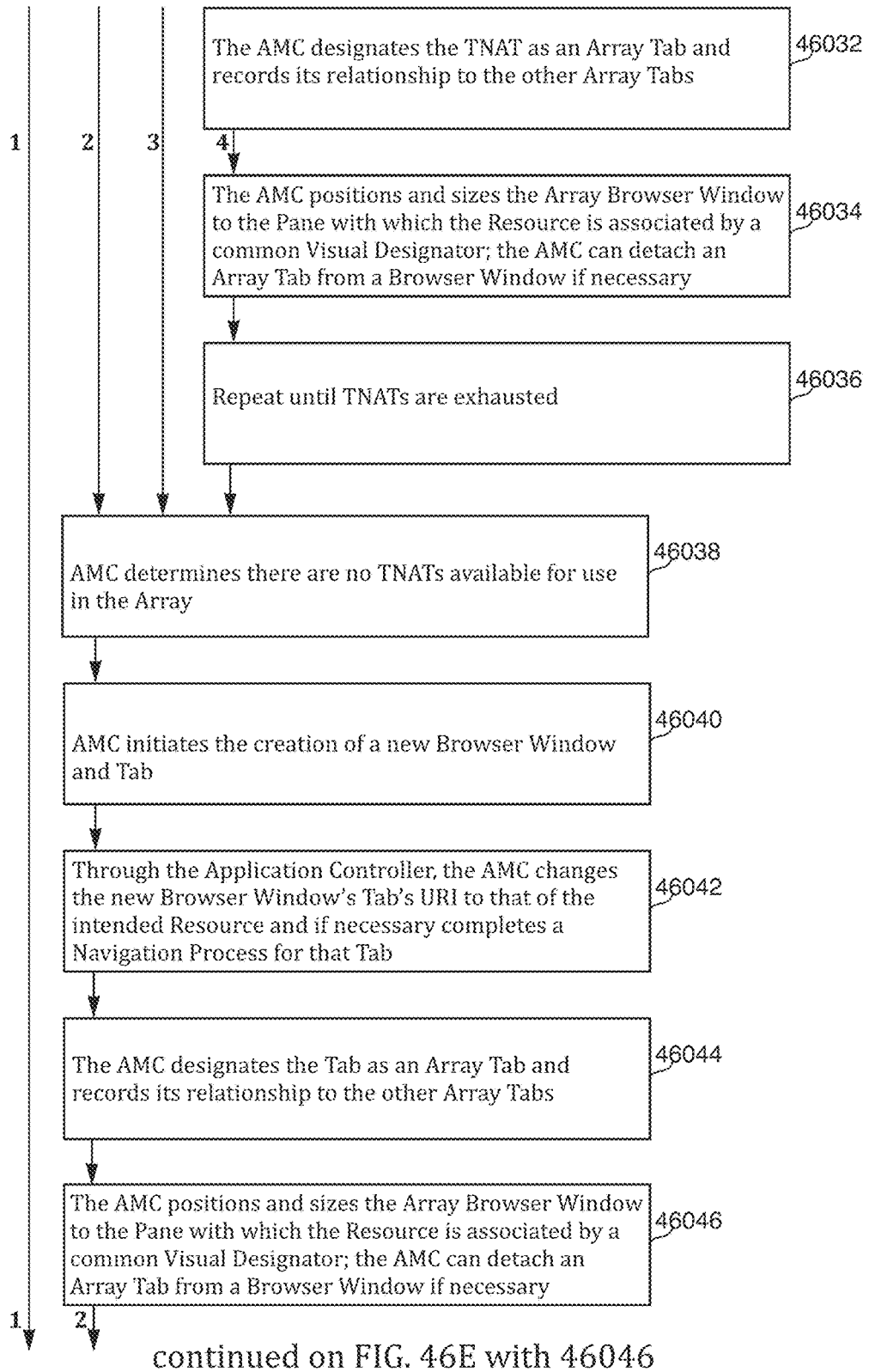
FIG. 46D
continued on FIG. 46E with 46046

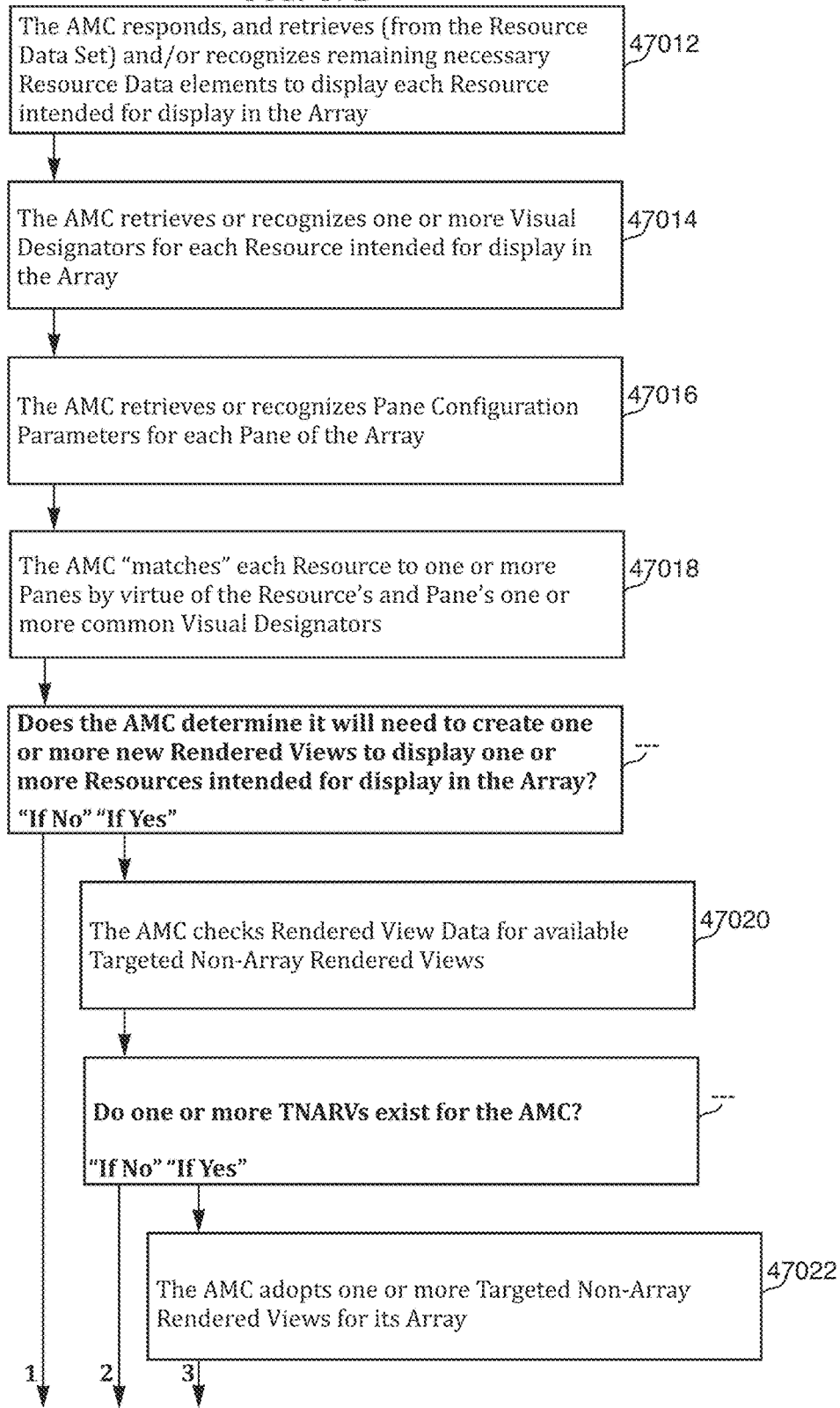

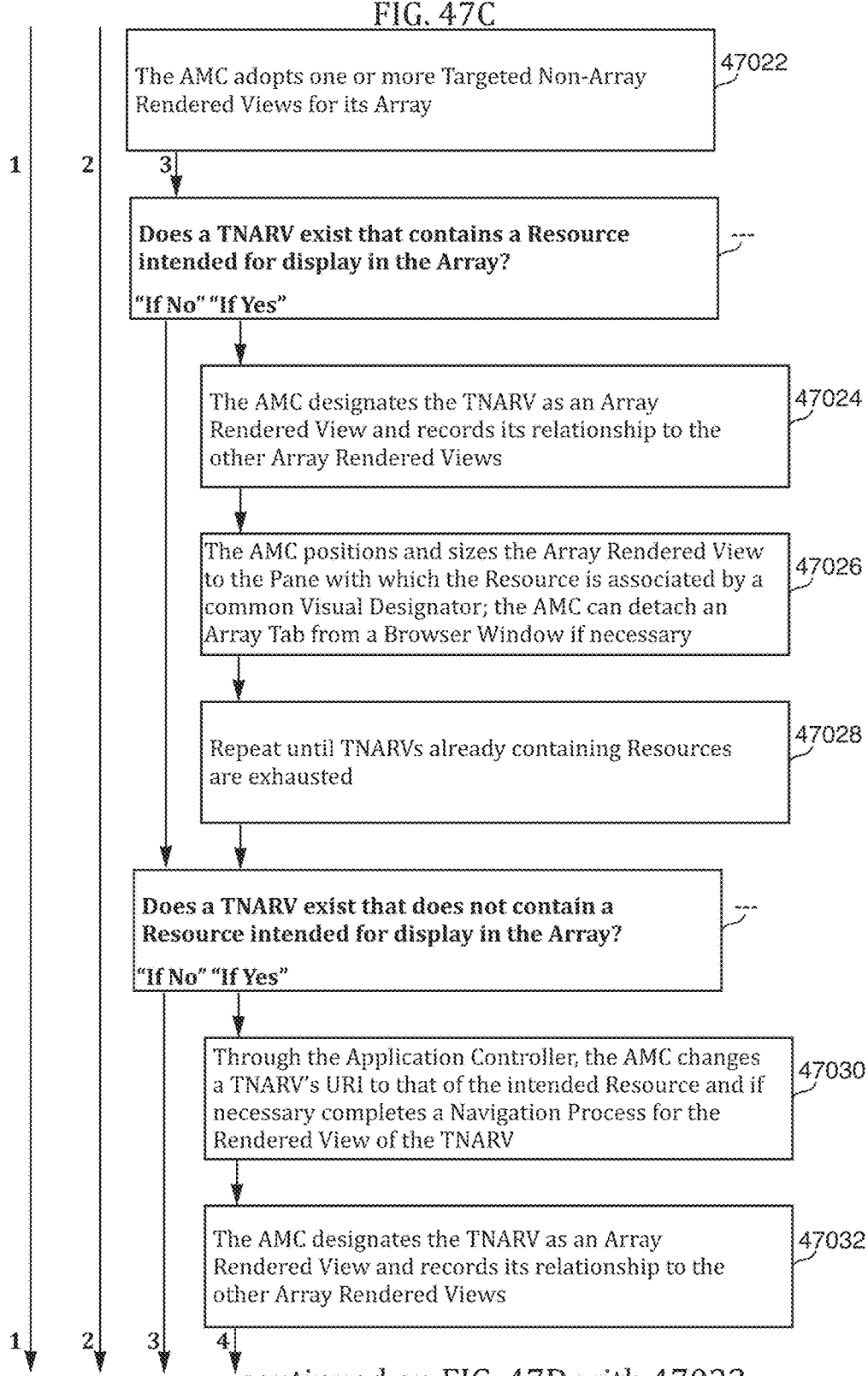
FIG. 47C
continued on FIG. 47D with 47032

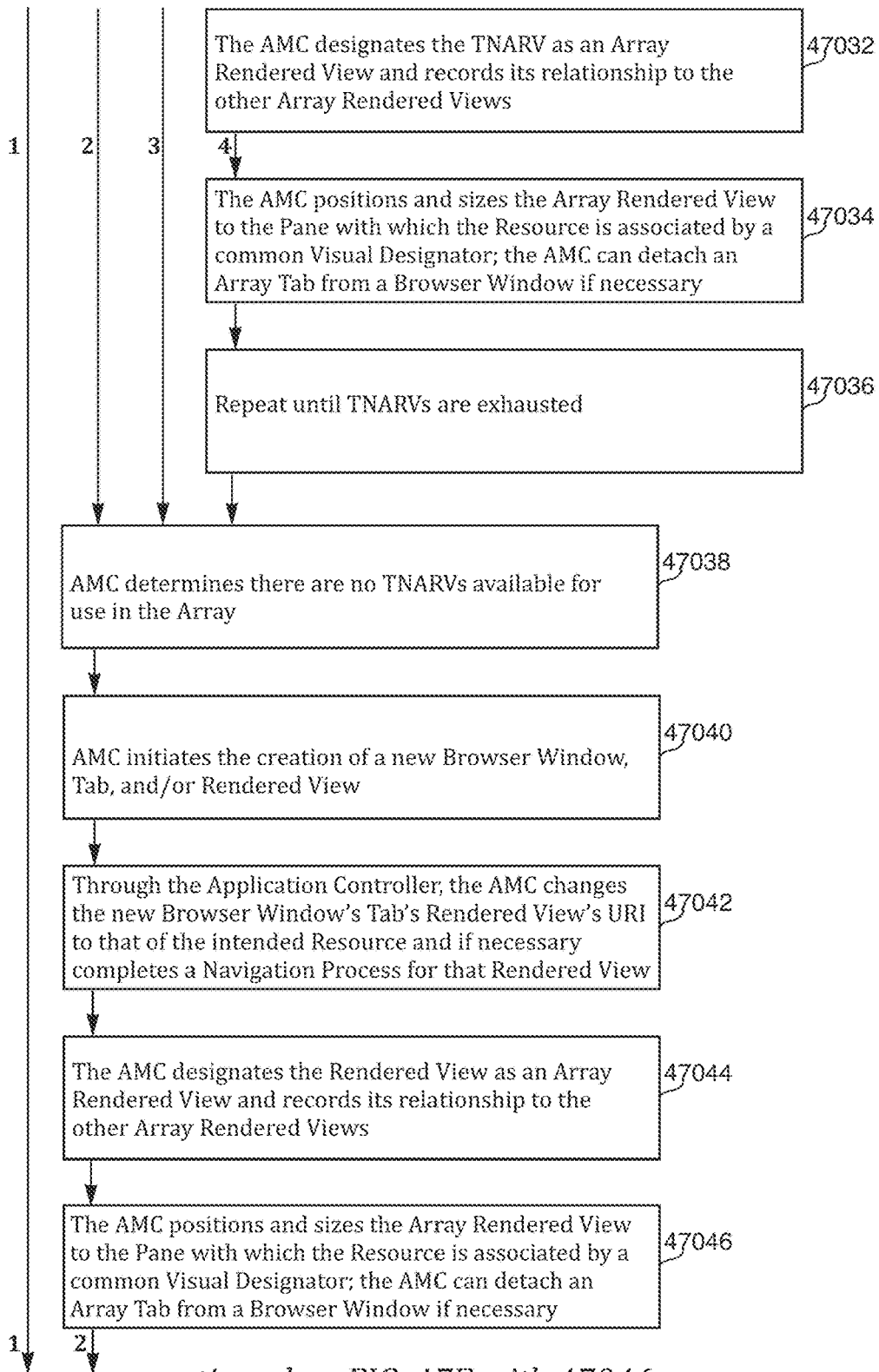
FIG. 47D
continued on FIG. 47E with 47046

ARRAY GENERATION IN A RESOURCE MANAGEMENT SYSTEM

RELATED APPLICATIONS

This application claims the benefit of U.S. Provisional Application No. 62/246,522 entitled "Digital Resource Management System," filed on Oct. 26, 2015, U.S. Provisional Application No. 62/321,706 entitled "Digital Resource Management System," filed on Apr. 12, 2016, U.S. Provisional Application No. 62/340,940 entitled "Digital Resource Management System," filed on May 24, 2016, and U.S. Provisional Application No. 62/393,594 entitled "Digital Resource Management System," filed on Sep. 12, 2016, the contents of which are each incorporated by reference herein.

BACKGROUND

Technical Field

The present disclosure relates to generally to digital resource management and more specifically to controlling navigation and presentation of digital resources in a computing system.

Description of Related Art

There are billions of digital information resources available on computing devices, including those on computer networks such as the World Wide Web. A digital information resource can be hosted independently of other digital information resources on a computer network by being stored at a unique location defined by a unique Uniform Resource Identifier (URI). Each of these independently hosted digital information resources may provide unique and valuable content and/or functions.

Frequently, users may want to group and display one or more digital information resources as a defined, cohesive, and, at times, explicitly sequential hosted resource set. A user can present these digital information resource sets either to an external audience or to him/herself; the latter act often constituting study or review.

SUMMARY

In an embodiment, a method generates a visual array of digital resources. A memory of the client device stores first parameters defining a first viewing area of a display and second parameters defining a second viewing area of a display. The memory stores identifiers for each of a first ordered set of digital resources and each of a second ordered set of digital resources. Furthermore, the memory stores a first data element associating each of the first ordered set of digital resources with the first viewing area. The memory also stores a second data element associating each of the second ordered set of digital resources with the second viewing area. A processor of the client device causes the display to display a user interface element for generating the visual array. The processor detects a selection of the user interface element. Responsive to the selection of the user interface element, the processor identifies for inclusion in the visual array, at least a first digital resource from the first ordered set of digital resources and a second digital resource from the second ordered set of digital resources. The processor also identifies the first data element corresponding to the first digital resource and determines that the first data element associates the first digital resource with the first viewing area. Responsive to determining that the first data element associates the first digital resource with the first viewing area, the processor causes a first digital resource viewing component displaying the first digital resource to be positioned over the first viewing area of the display. The processor identifies the second data element corresponding to the second digital resource and determines that the second data element associates the second digital resource with the second viewing area. Responsive to determining that the second data element associates the second digital resource with the second viewing area, the processor causes a second digital resource viewing component displaying the second digital resource to be positioned over the second viewing area of the display.

In another embodiment, a method generates a visual array of digital resources. A memory of the client device stores first parameters defining a first viewing area of a display and second parameters defining a second viewing area of a display. The memory furthermore stores identifiers for a first digital resource viewing component and a second digital resource viewing component. The memory also stores a first data element associating the first digital resource viewing component with the first viewing area. The memory furthermore stores a second data element associating the second digital resource viewing component with the second viewing area. The memory furthermore stores an association between the first digital resource viewing component and second digital resource viewing component. A processor of the client device causes the display to display a user interface element for generating the visual array. The processor detects a selection of the user interface element. Responsive to the selection of the user interface element, the processor identifies for inclusion in the visual array, at least the first digital resource viewing component. The processor also identifies the first data element corresponding to the first digital resource viewing component and determines that the first data element associates the first digital resource viewing component with the first viewing area. Responsive to determining that the first data element associates the first digital resource viewing component with the first viewing area, the processor causes the first digital resource viewing component displaying a first digital resource to be positioned over the first viewing area of the display. The processor detects that the second digital resource viewing component is associated with the first digital resource viewing component. Responsive to detecting the second digital resource viewing component is associated with the first digital resource viewing component, the processor identifies for inclusion in the visual array the second digital resource viewing component. The processor identifies the second data element corresponding to the second digital resource viewing component and determines that the second data element associates the second digital resource viewing component with the second viewing area. Responsive to determining that the second data element associates the second digital resource viewing component with the second viewing area, the processor causes the second digital resource viewing component displaying a second digital resource to be positioned over the second viewing area of the display.

In another embodiment, a non-transitory computer-readable storage medium stores instructions that when executed by a processor causes the processor to perform any of the processes or process steps described above.

In yet another embodiment, a computer device comprises a processor and a non-transitory computer-readable storage medium stores instructions that when executed by a processor causes the processor to perform any of the processes or process steps described above.

BRIEF DESCRIPTION OF THE DRAWINGS

The disclosed embodiments have other advantages and features which will be more readily apparent from the detailed description, the appended claims, and the accompanying figures (or drawings). A brief introduction of the figures is below.

FIG. 3 is a graphical representation of a first example embodiment of an array management complex component central to the generation and management functions of an array of digital resources in a networked computer environment.

FIG. 4 is a graphical representation of a second example embodiment of an array management complex component central to the generation and management functions of an array of digital resources in a networked computer environment.

FIG. 5 is a graphical representation of an example embodiment of data elements used to visually designate digital resources of an array.

FIG. 6 is a graphical representation of a first example embodiment of parameters used to define viewing areas for digital resources an array of digital resources.

FIG. 7 is a graphical representation of a second example embodiment of parameters used to define viewing areas for digital resources an array of digital resources.

FIG. 8 is a block diagram illustrating a first example embodiment of viewing areas for digital resources an array of digital resources.

FIG. 9 is a block diagram illustrating a second example embodiment of viewing areas for digital resources an array of digital resources.

FIG. 10 is a graphical representation of data that may be associated with digital resources of an array.

FIG. 12 is a graphical representation of a first state of a first example embodiment of a data management system used to track and manage data and viewing components of digital resources of an array.

FIG. 13 is a graphical representation of a second state of a first example embodiment of a data management system used to track and manage data and viewing components of digital resources of an array.

FIG. 14 is a graphical representation of a third state of a first example embodiment of a data management system used to track and manage data and viewing components of digital resources of an array.

FIG. 15 is a graphical representation of a fourth state of a first example embodiment of a data management system used to track and manage data and viewing components of digital resources of an array.

FIG. 16 is a graphical representation of a fifth state of a first example embodiment of a data management system used to track and manage data and viewing components of digital resources of an array.

FIG. 17 is a graphical representation of a first state of a second example embodiment of a data management system used to track and manage data and viewing components of digital resources of an array.

FIG. 18 is a graphical representation of a second state of a second example embodiment of a data management system used to track and manage data and viewing components of digital resources of an array.

FIG. 19 is a graphical representation of a third state of a second example embodiment of a data management system used to track and manage data and viewing components of digital resources of an array.

FIG. 20 is a graphical representation of a fourth state of a second example embodiment of a data management system used to track and manage data and viewing components of digital resources of an array.

FIG. 21 is a graphical representation of a fifth state of a second example embodiment of a data management system used to track and manage data and viewing components of digital resources of an array.

FIGS. 41A-41B are flowcharts illustrating an embodiment of a process for navigating between digital resources using a dynamic navigation user interface.

FIG. 42 is a flowchart illustrating an embodiment of a process for visually designating digital resources for display in an array of digital resources.

FIG. 43 is a flowchart illustrating an embodiment of a first process for generating an array of digital resources.

FIGS. 45A-45B are flowcharts illustrating a second embodiment of a second process for generating an array of digital resources.

FIGS. 46A-46E are flowcharts illustrating a first embodiment of a third process for generating an array of digital resources.

FIGS. 47A-47E are flowcharts illustrating a second embodiment of a third process for generating an array of digital resources.

DETAILED DESCRIPTION

Figure 1:
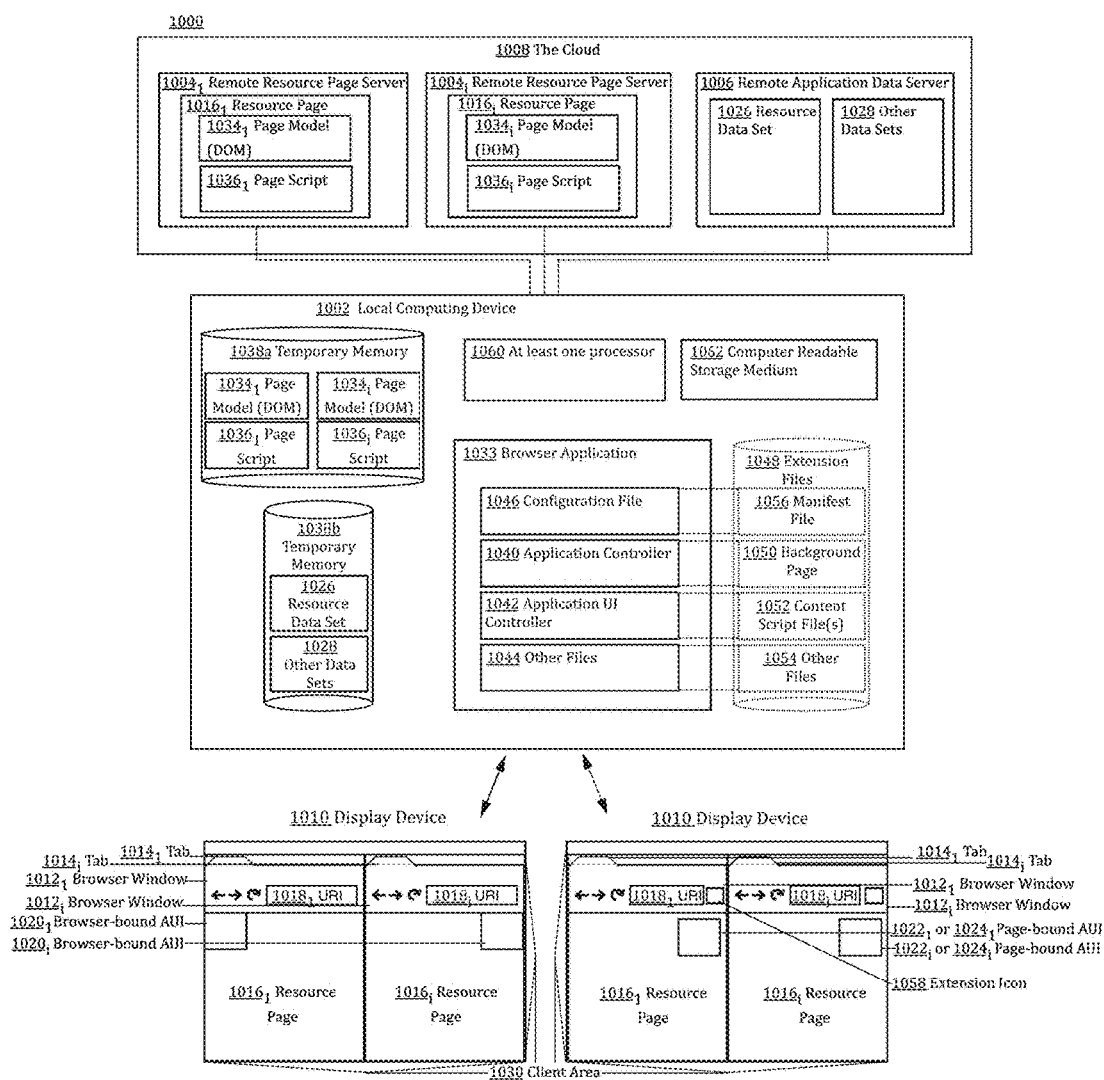
FIG. 1 is a block diagram illustrating a first example embodiment of a system for enabling generation and management of an array of digital resources in a networked computer environment.

The Figures (FIGS.) and the following description relate to various embodiments by way of illustration only. From the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

In a Resource Set Presentation Process (RSPP), a computer device enables a user to construct presentations from stored digital information resources, including ones hosted on a computer network. To do so, the RSPP spans the breadth of the information cycle, including information collection, organization, enrichment, and presentation, including sharing to one or more users.

An aspect of the RSPP is the Resource Set Array Generation Process (Array Generation Process). The RSAGP may utilize other aspects of the RSPP including but not limited to the Resource Set Navigation Process (Navigation Process), the Resource Set Visual Designation Process (Visual Designation Process), and the Resource Set Array Responsive Action Process (Array Responsive Action Process). A description of the RSPP, how the Navigation Process, Visual Designation Process, and Array Responsive Action Process may be used with the Array Generation Process, and the Array Generation Process itself follows below.

Using the RSPP, a user can interact with the computer device to construct a presentation, including one composed of hosted digital information resources, useful for a number of pursuits including education, business, travel, and other fields. Using the example of a presentation composed of hosted digital information resources, a professor can quickly construct a presentation composed of a chapter from an eTextbook, a scholarly article, Google Map views centered on the place of study, a worksheet from ExcelOnline, and other resources available to the professor and her students; a financial analyst can quickly construct a presentation composed of a Google Doc containing an investment thesis, bank reports, Google Map views displaying areas relevant to an investment, a workbook from ExcelOnline, a stock chart from Yahoo Finance, and other resources available to the analyst and her associates; a travel agent or independent traveler can quickly construct a presentation composed of the traveler's daily itineraries, Google Map views showing tour routes, background information on tourist destinations, emergency contact information, and any other resources available to the travel agent, her clients, and/or the independent traveler. As implied above, each presentation may be composed of hosted digital information resources of unique origin.

The RSPP may utilize a Resource Set composed of a discrete set of one or more Resources, each of which may be composed of one or more Resource Pages and/or Resource Page Selections and/or the one or more Resource Pages' and/or Resource Page Selections' associated Resource Data. A Resource Page may be a webpage or other displayed digital information resource. A Resource Page Selection may be a specific view, state or collection of one or more elements of a Resource Page; a Resource Page Selection may be a Resource Page in its entirety. For the sake of clarity and readability a Resource Page may refer to both a Resource Page or Resource Page Selection in multiple instances throughout this disclosure. Resource Data is data that may include a Resource's organizational, informational, and/or locational attributes that is accessible, readable, and retrievable for use in the RSPP. Resource Data may include one or more of the following: each Resource's title; each Resource's Resource Page's network location (URI) or Resource Pages' network locations (URIs); one or more attributes defining a Resource Page Selection; one or more Resource Sets, Groups, or Sub-Groups with which each Resource is associated; each Resource's display order within one or more Resource Sets; each Resource's Visual Designator; each Resource's displays of one or more of the Resource's URIs including displays of one or more URIs within DOM element pop-ups; each Resource's other informational context that includes tags, text files, audio files, instructions indicating which sections of a Resource Page to emphasize, and links to other Resources.

To enable navigation from one presentation resource to a next presentation resource the RSPP may utilize the Navigation Process. The Navigation Process enables the repetitive selection of the same Navigation Specific UI Element in the Dynamic Navigation User Interface (DNUI) to result in the display of Resources in a Resource Set according to the Resource Set's creator's intended scope and sequence. A Navigation Specific UI Element refers to a UI element that may include directional arrows or buttons indicating concepts of sequence that are displayed in order to provide the means with which a next (next or previous of an ordered set) Resource in the Resource Set can be accessed according to the Resource Set's creator's intended scope and sequence. The DNUI is a user interface that makes certain functions, including some or all of the following, available to the user: 1) repetitive selection of the same Navigation Specific UI Element in the DNUI to result in the display of one or more Resources in a Resource Set according to the Resource Set's creator's intended scope and sequence; 2) the display of Resource Data specific to each Resource in a Resource Set; 3) the means to access any Resource Data within any Resource Data Set; 4) the means to edit any Resource Data within any Resource Data Set; and 5) the means to share any Resource Data Set with any number of computing devices and servers on a computer network. The Resource Set Navigation Process and variations thereof are described in detail below.

Another aspect of the RSPP is the ability to organize Resources of a Resource Set in multiple ways and convey how each Resource has been organized (i.e. each Resource's organizational context) to the audience viewing and/or using the presentation. A Resource's organizational context may help provide information about each Resource that may not be intrinsic to or conveyed by the Resource's underlying Resource Page and/or Resource Page Selection viewed or considered in isolation. The RSPP provides multiple processes by which Resources of a Resource Set and the organizational context of each can be organized, displayed and conveyed.

Resources can be organized in one or more Groups within and generated from one or more Group Sets, regardless of each Resource's underlying format, application, origin, source, or other objective attribute. A Group Set contains and from it users can generate Groups. Groups can be defined by attributes different than and independent of those used to define those Groups contained in and/or that have been generated within other Group Sets. For example, a user may utilize both a Group Set named Queue and a Group Set named Subjects. Queue may be the Group Set with which a user may associate Resources that the user will organize in additional ways at a later time. Subjects may be the Group Set from which a user generates more specific Groups. One or more Resources may be associated with each Group in multiple ways including by associating the unifying attribute defining the Group with each Resource intended for organization as part the Group. For example, each Group, and thus its unifying attribute, could correspond with a specific pursuit such as education, business, and travel. In such a case, a user might choose to create Groups from the Subject Group Set such as Education, News, Finance, or Travel.

In addition, Sub-Groups may be created within each Group. Sub-Groups include both a Sub-Group derived from a Group as well as a Sub-Group derived from another Sub-Group. The latter is for the sake of clarity and readability. In many instances, Sub-Group may refer to a Sub-Group derived from a Sub-Group derived from another Sub-Group, and so on. The number of possible divisions is limited only by the number of Resources in the Group or Sub-Group from which additional Sub-Groups can be derived. A Sub-Group can be created and defined in multiple ways including by associating one or more Resources with an attribute other than the unifying attribute or attributes defining the Sub-Group's parent Group or Sub-Group. Using an "Education" use case narrowed to one in which a presentation is composed of hosted digital information resources as an example, a user may want to associate one or more Resources associated with the Education Group with an additional attribute such as Ancient Rome. A user may want to associate one or more of the same or other Resources associated with the Education Group with an additional attribute such as Chemistry. By associating one or more Resources within the Education Group with the Ancient Rome and Chemistry attributes the user can create the Sub-Groups of Ancient Rome and Chemistry, respectively. As shown throughout this disclosure, a Group may be refined to its constituent Sub-Groups by applying one or more attributes as tags, each associated with the Sub-Group and serving as its unifying attribute, to the parent Group. Similarly, for the Finance Group a user might create Sub-Groups such as Forecasts, Valuations, Research, etc. For the Travel Group a user might create Sub-Groups based on a destination attribute such as World Cup 2016, National Park Tour, Caribbean Cruise, etc.

The Resources associated with any Resource Set (Group, Sub-Group, or other) may vary considerably in subjective attributes including the functional role or roles (main idea, context, instruction, etc.) each plays with respect to the entirety of a presentation of which the Resources are a part.

For example, and continuing with the "Education" example above, some Resources associated with the Sub- Group Ancient Rome of the Group Education, might be more important to a presentation of which they are a part than others because they express one or more of the presentation's main ideas. Other Resources associated with the Sub-Group Ancient Rome of the Group Education, might be less important to the presentation than others because they express the information supplementary to that expressed by those Resources expressing the presentation's main idea(s). Still other Resources might provide instruction for one or more of a presentation's constituent Resources, Sub-Groups, or Groups.

The Resources associated with any Resource Set (Group, Sub-Group, or other) also may vary considerably in other subjective attributes (including content) or more objective attributes (including source, format, and date of information) with respect to the entirety of a presentation of which the Resources are a part.

For an alternative example, each of one or more Resources associated with a Sub-Group "Knowlio, Inc.—Filing" of the Group Patents might be a textual description of the "Knowlio, Inc.—Filing". Each of other Resources associated with the Sub-Group "Knowlio, Inc.—Filing" of the Group Patents might be a Figure associated with a specific textual description.

Because the Resources of a Resources Set may fulfill different roles with respect to, or be associated with distinct subjective or objective attributes relevant to a presentation as a whole, it may be valuable to simultaneously isolate and display Resources of a Resource Set according to each Resource's role or other attributes in the presentation, and, potentially, association with other Resources of the Resource Set.

As such, and continuing with the "Education" example above, a presentation creator might determine that two Resources within the Sub-Group Ancient Rome of the Group Education express the main ideas of the presentation and eight other Resources within the Sub-Group Ancient Rome of the Group Education express information supplementary to that expressed by those Resources expressing the presentation's main ideas. To this end, the user could associate the two Resources expressing the presentation's main ideas with a Visual Designator called Focus and associate the eight Resources expressing the information supplementary to the main ideas with a Visual Designator called Context. Generally, a Visual Designator may be a data element including one or more words, numbers, images, symbols, or other information that may be associated with both 1) a digital information resource and/or viewing component displaying a digital information resource and 2) a defined area of a display, including a Pane (defined in greater detail below).

To that end, in the "Education" example, the user also could associate the left half of the Client Area of the user's Display Device, defined as an area Pane L, with the Visual Designator Focus and associate the right half of the Client Area of the user's Display Device, defined as an area Pane R, with the Visual Designator Context. For presentations composed of hosted digital information resources, a Pane also may be defined as an area within the display space of a Browser Window. As such the left half of a single Browser Window could be defined as Pane L and the right half of a single Browser Window could be defined as Pane R. However, for the sake of clarity and readability the "Education" example follows an implementation in which a Pane defines an area of the Client Area of the user's Display Device. In this way the user may convey which Resources are most important and which Resources are supplementary by the position each Resource is assigned for display on the Display Device. The latter is a specific example of a more general function of another aspect of the RSPP, the Visual Designation Process. The Visual Designation Process allows meaning to be conveyed about a Resource based on the position the Resource is assigned on the Display Device.

Once a Visual Designation Process has taken place, another aspect of the RSPP, the Array Generation Process, may be used to generate a visual Array of one or more Resources of a Resource Set, each Resource of the Array being positioned over a defined area of a Display Device, the Resource and/or its viewing component and defined area of the Display Device having been associated with one or more common Visual Designators.

Continuing with the "Education" example above, initially, a user may initiate an Array Generation Process such that the Browser Window assigned to display a Resource associated with the Visual Designator Focus may be sized and positioned to display over the Pane L, defining the left half of the Client Area of the user's Display Device, and the Browser Window designated to display Resources associated with the Visual Designator Context may be sized and positioned to display over the Pane R, defining the right half of the Client Area of the user's Display Device. Viewing a presentation's information in this way is valuable for many reasons including 1) conveying information, including non-intrinsic information, about a Resource or Resource Set by virtue of its position on the Display Device, and 2) providing visual continuity by the simultaneous display of one or more Resources of a Resource Set. For example, and continuing with the "Education" example above, a Resource of the Sub-Group Ancient Rome of the Group Education designated as a Focus, may be positioned and sized to display over the Pane L, defining the left half of the Client Area of the user's Display Device. By virtue of this placement a user of the presentation could know that this Focus Resource conveys a main idea of the presentation and, perhaps, that he or she should focus more of the user's attention on that Resource. In a similar way, a Resource of the Sub-Group Ancient Rome of the Group Education designated as a Context, may be positioned and sized to display over the Pane R, defining the right half of the Client Area of the user's Display Device. By virtue of this placement, a user of the presentation can know that this Context Resource conveys information supplementary to that of the Focus or Focuses of the presentation and, perhaps, that he or she should develop his or her understanding of its content by concentrating on how it relates to the Focus(es). At the same time, both the Focus Resource and Context Resource are made more valuable by the simultaneous display of the other; the simultaneous display of Resources reduces visual discontinuity and, thus, the cognitive burden a user experiences by viewing related Resources successively in isolation. For example, and continuing with the "Education" example above, the Focus might be a chapter from an eTextbook on Roman engineering. The Context might be a series of Google Map Street Views of one or more examples of Roman engineering, perhaps, an aqueduct and/or a building such as the Colosseum. The Focus might contain valuable text about Roman engineering and possibly a limited depiction of the same example of Roman engineering provided in the Context. However, the Context can provide additional insight and granularity regarding the text and limited example provided in the Focus and thus supplement the information conveyed in the Focus. Conversely, the Focus could provide additional insight and granularity into the example displayed in the Context. Being able to view both simultaneously minimizes the cognitive burden associated with the context switching a user would experience if the Focus and Context only could be viewed easily in successive isolated displays. As implied, the example above is non-limiting and it should be understood that the Array Generation Process may be used to generate Arrays in a number of configurations and by a number of similar methods.

Once an Array has been generated, another aspect of the RSPP, the Array Responsive Action Process, may used so that an event affecting the display of elements of one or more Resource may affect the display of elements of one or more other Resources of an Array. Continuing with the "Education" example above, after viewing an Array of Sub-Group Ancient Rome of the Group Education, a user may want to transition to another Group or Sub-Group. For example, a user may want to view the Resources of the Group Travel and view the Resources of the Group Travel in Array form. By selecting Travel from a list of available Groups in an Application UI of the Focus Resource of Sub-Group Ancient Rome of the Group Education in the Focus Browser Window, a user can expect and affect a transition from not just the Resource of Sub-Group Ancient Rome of the Group Education in the Focus Browser Window to a Focus Resource of the Group Travel in the Focus Browser Window but also from the Resource of Sub-Group Ancient Rome of the Group Education in the Context Browser Window to a Context Resource of the Group Travel in the Context Browser Window. In another instance, a user may want to navigate from one Focus Resource to another Focus Resource within the same Group or Sub-Group. In many instances, Resources associated with one or more Visual Designations may be associated with specific Resources also associated with one or more Visual Designations. For example, multiple Context Resources may be associated specifically with a single Focus Resource. Multiple other Context Resources may be associated with a different, single Focus Resource. For example, and continuing with the "Education" example above, one Focus Resource might be a chapter from an eTextbook on Roman engineering with multiple Context Resources in the form of Google Map Street Views, scholarly articles, hosted images, etc., each providing supplementary information about the eTextbook chapter in Focus. Another Focus Resource might be an educational video on the Roman Forum with multiple Context Resources in the form of Google Map Street Views, scholarly articles, hosted images, etc., each providing supplementary information about the video in Focus. When the user chooses to navigate from the eTextbook chapter to the educational video (e.g. from one Focus to the next), the user can and should expect the Context Resource in the Context Browser Window to navigate from that associated with the eTextbook to that associated with the educational video.

More generally, when utilizing Array Resources displayed in one or more Browser Windows, an Array Responsive Action Process may enable an event affecting the display of an Array Resource and/or its Rendered View (an object representing the contents of a webpage displayed in a Tab) and/or its Tab and/or its Browser Window to affect the display of one or more other Array Resources and/or their Rendered Views and/or their Tabs and/or their Browser Windows. The Array Resource affecting the one or more other Array Resources may be simultaneously displayed in the same Browser Window and/or Tab as one or more of the one or more other Array Resources. A process such as the Array Responsive Action Process may be said to make Resources of an Array "responsive" to each other.

Figure 38:
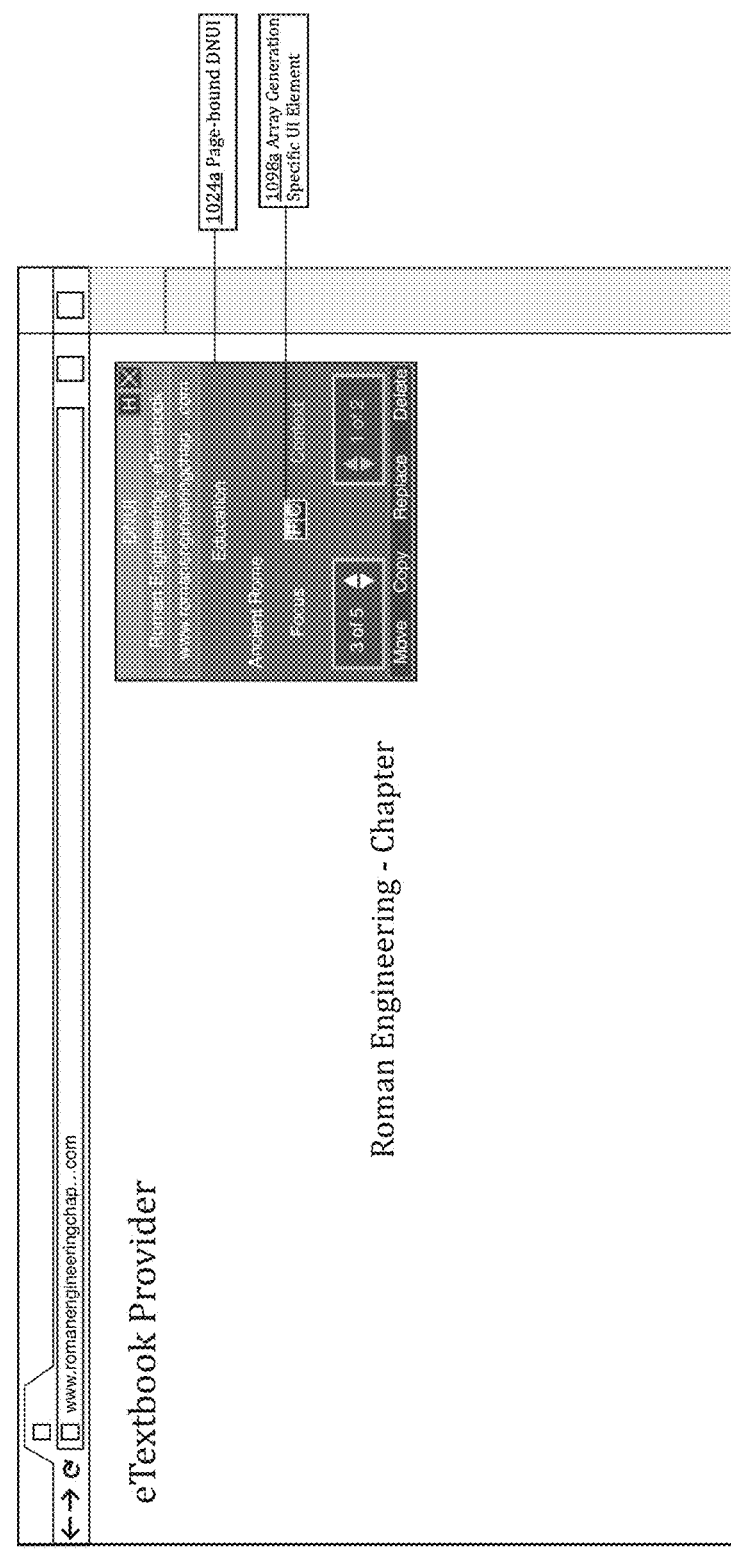
FIG. 38 is a block diagram illustrating a first example embodiment of user interface components and functional modules for implementing digital resource array generation and management using a page-bound dynamic navigation user interface according to an education example.
Figure 39:
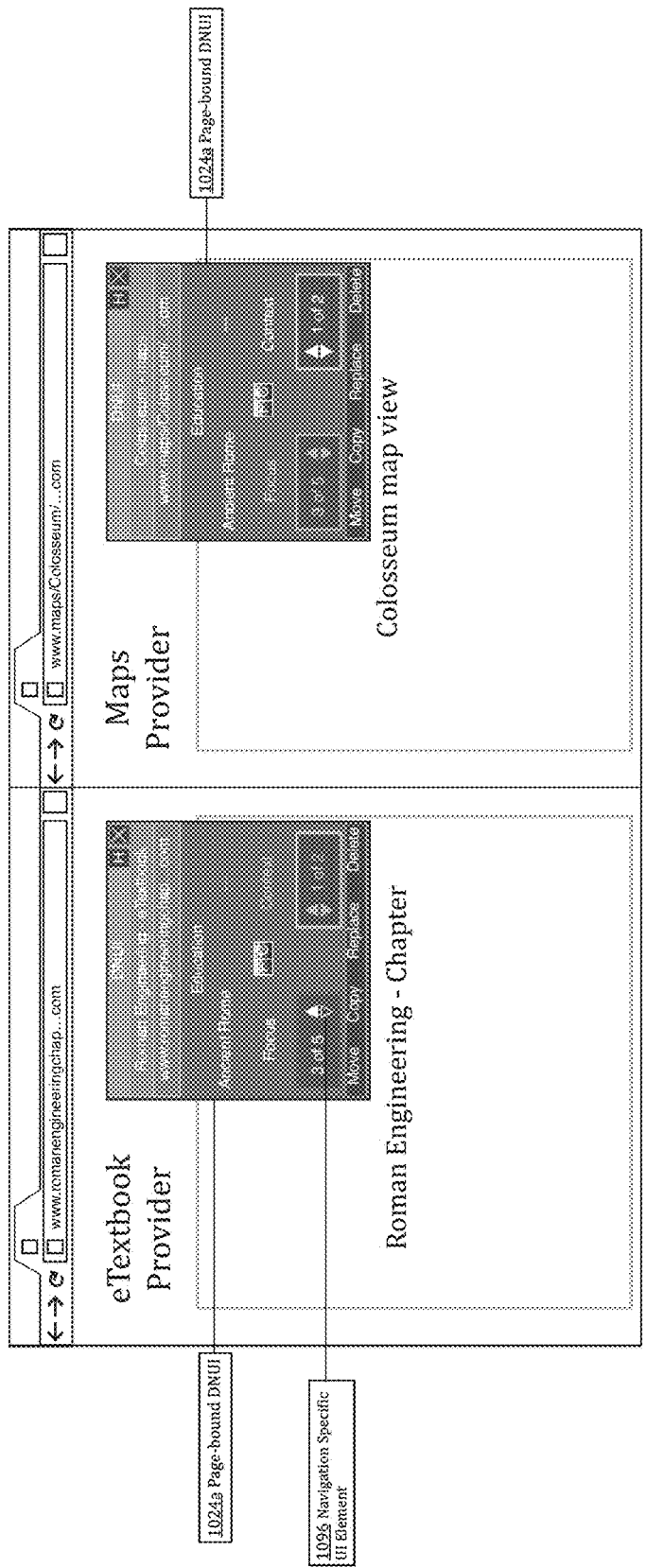
FIG. 39 is a block diagram illustrating a second example embodiment of user interface components and functional modules for implementing digital resource array generation and management using a page-bound dynamic navigation user interface according to an education example.
Figure 40:
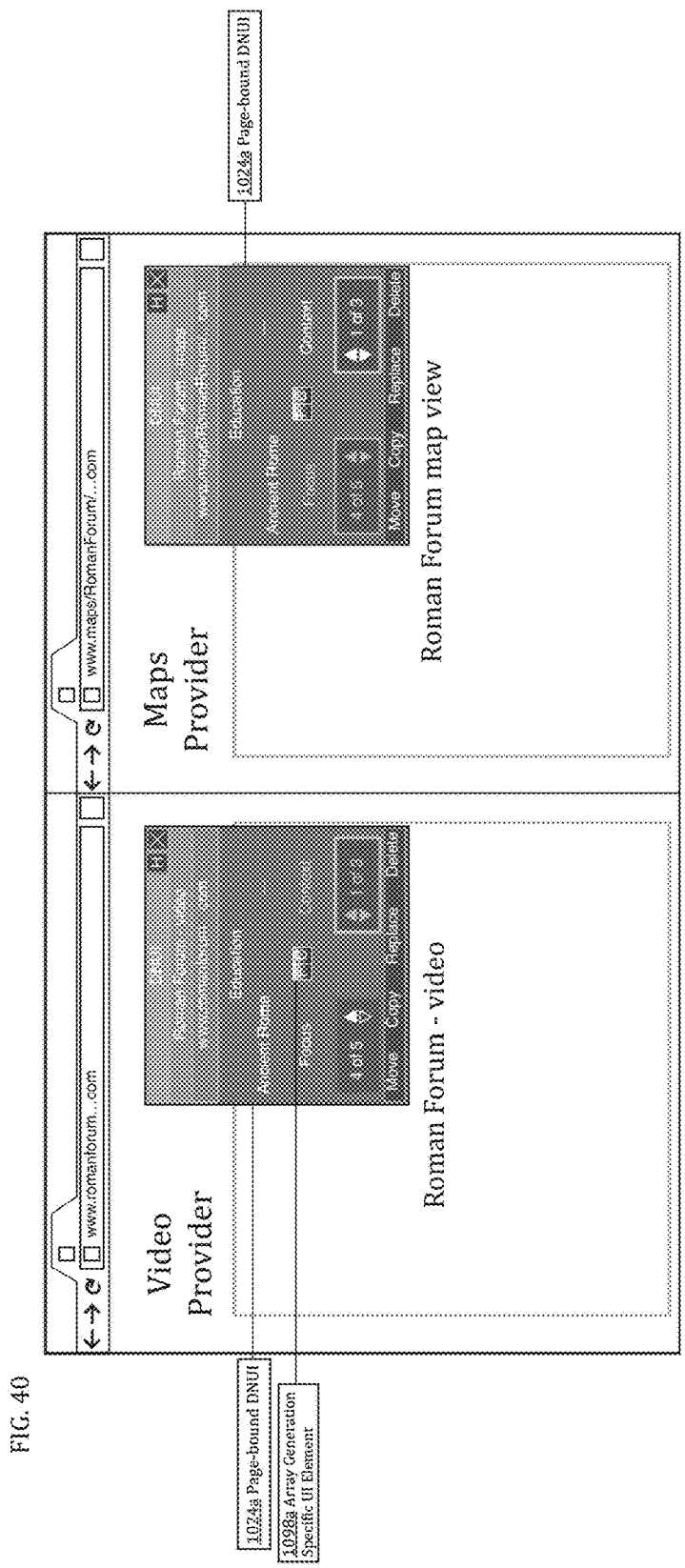
FIG. 40 is a block diagram illustrating a third example embodiment of user interface components and functional modules for implementing digital resource array generation and management using a page-bound dynamic navigation user interface according to an education example.

FIGS. 38-40 provide a graphic overview of the "Education" example. These figures are illustrative of the examples above provide examples of user interfaces that may be displayed at different stages during execution of the processes described herein. The description below provides additional details of how the Navigation Process, Visual Designation Process, and Array Responsive Action Process may be used with the Array Generation Process, and the Array Generation Process itself.

FIG. 1 is a block diagram of a system 1000 for performing several of the Resource Set Presentation Processes including the Navigation Process, the Visual Designation Process, the Array Generation Process, and the Array Responsive Action Process. In the example of FIG. 1, a Local Computing Device 1002 is illustrated as communicating with multiple remote servers, one or more Remote Resource Page Servers 1004 and a Remote Application Data Server 1006, in The Cloud 1008 in order to provide, using a Display Device 1010, one or more Browser Windows 1012 with Tabs 1014 each of which may display 1) a Resource Page 1016 at a URI 1018, the Resource Page 1016 being stored at a Remote Resource Page Server 1004 (each independently hosted Resource Page 1016 may have its own Remote Resource Page Server 1004); and/or 2) an Application User Interface (AUI) (e.g., a Browser-bound AUI 1020, a Page-bound AUI 1022, or a Page-bound AUI 1024) that may include Resource Data of a Resource Data Set 1026 and Other Data of Other Data Sets 1028 that may be stored at the Remote Application Data Server 1006 and other elements which are stored in various system components at different times in the Resource Set Presentation Process (RSPP). FIG. 1 shows two examples of how an AUI could be rendered in a Tab 1014 of a Browser Window 1012 and displayed in the Client Area 1030 of the Display Device 1010. An AUI also may be rendered in a separate pop-up window not specifically illustrated in the example of system 1000.

Figure 2:
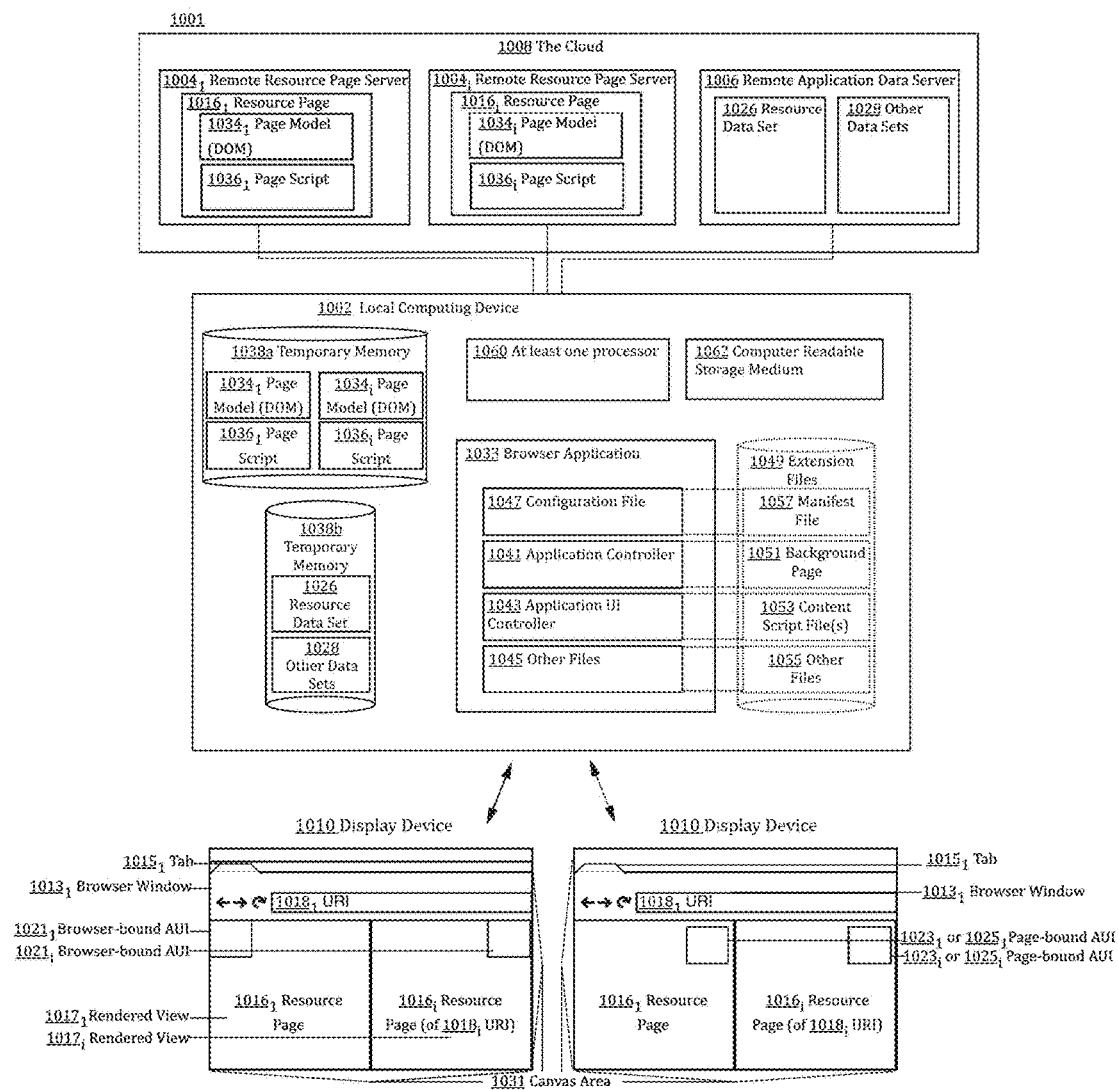
FIG. 2 is a block diagram illustrating a second example embodiment of a system for enabling generation and management of an array of digital resources in a networked computer environment.

The components represented in FIG. 1 may be modified to simultaneously display multiple Resources in the display area of a single browser window. System 1001 of FIG. 2 shows an example of such a configuration. In the example of FIG. 2, a Local Computing Device 1002 is illustrated as communicating with multiple remote servers, one or more Remote Resource Page Servers 1004 and a Remote Application Data Server 1006, in The Cloud 1008 in order to provide, using a Display Device 1010, a Browser Window 1013 with a Tab 1015; and multiple Rendered Views $1017_1$ and $1017_i$ each of which may simultaneously display 1) a Resource Page $1016_1$ and $1016_i$, of the URIs $1018_1$ and $1018_i$, the Resource Pages $1016_1$ and $1016_i$ being stored at Remote Resource Page Servers $1004_1$ and $1004_i$ (each independently hosted Resource Page 1016 may have its own Remote Resource Page Server 1004); and/or 2) an Application UI (AUI) (e.g., a Browser-bound AUI 1021, a Page-bound AUI 1023, or a Page-bound AUI 1025) that may include Resource Data of a Resource Data Set 1026 and Other Data of Other Data Sets 1028 that may be stored at the Remote Application Data Server 1006 and other elements which are stored in various system components at different times in the Resource Set Presentation Process (RSPP). FIG. 2 shows two examples of how an AUI could be rendered in a Rendered View 1017 of Tab 1015 of a Browser Window 1013 and displayed in the Canvas Area 1031 (generally, the Canvas Area may be the portion of a Browser Window that may be used to display one or more Resources, Resource Pages, and/or webpages) of the Display Device 1010. An AUI also may be rendered in a separate pop-up window not specifically illustrated in the example of system 1001.

In the description of FIGS. 1 and 2 that follows many components are numbered using numerical references to both FIGS. 1 and 2. In each case, the dual numerical reference is used to consolidate descriptive language that may apply to the component configured for both system 1000 and 1001. For example, "Browser Window" may be followed by the numerical reference 1012/1013 to indicate that the associated descriptive language applies to both the Browser Window of system 1000 and 1001, respectively.

Continuing on, the components desirable for an example implementation of the Browser-bound AUI 1020/1021 shown in FIGS. 1 and 2 are illustrated and discussed in detail in FIGS. 22, 23, 24, and 25. The components desirable for example implementations of the Page-bound AUI 1022 shown in FIG. 1 are illustrated and discussed in detail in FIGS. 26, and 27. The components desirable for example implementations of the Page-bound AUI 1024 shown in FIG. 1 are illustrated and discussed in detail in FIGS. 28, and 29. FIGS. 22, 23, 24, 25, 26, 27, 28, and 29 are provided for the sake of clarity and serve only as examples of the components desirable to render the Browser-bound AUI and Page-bound AUI and how each may be utilized in the Navigation Process, Array Generation Process, and Array Responsive Action Process; the same components may be utilized in the Visual Designation Process as well.

With slight modification, those components represented in FIGS. 22, 23, 24, and 25 could render a Page-bound AUI instead of a Browser-bound AUI for use in the Navigation Process, Array Generation Process, Visual Designation Process, and Array Responsive Action Process. Also with slight modification, those components represented in FIGS. 26, 27, 28, and 29 could render a Browser-bound AUI instead of a Page-bound AUI for use in the Navigation Process, Array Generation Process, Visual Designation Process, and Array Responsive Action Process.

In the figures and descriptions herein, many system components may exist in multiple instances fulfilling the same function in each instance. In many cases, in order to clarify when there are or could be multiple instances of the same system component represented in a figure or being described in the text that fulfill the same function, the label number of each instance of the component will be annotated with a subscript indicating its distinction from other instances of the same component. The subscript "i" will be used to represent one or more instances of a component in addition to other instances of the same component described and labeled with an integer subscript such as "1" or "2". For example, and as shown in FIG. 1 of system 1000, multiple Browser Windows are represented by "Browser Window $1012_1$" and "Browser Window $1012_i$"; the former, a first, single instance of a Browser Window; the latter, a representation of one or more Browser Windows, the number of which being dependent on system constraints and inputs. In other cases, a component shown in a figure with a subscript such as "i" or "1" may be referred to without the subscript, indicating the component is being referenced in more general terms. For example, in FIG. 1 Browser Window is shown as "Browser Window $1012_1$" and "Browser Window $1012_i$". However, in the associated description of FIG. 1 and in many instances throughout this disclosure, Browser Window is also referenced as 1012.

A Local Computing Device 1002 may generally represent a computing device that may be configured to execute an otherwise conventional Browser Application 1032, and to communicate over a network with the Remote Resource Page Server 1004 and the Remote Application Data Server 1006. For example, the Local Computing Device 1002 may represent any standard desktop or personal computing device, such as any laptop, notebook, netbook computer, any tablet computer, any Smartphone or other mobile computing device, or any virtual reality headset. Such computing devices, and other computing devices, may be configured to access each Remote Resource Page Server 1004 and Remote Application Data Server 1006 over one or more computer networks, in any conventional manner. For example, many Local Computing Devices may include various types of network-related hardware/software which enable the Local Computing Device 1002 to communicate over the public internet, private intranet, or other network, with each Remote Resource Page Server 1004 and Remote Application Data Server 1006. The Display Device 1010 may represent one or more of a conventional type of display such as a monitor, touch-screen, virtual reality, or other type of visual or auditory display. In many cases, a single Local Computing Device 1002 may be associated with multiple displays. For the sake of readability, Display Device 1010 may refer to either a single display device and/or multiple display devices. The Client Area 1030 represents the portion of the Display Device 1010 that may be used to display one or more Browser Windows. An Array may or may not be sized and positioned to fill the entire area as shown in this figure.

In the description below, it is generally assumed that the Local Computing Device 1002 and the Browser Application 1032/1033 communicate with each Remote Resource Page Server 1004 and Remote Application Data Server 1006 over the public internet, and therefore use standard and conventional protocols for identifying, retrieving, and rendering each Resource Page 1016 and Data, including Resource Data of the Resource Data Set 1026, e.g., from a web server represented by Remote Resource Page Server 1004 and from a Remote Application Data Server 1006. However, it will be appreciated that such examples are provided merely for the sake of clarity and conciseness, and are not intended to be limiting of the different ways in which the Local Computing Device 1002 may identify, retrieve, render, or display Resource Pages and Data, including Resource Data, in association with the Browser Application 1032/1033, Browser Window 1012/1013, and Tab 1014/1015.

In this description, it may generally be assumed that each Resource Page 1016 represents any of the many types of hosted information resources in the form of webpages that are available over the public internet. For example, a Resource Page 1016 may represent a substantially static page that includes text, sound, images, or other content which may be displayed within a Browser Window 1012/1013. In other examples, a Resource Page 1016 may include different types of dynamic or interactive content that can be engaged and manipulated by the user within the context of a Browser Window 1012/1013. In many instances, Resource Page 1016 and/or associated executable code may represent an application which may execute partially or completely at a Remote Resource Page Server 1004 (e.g., may utilize the processor, memory, and other hardware/software resources of the Remote Resource Page Server 1004), while providing associated functionality and features to the user via Browser Window 1012 (and perhaps executing at least partially locally at the Local Computing Device 1002). As just referenced, such hosted information resources in the form of webpages and associated functionalities and applications are well-known to be implementable using various, conventional programming languages and techniques including hypertext markup language (HTML), Asynchronous JavaScript (AJAX), Extensible Markup Language (XML), JavaScript, JavaScript Object Notation (JSON), and many other types of code which may be executed.

In FIGS. 1 and 2, a Resource Page 1016 at a Remote Resource Page Server 1004 is illustrated as including, or being associated with, a Page Model 1034 and a Page Script 1036. The use of such a Page Model 1034 and Page Script 1036 is known to and would be readily apparent to one of skill in the art and as such is not described in detail herein.

During a conventional rendering of a Resource Page 1016 by the Browser Application 1032/1033, a Temporary Memory 1038a, (e.g., a cache memory) at the Local Computing Device 1002 may be used to store temporarily the Page Model 1034 and the Page Script 1036. This, however, is meant to provide an example, and it may be appreciated that the Browser Application 1032/1033 may partially or completely access the Page Model 1034 and/or the Page Script 1036 remotely at the Remote Resource Page Server 1004. In this way, the Browser Application 1032/1033 may utilize the Page Model 1034 and the Page Script 1036, e.g., in a conventional manner, so as to thereby render a Resource Page 1016 within the Browser Window 1012/1013 provided by the Browser Application 1032/1033.

Similarly, and as implied by system 1000/1001, Application Data, including a Resource Data Set, may be downloaded from its Remote Application Data Server 1006 to the Local Computing Device 1002 and stored in Temporary Memory 1038b for use by the Application Controller 1040/1041 (generally, an application controller may represent a set of handlers (message or event handlers) and/or the application's associated business logic and other data elements). However, it may be appreciated that there are other possible ways with which Application Data, including Resource Data, can be made accessible to the Application Controller 1040/1041. For example, Resource Data can be created and stored locally and then shifted to temporary memory for use by the Application Controller 1040/1041. Also, locally stored Resource Data can be combined with the Resource Data Set 1026 initially stored at Remote Application Data Server 1006; this combination can then be stored in temporary memory as a larger Resource Data Set for use by the Application Controller 1040/1041.

The Application Controller 1040/1041, in coordination with the Application UI Controller 1042/1043 (described in detail below) and Other Files 1044/1045, provides that each Resource Page and/or Resource Page Selection is rendered alongside its specific Resource Data as a Resource displayed in a Browser Window 1012/1013; thus, the Application Controller 1040/1041 may be thought of as what links the files on each Remote Resource Page Server 1004 with the Resource Data files on Remote Application Data Server 1006. The Application Controller 1040/1041 in coordination with the Application UI Controller 1042/1043 and Other Files 1044/1045 also provides the basis for combining the ordinary/traditional functions of a Browser Application and Display Device to create visual and functional relationships between Resources; thus, the Application Controller 1040/1041 also may be thought of as what links one independent Resource to another.

As configured in system 1000/1001, the Application Controller 1040/1041 may contain or directly access several sub-components, functions, and data structures central to the functions of the RSPP including one or more Array Management Complexes (AMC)s, each governing a separate Array Type and its behavior. An AMC itself may contain or directly access several sub-components, functions, and data structures central to the Visual Designation Process, Array Generation Process, and Array Responsive Action Process. FIGS. 3, 4, 5, 6, 7, 8, 9, 10, 11, 12-16, and 17-21 provide visual representations of several of these sub-components, functions, and data structures to help clarify their role in the RSPP as described herein.

As implied above, an AUI Controller's 1042/1043 functions often fall between an AUI and the Application Controller 1040/1041. These functions may include the following: 1) convey AUI inputs to Application Controller 1040/1041 which the Application Controller can interpret to build the Application UI View State and Resource Data Message corresponding to the inputs to the AUI; 2) inform the Application Controller 1040/1041 it is ready to receive the Application UI View State and Resource Data Message; 3) receive the Application UI View State and Resource Data Message; and 4) interpret and execute the tasks of the Application UI View State and Resource Data Message, ultimately resulting in the display of one or more AUIs in one or more Browser Windows 1012/1013. An Application UI View State and Resource Data Message may be one or more messages containing an Application UI View State (generally, an Application UI View State is executable code defining and containing the elements useful for the display and function of an AUI), Resource Data, and/or instructions useful for execution and display of a specific AUI by the AUI Controller. The Application UI View State and Resource Data Message may come in several forms including the Dynamic Navigation UI View State and Resource Data Message. A Dynamic Navigation UI View State and Resource Data Message may be one or more messages containing the Dynamic Navigation UI View State (generally, executable code defining and containing the elements useful for the display and function of a DNUI), Resource Data, and/or instructions useful for execution and display of a Resource specific DNUI by the AUI Controller. The Dynamic Navigation UI View State and Resource Data Message is an example of an Application UI View State and Resource Data Message. How it can be used is described in detail below. The Dynamic Navigation UI View State and Resource Data Message is central to multiple implementations of the Navigation Process, variants of the Array Responsive Action Process, and may be used in the Array Generation Process as well. How it can be used is described in detail below.

The AUI Controller 1042/1043 may represent more than one AUI Controller. For example, for the descriptions and figures of system 1000 AUI Controller 1042 may represent multiple AUI Controllers including an AUI Controller for each Tab of an Array. Likewise, for the descriptions and figures of system 1001 AUI Controller 1043 may represent multiple AUI Controllers including an AUI Controller for each Rendered View of an Array.

A shared Configuration File 1046/1047 and Other Files 1044/1045 are useful to support many implementations of the Navigation Process, Visual Designation Process, Array Generation Process, and Array Responsive Action Process. Other Files 1044/1045 may include the following file types: HTML files, JSON files, cascading style sheets (CSS) files, JavaScript files, image files, audio files, and text files.

As implied by system 1000/1001, the Application Controller 1040/1041, the AUI Controller 1042/1043, and Other Files 1044/1045 provide functionality to the Browser Application 1032/1033. The Application Controller 1040/1041, AUI Controller 1042/1043, and Other Files 1044/1045 can do so either by being directly incorporated into the Browser Application 1032/1033 or by being made available for use by the Browser Application as a set of files that provide additional features or functionalities in association with the Browser Application. In system 1000/1001, these files are shown as the Extension Files 1048/1049 but may, as may be understood from the more detailed description below, generally refer to browser extensions, add-ons, active X controls, web applications (web apps, apps) or any other program code which is designed to augment an appearance or functionality of the Browser Application 1032/1033 in providing the Browser Window 1012/1013 and page and elements rendered within it. The Background Page 1050/1051, Content Script File(s) 1052/1053, and Other Files 1054/1055 are outlined with a dotted line and connected with dashed lines to the Application Controller 1040/1041, AUI Controller 1042/1043, and Other Files 1044/1045 respectively, to indicate that the Background Page 1050/1051, Content Script File(s) 1052/1053, and Other Files 1054/1055 provide functions similar to the functional components with which each is connected by the dashed lines in an alternative implementation of system 1000/1001. That is, in the latter alternative arrangement and implementation, the Background Page 1050/1051 would fulfill one or more functions of the Application Controller 1040/1041; Content Script File(s) 1052/1053 would fulfill one or more functions of the AUI Controller 1042/1043; and the Other Files 1054/1055 would fulfill one or more functions of the Other Files 1044/1045. The Manifest File 1056/1057 is outlined with a dotted line and connected with dashed lines to the Configuration File 1046/1047, to indicate that the Manifest File 1056/1057 can provide an alternative arrangement to and implementation of part or all of Configuration File 1046/1047. That is, in the latter alternative arrangement and implementation, some or all functions of the Configuration File 1046/1047 may be embodied in the Manifest File 1056/1057.

As described herein, the Extension Files 1048/1049 may be utilized in the system 1000/1001 to provide additional features or functionalities in association with the Browser Application 1032/1033, and thus with respect to the Browser Window 1012/1013. In the example of system 1000/1001, an Extension Icon 1058/1059 represents an icon that is provided in conjunction with the Browser Application 1032/1033. The Extension Icon 1058/1059 may be produced by, or in conjunction with, the various Extension Files 1048/1049.

A browser extension generated by the Extension Files 1048/1049 may generally refer to a browser extension, add-on, active X control, web applications (web app, app) or any other program code which is designed to augment an appearance or functionality of the Browser Application 1032/1033 in providing the Browser Window 1012/1013 and page and elements rendered within it. As such, the Extension Files 1048/1049 may include one or more of various types of files, such as, for example, HTML files, JSON files, CSS files, JavaScript files, image files, audio files, text files, or other type of code or content that may be used to extend the features and functionalities provided by the Browser Application 1032/1033.

Some or all of the Extension Files 1048/1049 may be understood to be virtually indistinguishable in appearance, structure, and function with respect to otherwise conventional webpages which might be rendered by the Browser Application 1032/1033. Such files can use all the functionality of the Browser Application 1032/1033 with respect to the rendering of webpages. For example, those Extension Files 1048/1049 virtually indistinguishable in appearance, structure, and function with respect to otherwise conventional webpages may use the various application program interfaces (APIs) that the Browser Application 1032/1033 provides to external webpages such as Resource Page 1016.

In additional examples of the Extension Files 1048/1049, an associated extension may provide functionality to the Browser Application 1032/1033, such as a browser action to be implemented by the Browser Application 1032/1033 when the extension in question is relevant to most or all pages to be rendered by the Browser Application 1032/1033 within the Browser Window 1012/1013.

Thus, with respect to the simplified example of the system 1000/1001, a browser action of the Extension Files 1048/1049 may cause the Extension Icon 1058/1059 to appear within the Browser Window 1012/1013 essentially independently of the Resource Page 1016. Further, as is known, other extension functions may be implemented automatically in conjunction with an operation of the Browser Application 1032/1033, e.g., in conjunction with the loading and rendering of the Resource Page 1016. Further, as is known, other extension functions may be implemented programmatically. That is, for example, an extension may be configured to execute in a manner that is dependent upon a user's selection of a feature of the Browser Application 1032/1033. An extension also may be configured so that can it can add multiple functions to the Browser Application 1032/1033 by utilizing one or more of the implementations described above. For example, an extension may be configured so that it executes one or more of these functions automatically and one or more of these functions programmatically. Such an example is described in the figures and text below.

In the simplified example of the system 1000/1001, the Extension Files 1048/1049 are illustrated as being stored locally to the Local Computing Device 1002. For example, a user of the Local Computing Device 1002 may program and store the Extension Files 1048/1049 for use by the Browser Application 1032/1033. In additional or alternative examples, however, it may be appreciated that some or all of the Extension Files 1048/1049 may be accessed remotely. For example, a particular extension may be packaged within a single folder or archive that may then be accessed by the Browser Application 1032/1033. For example, a provider and/or distributor of the Extension Files 1048/1049 (not specifically illustrated in the example of system 1001/1001) may construct and package the Extension Files 1048/1049, and a user of the system 1000/1001 may thereby download and install a desired extension, including accessing, downloading, and installing the Extension Files 1048/1049 at the Local Computing Device 1002, as shown.

As mentioned, the Extension Files 1048/1049 include various different types of files. For example, the Extension Files 1048/1049 may include a Manifest file 1056/1057 which contains information about the extension, such as, its most important files and capabilities and provides configuration information to the Browser Application 1032/1033 that will affect the behavior of the extension at runtime. In another example, as illustrated in the example system 1000/1001, the Extension Files 1048/1049 may include a background file or background page, commonly an HTML page, which is generally known to represent an invisible page which holds the main logic of the extension, and which may thus run in the background so as to be always-available in case of some initiation of a relevant extension action. In system 1000/1001, the Background Page 1050/1051 fulfills this function (and other functions) and by doing so, fulfills the role of Application Controller 1040/1041 when provided. For example, for an extension installed on the Local Computing Device 1002 that includes the Extension Files

1048/1049, a browser action may be defined to have some affect on the rendering of the Resource Page 1016 via the Browser Window 1012/1013. Thus, the Extension Icon 1058/1059 may represent or be associated with such a browser action, and the associated Background Page 1050/1051 may be defined by an HTML file which has JavaScript code that controls a behavior of the browser action associated with the Extension Icon 1058/1059.

It may be appreciated that the Extension Files 1048/1049 may include various other types of files as well. For example, the Extension Files 1048/1049 may include other types of HTML pages, such as, for example, an HTML page associated with the browser action providing a pop-up window in association with the Browser Window 1012/1013. These may work in coordination with an AUI to provide some of the functions of the Extension Files 1048/1049. Thus, as described, HTML pages and associated code within the Extension Files 1048/1049 may include a background page associated with the Background Page 1050/1051, as well as a pop-up page associated with a corresponding pop-up file (not specifically illustrated in the example of system 1000/1001).

As illustrated in the example of system 1000/1001, and as referenced above, the Extension Files 1048/1049 may include, or be associated with Content Script File(s) 1052/1053 which would provide functions of the AUI Controllers 1042/1043. As is known, the Content Script File(s) 1052/1053 may represent, or include, one or more content scripts that enable an associated extension to interact with webpages, e.g., the Resource Page 1016. For example, the content script or content scripts of the Content Script File(s) 1052/1053 may be implemented as JavaScript that executes in the context of a Resource Page 1016 as loaded into the Browser Application 1032/1033. Therefore, the content script or content scripts of the Content Script File(s) 1052/1053 may be considered effectually part of a loaded page, instead of being considered part of an extension with which the content script or content scripts of the Content Script File(s) 1052/1053 was packaged.

Content scripts, generally speaking, may be configured to read details of webpages visited by the Browser Application 1032/1033, and may be further configured to make changes to such pages. For example, a content script may be configured to read and/or modify the Page Model (e.g., DOM) 1034 of a Resource Page 1036. The specific process for this is known.

As described in detail herein, the content script or content scripts of the Content Script File(s) 1052/1053 may be enabled to communicate with the Background Page 1050 of the relevant Extension Files 1048/1049 or with other files/pages associated with the Extension Files 1048/1049. For example, as described in detail or implied below with respect to FIGS. 26, 27, 28, and 29 the content script or content scripts of the Content Script File(s) 1052 may be enabled to exchange messages with an associated Background Page 1050. For example, the content script or content scripts of the Content Script File(s) 1052/1053 might send such messages to the associated Background Page 1050/1051 in response to some detected event. Additionally, the associated Background Page 1050/1051 may be enabled to send a message to the content script or content scripts of the Content Script File(s) 1052/1053 to request the content script or content scripts to change the appearance of the relevant browser page, (e.g., the Resource Page 1016) in a desired manner. FIGS. 26, 27, 28, and 29 describe in detail the message exchange between the content script or content scripts of the Content Script File(s) 1052 and the associated Background Page 1050 and how it is used to result in the display of an AUI, including a Dynamic Navigation UI.

In more specific examples, the content script or content scripts of the Content Script File(s) 1052/1053 may include JavaScript files running in a context of a Resource Page 1016 being rendered. In some example implementations, such as those in FIGS. 26, 27, 28, and 29 the content script or content scripts of the Content Script File(s) 1052 should always, or by default, be injected into a Resource Page 1016 to be loaded. For example, such content script or content scripts of the Content Script File(s) 1052/1053 may be registered in the Manifest File 1056/1057 of Extension Files 1048/1049 with the corresponding extension. Further, it may be appreciated that a given extension may be configured to insert multiple content scripts into a Resource Page 1016 during the rendering thereof, where each such content script may have multiple JavaScripts, or other types of content script content.

In the example of system 1000/1001, the Local Computer Device 1002 is illustrated as including at least one processor 1060, as well as a non-transitory Computer Readable Storage Medium 1062. That is, for example, the Local Computing Device 1002 may rely on two or more processors executing in parallel to achieve a desired result. Meanwhile, the non-transitory Computer Readable Storage Medium 1062 may represent any conventional type of computer memory which may be used, for example, to store instructions which, when executed by the at least one processor 1060, cause the Browser Application 1032/1033 and/or other components of the Local Computing Device 1002 and the Display Device 1010 to perform various functions, including other relevant functions described herein and the processes described below.

The Servers 1004, 1006 may similarly comprise at least one processor and a non-transitory computer readable storage medium that stores instructions that when executed by the at least one processor causes the at least one processor to perform the functions attributed to the respective Servers 1004, 1006 described herein.

In the example of FIGS. 1, 2, 22, 23 24, 25, 26, 27, 28, and 29 elements and components are illustrated including discrete functional modules. However, it may be appreciated that such illustration is merely for the sake of example, and that other implementations are possible. For example, a single element or component of the Browser Application 1032/1033 may be implemented by two or more elements or and components. Conversely, two or more components of the Browser Application 1032/1033 may be executed using a single component. The Application Controller 1040/1041 and its embodiment in a Background Page may access these components and may contain or directly access several sub-components, functions, and data structures not explicitly shown in system 1000/1001. FIGS. 3, 4, 5, 6, 7, 8, 9, 10, 11, 12-16, and 17-21 provide non-limiting visual representations of several of these components, sub-components, functions, and data structures to help clarify their role in RSPP processes utilizing web-based Resources. However, it should be noted that similar components, functions, and data structures may be utilized by the RSPP to execute processes with an application acting at a lower, operational system level that may distinguish between and utilize Resources, including non-web-based Resources (e.g. a word processing document, PDF document, spreadsheet, image, etc.), of multiple applications on Local Computing Device 1002.

It is also important to note that the RSPP may generate, manage and govern behavior for an Array composed of any number of viewing components including, Browser Windows, Tabs, or Rendered Views, and their associated Resources. In addition, the RSPP may generate, manage and govern behavior for multiple Arrays. Furthermore, the RSPP may generate, manage and govern behavior for multiple Arrays for multiple Array Types. This implies that system 1000/1001 may be composed of "i" instances of its components, sub-components, functions, and data structures in addition to a first, "1", instance of each.

For the sake of clarity, FIGS. 3, 6, 8, 12-16, 22, 23, 26, 27, 28, and 29 will represent and follow a "General" example, the focus of which will be an example set of components, sub-components, functions, and data structures and elements of a system 1000 that may be used to generate, manage and govern behavior for an Array Type of two Array Browser Windows (generally, an Array Browser Window is a browser window displayed as part of an Array and/or recognized by an AMC as a Browser Window of one or more of its Arrays), Array Tabs (a tab displayed as part of an Array and/or recognized by an AMC as a Tab of one or more of its Arrays) and a single Array Resource (generally, an Array Resource is a Resource displayed in an Array) displayed in each. The "General" example is similar to but describes RSPP processes in more general terms than the "Education" example. Central to the "General" example is the AMC XY. However, AMC XY and its Array Type provide only a focal point to help illustrate a single instance of a range of useful outcomes the RSPP creates. The "General" example in no way implies the RSPP and may generate, manage and govern behavior for only a single, two Browser Window Array Type. As shown above and herein, several of the figures and descriptions explicitly represent and discuss the existence of one or more Arrays and Array Types. Still, focusing on how the AMC XY interacts with the other components, sub-components, functions, and data structures throughout the "General" example of system 1000 is useful because it may be used as a model for how one may generate, manage and govern behavior for any number of other Array Types implemented in a range of systems.

FIG. 3 is intended to help clarify several of the concepts and processes described in this disclosure by providing a visual representation that focuses on a "General" example of many of an Array Management Complex's (AMC)'s functional components described herein, specifically those of an AMC XY 1064. This figure does not represent the exact form in which this AMC or data referenced within will exist within either the Application Controller 1040 or the Resource Data Set 1026 and/or Other Data Set 1028. The figure's purpose is to show in a consolidated and organized list, examples of the data, handlers, and other logic that may constitute an AMC and are referred to one or more times in this disclosure. As shown, an example of data that may be included with or made accessible to an AMC, AMC XY 1064 in this case, may include the following: Pane Layout 1, 2 1066 (generally, a Pane Layout is a layout of one or more Panes; Pane Layout 1066 is described in detail in FIGS. 6 and 8) and associated Pane Configuration Parameters (PCP)s 1068a (generally, PCPs may be dimensional data that may include values and/or references defining a Pane's position and size; PCPs 1068a are described in detail in FIGS. 6 and 8), Visual Designator X 1070, Visual Designator Y 1072, Tab Data Set 1074 (generally, a Tab Data Set may be one or more data structures containing Tab Data Attributes (generally, Tab Data Attributes are attributes associated with a Tab in a Tab Data Set; Tab Data Attributes may include Tab ID, Browser Window ID, Resource ID, and Visual Designator) for Tabs open in a Browser Application; the Tab Data Set 1074 may be used as part of a Tab Data Management System (TDMS) to help track which Tabs display the Resources and carry out the functions of an Array; an example of how a Tab Data Set is used in a TDMS is described in detail in FIGS. 12-16), and Resource Data Set 1026. As shown, the AMC XY 1064 may include the following handlers: one or more General Tab and Browser Window Event handlers 1076 (generally, General Tab and Browser Window Event handlers may be one or more handlers responsible for tracking events that may include Browser Window and/or Tab creation, Browser Window and/or Tab closing, and URI change), Array Tab tracking handlers 1078 (generally, an Array Tab tracking handler may be one or more handlers responsible for tracking an AMC's Tab Data Attribute Sets (generally, a Tab Data Attribute Set may be the Tab Data Attributes associated with a Tab) similar to what is described in FIGS. 12-16), Array Generation Message (AGM) handlers 1080 (generally, an AGM handler is one or more handlers that receives an Array Generation Message (AGM) (generally, an AGM may be a message, triggered by an Array Generation Event initiating an Array Generation Process, that may continue the Array Generation Process upon reception by the AMC; the Array Generation Message may include 1) one or more Resource IDs and/or the Browser Window IDs and/or Tab IDs and/or Rendered View IDs to be included in the intended Array and 2) information indicating to the AMC to generate and manage the intended Array; an AGM may include all, part, or none of a Resource Payload's elements, including a Resource's Visual Designator, for one or more Resource IDs conveyed in the AGM)), and Event X AMH 1082 (generally, an Event X AMH may be one or more Array Management Handlers (AMH)s that receives an Event X Message and may initiate an Array Responsive Action Process; more generally, an AMH may be a handler used in the generation, management, and governing of the behavior of one or more Arrays). As shown, an AMC may include the following other functions and logic: Resource-Pane Visual Designator Matching 1084 (the matching of a Pane and Resource by virtue of each being associated with a common Visual Designator; Resource-Pane Visual Designator Matching 1084 is described in greater detail in FIG. 11), and Browser Window sizing and positioning 1086.

To provide additional context for the description above, the following relates the information elements shown in FIG. 3 to those of the "Education" example: the AMC XY 1064 would be termed the AMC FC, to indicate that the AMC FC generates, manages, and governs the behavior of an Array associated with the Visual Designators Focus or Context; a Resource associated with Focus would be displayed on a Pane L, the left half of the Client Area 1030 of the Display Device 1010; a Resource associated with Context would be displayed on a Pane R, the right half of the Client Area of the Display Device (while each Pane is associated to a specific Visual Designator in the "General" and "Education" examples herein, these relationships can be altered for a given AMC. For example, for AMC FC the Visual Designator Focus could be associated with Pane R and the Visual Designator Context could be associated with Pane L, thus, switching the side of the Display Device on which each Resource of the Array is displayed. In such a case, the same AMC FC might be better termed AMC CF. Likewise, a similar switch in the "General" example might make AMC XY 1064 better termed AMC YX.) The Pane Layout 1,2 1066 and PCPs 1068a would be the Pane Layout LR, composed of Pane L and Pane R defined by PCPs 1068a; the Tab Data Set would be a Tab Data Set 1074 similar to that in the Tab Data Set 1074a of FIGS. 12-16; the Resource Data Set 1026 would include a Resource ID Data Set 1088 (shown and discussed in detail in FIG. 10); the General Tab and Browser Window Event handlers 1076 would be those associated with the Tab Data Management System (TDMS) such as the TDMS described in detail for the Tab Data Set 1074a of FIGS. 12-16; the Array Tab tracking handler 1078 would be responsible for tracking an AMC FC's Tab Data Attribute Sets similar to what is described in the Tab Data Set FIGS. 12-16; the AGM handler 1080 would receive one or more AGMs; the Event X AMH 1082 could be that responsible for initiating (upon receiving a Navigate Message that continues a Navigation Process or other navigation process, from the third and fourth Resources associated with the Group Education, Sub-Group Ancient Rome, and Focus) an Array Responsive Action Process that initiates a navigation from the first Resource (one or more Google Map Views of the Colosseum) associated with the Group Education, Sub-Group Ancient Rome, third Focus Resource (a chapter of an eTextbook on Roman Engineering), and Context Visual Designator, to the first Resource (one or more Google Map Views of the Roman Forum) associated with the Group Education, Sub-Group Ancient Rome, fourth Focus Resource (an educational video on the Roman Forum), and Context Visual Designator; the Resource-Pane VD "matching" 1084 function would perform the function shown in the "matching" figure discussed below; and the Browser Window sizing and positioning 1086 function would size and position each Resource associated with Group Education, Sub-Group Ancient Rome, and Focus Visual Designator to the Pane L on the left half of the Client Area of the Display Device and size and position each Resource associated with Group Education, Sub-Group Ancient Rome, a Resource associated with Focus Resource, and Context Visual Designator to the Pane R on the right half of the Client Area of the Display Device.

FIG. 4 shows how some of the functional components of the Array Management Complex of the "General" example of FIG. 3 of system 1000 may be slightly modified to those of system 1001. As shown, an example of data that may be included with or made accessible to an AMC, AMC XY 1065 in this case, may include the following: Pane Layout 1, 2 1067 and associated PCPs 1069a, Visual Designator X 1070, Visual Designator Y 1072, Rendered View Data Set 1075 (described in detail in FIGS. 17-21), and Resource Data Set 1026. As FIG. 9 will show, the Pane Layout 1, 2 1067 and associated PCPs 1069a differ from Pane Layout 1, 2 1066 and associated PCPs 1068a primarily because the former define Panes as areas within the Canvas Area 1031 of a single Browser Window 1013 while the latter define Panes as areas within the Client Area 1030. As shown, the AMC XY 1065 (or any AMC) may include the following handlers: one or more General Rendered View, Tab, and Browser Window Event handlers 1077, Array Rendered View tracking handlers 1079, AGM handlers 1081, and Event X AMH 1083. These components differ from those of the "General" example primarily by adding an additional tracking layer and data element to take into account the presence of more than one Rendered View and the simultaneous display of the latter Rendered Views' Resources within a single Browser Window 1013. As shown, an AMC may include the following other functions and logic: Resource-Pane Visual Designator Matching 1085 and Rendered View sizing and positioning 1087. These components differ from those of the "General" example primarily to account for their use of Panes defined within the Canvas Area 1031 of a single Browser Window 1013 rather than Panes defined by the entire Client Area 1030 of Display Device 1010.

FIG. 5 is intended to help clarify several of the concepts and processes described in this disclosure by providing a visual representation that focuses on a "General" example of Visual Designators residing in a Visual Designator Data 1090 data structure that may be directly in and/or accessible by the AMC XY 1064. This figure is provided for the sake of clarity and does not imply that Visual Designators must exist as a single data structure. The Visual Designators may be made available for use by the Application Controller 1040 and AMC XY 1064 in a variety ways including the following: as part of multiple data structures within the Resource Data Set 1026; as part of the AMC XY 1064 and/or Application Controller 1040 code itself.

To provide additional context for the description above, the following relates the information elements shown in FIG. 5 to those of the "Education" example described throughout this disclosure: the Visual Designator X 1070 would correspond to the Visual Designator Focus; the Visual Designator Y 1072 would correspond to the Visual Designator Context.

FIG. 6 is intended to help clarify several of the concepts and processes described in this disclosure by providing a visual representation that focuses on a "General" example of how PCPs may exist and define Panes of a Pane Layout and each of those Panes may be associated with a Visual Designator (X or Y). As shown, each Pane, Pane 1 1092 and Pane 2 1094, is defined by both Position and Size PCPs. The "x" and "y" coordinates of each are meant to provide a non-limiting visual representation of the concept of the Position and Size parameters that may be used to define a Pane in the Client Area 1030 of a Display Device 1010. Position and Size can be calculated using a variety of variables and Display Device attributes and may be represented in a code base by characters other than "x" or "y"; the "x" and "y" coordinates are in no way related to the "X" and "Y" of Visual Designators X 1070 and Y 1072.

Also, this example does not imply that PCPs must exist in the same form or structure shown in this figure. The PCPs may be made available for use by the AMC XY 1064 in a variety ways including the following: as part of multiple data structures within the Resource Data Set 1026; as part of one or more structures within the Application Controller 1040 and/or AMC XY 1064 code itself.

PCPs may be composed of variables and Display Device attributes, PCPs define Panes, and Panes may be associated with one or more Visual Designators. The PCPs represented here also may be altered both in form and number.

It is important to note that the RSPP includes processes similar to the Array Generation Process and Array Responsive Action Process in which a Visual Designator may be the PCPs of a Pane itself.

To provide additional context for the description in the preceding paragraphs, the following relates the information elements shown in FIG. 6 to those of the "Education" example described earlier in this disclosure: Pane 1 1092 would correspond to Pane L and the left half of the Client Area of the Display Device; the Visual Designator X 1070 with which Pane 1 is associated would correspond to the Visual Designator Focus; Pane 2 1094 would correspond to Pane R and the right half of the Client Area of the Display Device; the Visual Designator Y 1072 with which Pane 2 is associated would correspond to the Visual Designator Context.

FIG. 7 shows how the PCPs and Panes of the "General" example of FIG. 6 of system 1000 may be slightly modified to those of system 1001; the association of the PCPs and Panes with Visual Designators does not need to change.

As shown, each Pane, Pane 1 1093 and Pane 2 1095, may be defined by both Position and Size PCPs. The "x" and "y" coordinates of each are meant to provide a non-limiting visual representation of the concept of the Position and Size parameters that may be used to define a Pane in the Canvas Area 1031 of a Browser Window 1013 of Display Device 1010. Position and Size can be calculated using a variety of variables including those necessary to programmatically reposition and/or resize each Pane as the Browser Widow 1013 is repositioned and/or resized so that each Pane represents a relative portion of the Canvas Area 1031 rather than a fixed portion of the Display Device 1010. For example, as the Canvas Area 1031 of Browser Window 1013 decreases in width and height, the variables of the parameters represented by the "x" and "y" coordinates in FIG. 7 may be used to affect a corresponding resize of the width and height of Pane 1 1093 and Pane 2 1095. Doing so would ensure that each Pane maintains the same relative position and size within the available Canvas Area 1031 before and after a resize of Browser Window 1013. As in FIG. 6 the PCP variables and attributes may be represented in a code base by characters other than "x" or "y"; and the "x" and "y" coordinates are in no way related to the Visual Designators X 1070 and Y 1072.

FIG. 8 is intended to help clarify several of the concepts and processes described in this disclosure by providing a visual representation that focuses on a "General" example of how Panes may define areas on Display Device 1010 by virtue of each Pane's PCPs. As shown in this figure, it may be desirable to configure an Array of two Panes with each Pane occupying half of the Client Area 1030 of the Display Device 1010. To ensure each Pane occupies "half" of the Client Area 1030 of any Display Device 1010, it may be desirable to make the Position and Size parameters dependent on one or more attributes, including screen pixel location of the Display Device on which the Array will be displayed so that the Position and Size may vary between Display Devices as needed. PCPs can be calculated programmatically so that the Array Panes' Position and Size vary with the size, quality, and number of the user's Display Device in order to provide an Array in which Panes maintain a consistent relative position and size across Display Devices. In this figure, Pane 1 1092 is defined by the PCP coordinates associated with Pane 1 in FIG. 6 and Pane 2 1094 is defined by the PCP coordinates associated with Pane 2 in FIG. 6. It is important to note that each Pane Layout may be altered both in form and number of Panes and that more than one Pane Layout may be made available to one or more AMCs. For example, Pane Layout 1, 2 1066 may be altered so that Pane 1 1092 and Pane 2 1094 each compose less than half of the Client Area 1030 of the Display Device 1010; also, another Pane Layout, Pane Layout 1, 2, 3 may exist that fits Pane 1 to the left half, Pane 2 to the right top half, and Pane 3 to the bottom right half of the Client Area of the Display Device; the latter Pane Layout 1, 2, 3 maybe associated with an AMC ZYX. There are many possible configurations including those that include multiple display devices.

To provide additional context for the description above, the following relates the information elements shown in FIG. 8 to those of the "Education" example described throughout this disclosure: Pane 1 1092 would correspond to Pane L and the left half of the Client Area of the Display Device and constitute one Pane of the Pane Layout L, R of the Array to be generated and managed by the AMC FC; Pane 2 1094 would correspond to Pane R and the right half of the Client Area of the Display Device and constitute one Pane of the Pane Layout L, R of the Array to be generated and managed by the AMC FC.

FIG. 9 shows how the PCPs and Panes of the "General" example of system 1000 of FIG. 8 may be slightly modified to those of system 1001. FIG. 9 provides a visual representation of an example of how Panes may define areas on the Canvas Area 1031 of a Browser Window 1013 of Display Device 1010 by virtue of each Pane's PCPs. As shown in this figure, it may be desirable to configure an Array of two Panes with each Pane occupying half of the Canvas Area 1031 of the Browser Window 1013 of Display Device 1010. To ensure each Pane occupies "half" of the Canvas Area 1031, it may be desirable to make the Position and Size parameters dependent on one or more variables and/or attributes, including the size and position of the Canvas Area of the Browser Window 1013 in which the Array will be displayed. PCPs can be calculated programmatically so that the Array Panes' Position and Size vary with the those of the Browser Window 1013 in order to provide an Array in which Panes maintain a consistent relative position and size. In this figure, Pane 1 1093 is defined by the PCP coordinates associated with Pane 1 in FIG. 7 and Pane 2 1095 is defined by the PCP coordinates associated with Pane 2 in FIG. 7. It is important to note that each Pane Layout may be altered both in form and number of Panes and that more than one Pane Layout may be made available to one or more AMCs. There are many possible configurations including those that include multiple display devices.

FIG. 10 is intended to help clarify several of the concepts and processes described in this disclosure by providing a visual representation that focuses on a "General" example of a Resource ID Data Set 1088 structure and how a Resource of a Resource Set may exist and be associated with a Visual Designator and associated with a Pane defined by PCPs. The Resource Data attributes listed under each Resource "i", are those Resource ID Data Attributes commonly part of each Resource's Resource ID Data Attribute Set. However, this example does not imply that the Resource ID Data Attributes shown in this figure must exist in the form and structure of a Resource ID Data Attribute Set. There are a number of ways in which the Resource ID Data Attributes shown in this figure may be organized, structured, and made available to the Application Controller and AMC XY as part of the Resource Data Set 1026 for use in the RSPP. Each Resource of a Resource Set may be associated with a Visual Designator that has been associated with a Pane defined by PCPs. As noted, the RSPP includes processes similar to the Array Generation Process and Array Responsive Action Process in which a Visual Designator may be the PCPs of a Pane itself.

In this "General" example, each Resource associated with a Visual Designator Y is associated with a specific Resource associated with a Visual Designator X. For example, there is a Resource 3 with the Resource Data attributes: Resource ID 3, URI 5, Group 1, Tag 1A, and VD X. Also, there is a Resource 5 with the Resource Data attributes: Resource ID 5, URI 7, Group 1, Tag 1A, Resource 3, and VD Y. For another example there is a Resource 4 with the Resource Data attributes: Resource ID 4, URI 6, Group 1, Tag 1A, and VD X. Also, there is a Resource 6 with the Resource Data attributes: Resource ID 6, URI 8, Group 1, Tag 1A, Resource 4, and VD Y. As shown, Resource 5 has been associated with Resource 3 and, as such, has been given the attribute Resource 3 indicating it is associated with that specific Resource; Resource 3 is not given the attribute Resource 5. However, each set of Resources associated with a Visual Designator do not have to be linked to a specific Resource within the Resource Set that has been associated with a different Visual Designator. For example, Resources 5 and 6 still could be associated with a Visual Designator Y for Group 1, Sub-Group Tag 1A by removing the linkage of each to Resource 3 and Resource 4, respectively. More generally, each Resource of a Resource Set may be associated with a Visual Designator that has been associated with a Pane defined by PCPs.

To provide additional context for the description above, the following relates the information elements shown in FIG. 10 to those of the "Education" example described throughout this disclosure: Resource 3 could correspond to the chapter of an eTextbook on Roman Engineering; Resource 3's Visual Designator X would be a Visual Designator Focus; Resource 4 could correspond to the educational video on the Roman Forum; Resource 4's Visual Designator X would be a Visual Designator Focus; Resource 5 could correspond to the one or more Google Map Street views of the Colosseum and be linked to Resource 3; Resource 5's Visual Designator Y would be a Visual Designator Context; Resource 6 could correspond to the one or more Google Map Street views of the Roman Forum and be linked to Resource 4; Resource 6's Visual Designator Y would be a Visual Designator Context.

Figure 11:
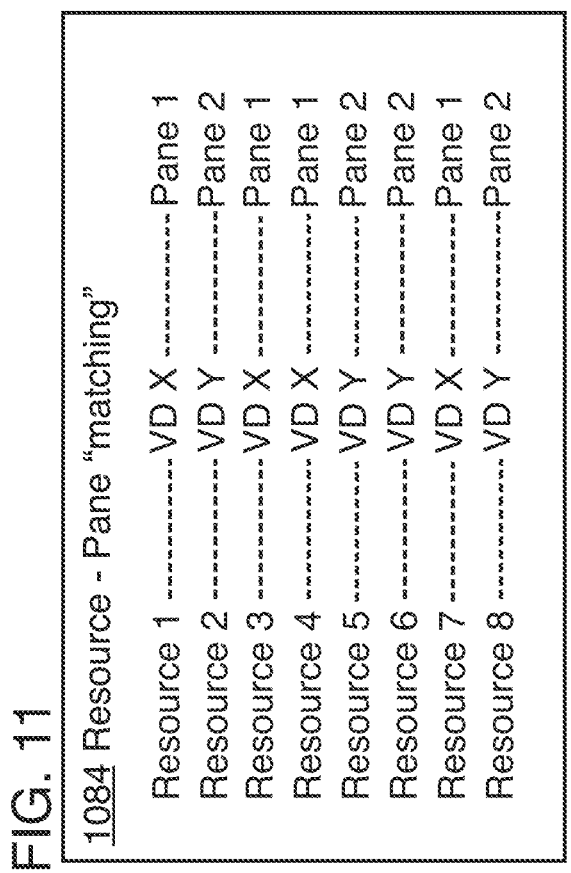
FIG. 11 is a graphical representation of matching digital resources to viewing areas by a common data element.

FIG. 11 is intended to help clarify several of the concepts and processes described in this disclosure by providing a visual representation that focuses on a "General" example of AMC XY 1064 having matched Resources of a Resource Set, each with a Pane of a Pane Layout defined by PCPs by virtue of the Visual Designators each Resource-Pane Pair has in common. This figure does not represent how this data would exist within either the Application Controller 1040, AMC XY 1064 or the Resource Data Set 1026. For example, Resource ID may be used in place of the concept of a Resource to affect the "matching" of a Resource and Pane by virtue of a common Visual Designator. Instead, the figure is meant to clarify that the function of "matching" Resources of a Resource Set and Panes of a Pane Layout may be carried out by the AMC. As noted, the RSPP may include processes similar to the Array Generation Process and Array Responsive Action Process in which a Visual Designator may be the PCPs of a Pane itself. In such a case, a component, similar in function to an AMC, may utilize a Visual Designator, or the immediate association between a Resource and a Pane, directly to affect the intended positioning of a Resource to a Pane of the Client Area 1030 (or, using the components of system 1001, to a Pane of the Canvas Area 1031 of Browser Window 1013).

To provide additional context for the description above, the following relates the information elements shown in FIG. 11 to those of the "Education" example described throughout this disclosure: Resource 3 could correspond to the chapter of an eTextbook on Roman Engineering; Resource 3's Visual Designator X would be a Visual Designator Focus; Pane L would correspond to the left half of the Client Area of the Display Device and constitute one Pane of the Pane Layout LR of the Array to be generated and managed by the AMC FC; the chapter of an eTextbook on Roman Engineering would be associated with the left half of the Client Area of the Display Device through "matching" by the AMC FC; Resource 5 could correspond to the one or more Google Map Street views of the Colosseum and be linked to Resource 3; Resource 5's Visual Designator Y would be a Visual Designator Context; Pane R would correspond to the right half of the Client Area of the Display Device and constitute one Pane of the Pane Layout LR of the Array to be generated and managed by the AMC FC; the one or more Google Map Street views of the Colosseum would be associated with the right half of the Client Area of the Display Device through "matching" by the AMC FC.

FIGS. 12, 13, 14, 15, 16, are intended to help clarify several of the concepts and processes associated with the use of a Tab Data Management System (TDMS) in one or more variants of the Array Generation Process and Array Responsive Action Process by providing a visual representation that focuses on a "General" example based on system 1000 components of how a TDMS may exist and in coordination with one or more AMCs, including an AMC XY 1064, accomplish goals including the following three: 1) reducing the number of tabs and browser windows open and displayed in a Display Device 1010 at a given time; 2) reducing the processing burden on the Local Computing Device 1002; and 3) reducing instances of code used for one or more variants of the Array Generation Process and Array Responsive Action Process and thus, the burden on initial development and subsequent maintenance of the code base.

In one of its simplest forms, the Array Generation Process, using the components of system 1000, may generate an Array by generating a new tab and browser window for each Array Resource of an Array. In circumstances in which Array generation occurs infrequently and/or the number of possible Arrays and/or Array Types (in terms of Pane Layout, Array Type behavior, etc.) is limited to one or a few, a less robust or no TDMS may be desirable. However, as the frequency of Array generation and/or the number of possible Arrays and/or Array Types increases, a more robust TDMS becomes increasingly important in order to accomplish the three goals stated above.

A TDMS may exist and in coordination with one or more AMCs, including an AMC XY 1064, accomplish the three goals mentioned above while providing the Application Controller the ability to generate and manage multiple Array Types and Instances. As shown in each figure, there are several data elements the TDMS can incorporate into a Tab Data Set 1074. In this "General" example showing Tab Data Set 1074a, each column of data elements has a header, Tab "i", with seven data elements listed under it. Each Tab "i" represents a single Tab 1014 open in a Browser Application 1032. The seven data elements under Tab "i" are its Tab Data Attributes. The set of seven Tab Data Attributes are collectively a Tab Data Attribute Set (the seven Tab Data Attributes listed do not imply that Tab Data Attributes must be limited to these seven). For example, Tab "3"'s Tab Data Attribute Set, third from the left on the top row of FIG. 14, shows the following Tab Data Attributes for Tab "3": Tab ID 3, Window ID 1, Resource ID 3, VD X, Related Tab ID 15, None, and AMC ID XY. Tab ID 3 is the Tab ID assigned to Tab "3" by the Browser Application 1032. Resource ID 3 is the Resource ID of the Resource displayed in Tab "3". Window ID 1 is the Window ID assigned to the Browser Window 1012 in which Tab "3" is displayed. VD X is the Visual Designator associated with Resource 3. Related Tab ID 15 is the Tab ID of the Tab displaying the second Resource of the Array of which Resource 3 of Tab "3" is a part. None indicates there is not another related Tab in the Array of which Resource 3 of Tab "3" is a part. AMC ID XY is the attribute that indicates both that a Tab is part of an existing Array and which AMC is managing the existing Array; the XY is meant to represent that the AMC managing the Array is one managing an Array with two Visual Designators, X and Y, each of which may correspond to a single Pane of the Array's Pane Layout and a Resource of a Resource Set. As indicated, Tab "15" is the second Array Tab of the Array of which Tab "3" and Tab "15" are a part. As shown in FIG. 14, Tab "15" displays Resource 5 which is associated with the VD Y and Tab ID 3 of Tab "3".

FIG. 12: During the lifecycle of a Tab, the Tab Data Attributes will be formed and updated by the TDMS. In this example, the TDMS is assumed to be a set of shared handlers and logical components from one or more AMCs, including AMC XY 1064. As shown in this figure, Tab "3" comes into existence displaying a page of a non-Resource URI. The TDMS may contain one or more handlers that listen for and capture Tab creation events. Upon receiving the Tab ID (Tab ID 3) and Browser Window ID (Window ID 1) assigned to the newly created Tab, the TDMS can respond by creating a new Tab Data Attribute Set and writing Tab ID 3 and Window 1 to the Tab ID and Window ID Tab Data Attributes, respectively. In this example, Tab "3" initially displays the page of a non-Resource URI, www.google.com. As implied in this figure, the Application Controller 1040 and/or AMC, including AMC XY 1064, can retrieve and/or receive the URI of Tab "3", and check the URI against the URIs of existing Resources. In the case where the URI is found to be a non-Resource URI, as in this example, the TDMS may write the URI to the Tab Data Attribute set. Because Tab "3" displays a Non-Array, non-Resource, there are no Tab Data Attributes for Visual Designator or related tabs at this point.

The last Tab Data Attribute shown is TNAT. In order to minimize the number of open tabs, an AMC may recognize Targeted Non-Array Tabs (TNAT)s. Each AMC may have unique criteria for determining what tabs will constitute that AMC's TNATs. For example, one AMC may target only tabs displaying a page of a URI of an email provider or a Non-Array Tab displaying the same Resource as an Array Tab while another AMC may target only tabs displaying www.google.com or a Non-Array Tab displaying the same Resource as an Array Tab. The "General" example for this figure assumes that each AMC has the same criteria for determining a TNAT and only target tabs displaying www.google.com or a Non-Array Tab displaying the same Resource as an Array Tab. Therefore, as shown in this figure, Tab "3"'s initial URI, www.google.com, gets recognized as that of a TNAT and has that attribute written to its Tab Data Attributes. In this figure, Tab "15"'s Tab Data Attributes are the same as those of Tab "3".

FIG. 13: Later in Tab "3"'s lifecycle its URI might change to that of a Resource URI, such as one of Resource 3's URIs. The Application Controller 1040 and/or AMC, including AMC XY 1064, can receive indications of and respond to the URI change event by checking the Tab's new URI against existing Resource URIs and replacing the existing Tab's former URI, www.google.com, with the URI and/or Resource ID identifying the URI as that of an existing Resource. In this case, Tab "3"'s URI changes to a URI of Resource ID 3 and has that ID written to its Tab Data Attribute Set. Once the page of the URI displayed has been determined to be that of a Resource, the TDMS, Application Controller 1040 and/or AMC, including AMC XY 1064, can retrieve the one or more Visual Designators associated with the Resource ID and write this Visual Designator as a Tab Data Attribute. In this example, the Visual Designator is VD X. Because Tab "3" displays a Non-Array Resource, Tab "3" does not have Tab Data Attributes for related tabs or an AMC. Tab "3"'s TNAT attribute gets removed because Tab "3" no longer meets the TNAT criteria of the AMCs. However, Tab "15", still displaying www.google.com, remains a TNAT and as a TNAT maybe targeted by an AMC during an Array Generation Process. The following figure, FIG. 14, assumes an Array Generation Process is initiated for AMC XY 1064.

FIG. 14: Frequently, and as assumed in this example, Arrays may be generated from an Application UI in a displayed Resource Page. The tab displaying a Resource Page and Application UI from which an Array Generation Event and AGM is initiated may be specified in the AGM as one to be included in the Array to be created, managed, and whose behavior may be governed by the AMC; the latter is assumed in this example as well and, thus, the AMC XY 1064 writes its ID, AMC ID XY, as a Tab Data Attribute of Tab "3", acknowledging that Tab "3" is one of the tabs AMC XY 1064 will manage and govern during the lifecycle of the Array it will manage. AMC XY 1064 may also retrieve Tab "3"'s Resource ID, Resource ID 3, and Visual Designator, VD X. This example assumes that the Resources associated with VD Y are associated to the Resources associated with VD X (this relationship is the same as that between Resources associated with Focus (VD X) and Resources associated with Context (VD Y) as discussed in the "Education" example used throughout this disclosure). Therefore, upon receiving Resource ID 3, the AMC XY 1064 can understand that it will need to retrieve the Resource ID and Visual Designator for a Resource associated with Resource 3. The AMC XY 1064 may first retrieve the Resource ID of one of Resource 3's related Resources by querying the Resource Data Set 1026 which contains this information for Resource 3. Once this Resource ID is received the AMC XY 1064 can then retrieve the Visual Designator from the latter Resource ID's Resource Data in the Resource Data Set 1026. This example assumes the Resource ID is Resource ID 5 and its Visual Designator is Y. Upon receiving the information defining what Resource and Visual Designator the AMC XY 1064 will need to complete its Array, the AMC XY may query the Tab Data Set 1074a to determine whether a TNAT (either a Non-Array Tab exists displaying Resource ID 5 or www.google.com) exists that it can use as the second tab of its Array to avoid needlessly generating a new tab. In this case, such a query identifies Tab "15" as a TNAT and returns that information to the AMC XY 1064. The Application Controller 1040 and/or AMC XY 1064 may then affect the process to change Tab "15"'s displayed page to that of the page of the URI of Resource 5 and incorporate Tab "15" into the Array containing Tab "3", ultimately writing to Tab "15"'s Tab Data Attributes the AMC XY's ID, AMC ID XY. In addition, in order to differentiate the Array containing Tabs "3" and "15" from another AMC XY Array (such as that containing Tabs "5" and "8"), the AMC XY 1064 can also write to Tab "3"'s Tab Data Attribute Set that it is related to Tab "15" and to Tab "15"'s Tab Data Attribute Set that it is related to Tab "3".

The Tab Data Attribute Sets for Tab "3" and "15" in this figure reflect that the Array Generation Process has completed for Tab "3" and Tab "15". For the next figure it is important to note that in this figure Tab "4" displays the Resource Page of a URI of Resource ID 4 which is associated with VD X, that Tab "16" displays the Resource Page of a URI of Resource ID 6 which is associated with VD Y, and neither Tab "4" nor "16" have been assigned a TNAT attribute.

FIG. 15: This figure assumes that some time after the Array Generation Process has been completed for Tab "3" and "15", an Array Responsive Action Process is initiated for the Array by affecting a Navigation Process or other navigation process in Tab "3" from the Resource Page of a URI of Resource ID 3 to the Resource Page of a URI of Resource ID 4. Because, in this example, the Resources in the Array associated with VD Y are associated with a specific Resource in the Array associated with VD X, the navigation from a URI of Resource ID 3 to that of a URI of Resource ID 4 affects a responsive Navigation Process or other navigation process in Tab "15" from the URI of Resource ID 5 which is associated specifically to Resource ID 3 to that of a URI of Resource ID 6 which is associated specifically to Resource ID 4. As the events occur that generate data elements constituting the Tab Data Attributes for the Tab Data Attribute Sets for Tab "3" and Tab "15", each may be written to the Tab Data Set, updating the Tab Data Set to reflect the current state of each Tab, its displayed Resource, and the relationship of both to the Array of which they are a part.

The Tab Data for Tab "3" and "15" in FIG. 15 reflects that the Array Responsive Action Process has completed for Tab "3" and Tab "15". This figure also shows Tab "4" and "16" both now have become TNAT. The reason for the latter being that each tab now displays a Non-Array Resource that is the same as an Array Resource; Tab "4" displays a Resource Page of the URI of Resource ID 4 which, for this example, is the same Resource Page of the URI of Resource ID 4 displayed in Tab "3"; Tab "16" displays a Resource Page of the URI of Resource ID 6 which, for this example, is the same Resource Page of the URI of Resource ID 6 displayed in Tab "15".

FIG. 16: This figure shows Tab "15" has been deleted and replaced in the Array governing Tab "3" with Tab "16", formerly a TNAT. Tab "3" now reflects that it is related to Tab "16" and Tab "16" reflects that it is now related to Tab "3".

As described, during one or more variants of both the Array Generation Process and Array Responsive Action Process a TDMS in coordination with one or more AMCs may track and manage the tabs of one or more Arrays of one or more Array Types while reducing 1) the number of tabs and browser windows open and displayed in a Display Device 1010 at a given time; 2) the processing burden on the Local Computing Device 1002; and 3) instances of code used for one or more variants of the Array Generation Process and Array Responsive Action Process and thus, the burden on initial development and subsequent maintenance of the code base. As noted, the RSPP may include processes similar to the Array Generation Process and Array Responsive Action Process in which a Visual Designator may be the PCPs of a Pane itself. Also as noted, in such a case, a component, similar in function to an AMC, may utilize a Visual Designator, or the immediate association between a Resource and a Pane, directly to affect the intended positioning of a Resource to a Pane of the Client Area 1030. During the processes similar to the Array Generation Process and Array Responsive Action Process in which a Visual Designator may be the PCPs of a Pane itself, this component, in coordination with a TDMS variant similar to the example TDMS described in FIGS. 12-16, may track and manage the tabs of one or more groups of Resources.

FIGS. 17, 18, 19, 20, 21, are intended to help clarify several of the concepts and processes associated with the use of a Rendered View Data Management System (RVDMS) in one or more variants of the Array Generation Process and Array Responsive Action Process by providing a visual representation that focuses on an example based on system 1001 components of how a RVDMS may exist and in coordination with one or more AMCs, including an AMC XY 1065, accomplish goals including the following three: 1) reducing the number of Rendered Views, tabs, and browser windows open and displayed in a Display Device 1010 at a given time; 2) reducing the processing burden on the Local Computing Device 1002; and 3) reducing instances of code used for one or more variants of the Array Generation Process and Array Responsive Action Process and thus, the burden on initial development and subsequent maintenance of the code base.

In one of its simplest forms, the Array Generation Process, using the components of system 1001, may generate an Array by generating either a new Rendered View within a single browser window for each Array Rendered View of an Array or a new browser window and/or tab for each Array Tab of an Array. In circumstances in which Array generation occurs infrequently and/or the number of possible Arrays and/or Array Types (in terms of Pane Layout, Array Type behavior, etc.) is limited to one or a few, a less robust or no RVDMS may be desirable. However, as the frequency of Array generation and/or the number of possible Arrays and/or Array Types increases, a more robust RVDMS becomes increasingly important in order to accomplish the three goals stated above.

A RVDMS may exist and in coordination with one or more AMCs, including an AMC XY 1065, accomplish the three goals mentioned above while providing the Application Controller the ability to generate and manage multiple Array Types and Instances. As shown in each figure, there are several data elements the RVDMS can incorporate into a Rendered View Data Set 1075. In this example showing Rendered View Data Set 1075a, each column of data elements has a header, RV "i", with eight data elements listed under it. Each RV "i" represents a single Rendered View of a Browser Application 1033. The eight data elements under RV "i" are its Rendered View Data Attributes. The set of eight Rendered View Data Attributes are collectively a Rendered View Data Attribute Set (the eight Rendered View Data Attributes listed do not imply that Rendered View Data Attributes must be limited to these eight). For example, RV "3"'s Rendered View Data Attribute Set, third from the left on the top row of FIG. 19, shows the following Rendered View Data Attributes for RV "3": RV ID 3, Tab ID 3, Window ID 1, Resource ID 3, VD X, Related RV ID 15, None, and AMC ID XY. RV ID 3 is the RV ID assigned to RV "3" by the Browser Application 1033. Tab ID 3 is the Tab ID of the Tab in which Resource 3 is displayed. Resource ID 3 is the Resource ID of the Resource displayed in RV "3". Window ID 1 is the Window ID assigned to the Browser Window 1013 in which RV "3" is displayed. VD X is the Visual Designator associated with Resource 3. Related RV ID 15 is the RV ID of the RV displaying the second Resource of the Array of which Resource 3 of RV "3" is a part. None indicates there is not another related RV in the Array of which Resource 3 of RV "3" is a part. AMC ID XY is the attribute that indicates both that a RV is part of an existing Array and which AMC is managing the existing Array; the XY is meant to represent that the AMC managing the Array is one managing an Array with two Visual Designators, X and Y, each of which may correspond to a single Pane of the Array's Pane Layout and a Resource of a Resource Set. As indicated, RV "15" is the second Array Rendered View of the Array of which RV "3" and RV "15" are a part. As shown in FIG. 19, RV "15" displays Resource 5 which is associated with the VD Y and RV ID 3 of RV "3".

FIG. 17: During the lifecycle of a RV, the Rendered View Data Attributes will be formed and updated by the RVDMS. In this example, the RVDMS is assumed to be a set of shared handlers and logical components from one or more AMCs, including AMC XY 1065. As shown in this figure, RV "3"

comes into existence displaying a page of a non-Resource URI. The RVDMS may contain one or more handlers that listen for and capture events indicating RV creation. Upon receiving the RV ID (RV ID 3), Tab ID, and Browser Window ID (Window ID 1) assigned to the newly created RV, the RVDMS can respond by creating a new Rendered View Data Attribute Set and writing RV ID 3, Tab 3, and Window 1 to the RV ID, Tab ID, and Window ID Rendered View Data Attributes, respectively. In this example, RV "3" initially displays the page of a non-Resource URI, www.google.com. As implied in this figure, the Application Controller 1041 and/or AMC, including AMC XY 1065, can retrieve and/or receive the URI of RV "3", and check the URI against the URIs of existing Resources. In the case where the URI is found to be a non-Resource URI, as in this example, the RVDMS may write the URI to the Rendered View Data Attribute set. Because RV "3" displays a Non-Array, non-Resource, there are no Rendered View Data Attributes for Visual Designator, or related Rendered Views at this point.

The last Rendered View Data Attribute shown is TNARV. In order to minimize the number of open Rendered Views, tabs, and browser windows an AMC may recognize Targeted Non-Array Rendered Views (TNARV)s. Each AMC may have unique criteria for determining what Rendered Views will constitute that AMC's TNARVs. For example, one AMC may target only Rendered Views displaying a page of a URI of an email provider or a Non-Array Rendered View displaying the same Resource as an Array Rendered View while another AMC may target only Rendered Views displaying www.google.com or a Non-Array Rendered View displaying the same Resource as an Array Rendered View. The example for this figure assumes that each AMC has the same criteria for determining a TNARV and only targets Rendered Views displaying www.google.com, www.bing.com or a Non-Array Rendered View displaying the same Resource as an Array Rendered View. Therefore, as shown in this figure, RV "3"'s initial URI, www.google.com, gets recognized as that of a TNARV and has that attribute written to its Rendered View Data Attributes. Likewise RV "15"'s initial URI, www.bing.com, gets recognized as that of a TNARV and has that attribute written to its Rendered View Data Attributes.

FIG. 18: Later in RV "3"'s lifecycle its URI might change to that of a Resource URI, such as one of Resource 3's URIs. The Application Controller 1041 and/or AMC, including AMC XY 1065, can receive indications of and respond to the URI change event by checking the RV's new URI against existing Resource URIs and replacing the existing RV's former URI, www.google.com, with the URI and/or Resource ID identifying the URI as that of an existing Resource. In this case, RV "3"'s URI changes to a URI of Resource ID 3 and has that ID written to its Rendered View Data Attribute Set. Once the page of the URI displayed has been determined to be that of a Resource, the RVDMS, Application Controller 1041 and/or AMC, including AMC 1065, can retrieve the one or more Visual Designators associated with the Resource ID and write this Visual Designator as a Rendered View Data Attribute. In this example, the Visual Designator is VD X. Because RV "3" displays a Non-Array Resource, RV "3" does not have Rendered View Data Attributes for related Rendered Views or an AMC. RV "3"'s TNARV attribute gets removed because RV "3" no longer meets the TNARV criteria of the AMCs. However, RV "15", still displaying www.bing.com, remains a TNARV and as a TNARV maybe targeted by an AMC during an Array Generation Process. The following figure, FIG. 19, assumes an Array Generation Process is initiated for AMC XY 1065.

FIG. 19: Frequently, and as assumed in this example, Arrays may be generated from an Application UI in a displayed Resource Page. The Rendered View of a Resource Page and Application UI from which an Array Generation Event and AGM is initiated may be specified in the AGM as one to be included in the Array to be created, managed, and whose behavior may be governed by the AMC; the latter is assumed in this example as well and, thus, the AMC XY 1065 writes its ID, AMC ID XY, as a Rendered View Data Attribute of RV "3", acknowledging that RV "3" is one of the Rendered Views AMC XY 1065 will manage and govern during the lifecycle of the Array it will manage. AMC XY 1065 may also retrieve RV "3"'s Resource ID, Resource ID 3, and Visual Designator, VD X. This example assumes that the Resources associated with VD Y are associated to the Resources associated with VD X (this relationship is the same as that between Resources associated with Focus (VD X) and Resources associated with Context (VD Y) as discussed in the "Education" example used throughout this disclosure). Therefore, upon receiving Resource ID 3, the AMC XY 1065 can understand that it will need to retrieve the Resource ID and Visual Designator for a Resource associated with Resource 3. The AMC XY 1065 may first retrieve the Resource ID of one of Resource 3's related Resources by querying the Resource Data Set 1026 which contains this information for Resource 3. Once this Resource ID is received the AMC XY 1065 can then retrieve the Visual Designator from the latter Resource ID's Resource Data in the Resource Data Set 1026. This example assumes the Resource ID is Resource ID 5 and its Visual Designator is Y. Upon receiving the information defining what Resource and Visual Designator the AMC XY 1065 will need to complete its Array, the AMC XY may query the Rendered View Data Set 1075*a* to determine whether a TNARV (either a Non-Array Rendered View exists displaying Resource ID 5 or www.google.com or www.bing.com) exists that it can use as the second Rendered View of its Array to avoid needlessly generating a new Rendered View and/or tab, and browser window. In this case, such a query identifies RV "15" as a TNARV and returns that information to the AMC XY 1065. The Application Controller 1041 and/or AMC XY 1065 may then affect the process to change RV "15"'s displayed page to that of the page of the URI of Resource 5 and incorporate RV "15" into the Array containing RV "3", ultimately writing to RV "15"'s Rendered View Data Attributes the AMC XY's ID, AMC ID XY. In addition, in order to differentiate the Array containing RV "3" and "15" from another AMC XY Array (such as that containing RV "5" and "8"), the AMC XY 1065 can also write to RV "3"'s Rendered View Data Attribute Set that it is related to RV "15" and to RV "15"'s Rendered View Data Attribute Set that it is related to RV "3".

The Rendered View Data Attribute Sets for RV "3" and "15" in this figure reflect that the Array Generation Process has completed for RV "3" and RV "15". For the next figure it is important to note that in this figure RV "4" displays the Resource Page of a URI of Resource ID 4 which is associated with VD X, that RV "16" displays the Resource Page of a URI of Resource ID 6 which is associated with VD Y, and neither RV "4" nor "16" have been assigned a TNARV attribute.

FIG. 20: This figure assumes that some time after the Array Generation Process has been completed for RV "3" and "15", an Array Responsive Action Process is initiated for the Array by affecting a Navigation Process or other navigation process in RV "3" from the Resource Page of a URI of Resource ID 3 to the Resource Page of a URI of Resource ID 4. Because, in this example, the Resources in the Array associated with VD Y are associated with a specific Resource in the Array associated with VD X, the navigation from a URI of Resource ID 3 to that of a URI of Resource ID 4 affects a responsive Navigation Process or other navigation process in RV "15" from the URI of Resource ID 5 which is associated specifically to Resource ID 3 to that of a URI of Resource ID 6 which is associated specifically to Resource ID 4. As the events occur that generate data elements constituting the Rendered View Data Attributes for the Rendered View Data Attribute Sets for RV "3" and RV "15", each may be written to the Rendered View Data Set, updating the Rendered View Data Set to reflect the current state of each Rendered View, its displayed Resource, and the relationship of both to the Array of which they are a part.

The Rendered View Data for RV "3" and "15" in FIG. 20 reflects that the Array Responsive Action Process has completed for RV "3" and RV "15". This figure also shows RV "4" and "16" both now have become TNARV. The reason for the latter being that each Rendered View now displays a Non-Array Resource that is the same as an Array Resource; RV "4" displays a Resource Page of the URI of Resource ID 4 which, for this example, is the same Resource Page of the URI of Resource ID 4 displayed in RV "3"; RV "16" displays a Resource Page of the URI of Resource ID 6 which, for this example, is the same Resource Page of the URI of Resource ID 6 displayed in RV "15".

FIG. 21: This figure shows RV "15" has been deleted and replaced in the Array governing RV "3" with RV "16", formerly a TNARV. RV "3" now reflects that it is related to RV "16" and RV "16" reflects that it is now related to RV "3".

As described, during one or more variants of both the Array Generation Process and Array Responsive Action Process a RVDMS in coordination with one or more AMCs can track and manage the Rendered Views of one or more Arrays of one or more Array Types while reducing 1) the number of Rendered Views, tabs, and browser windows open and displayed in a Display Device 1010 at a given time; 2) the processing burden on the Local Computing Device 1002; and 3) instances of code used for one or more variants of the Array Generation Process and Array Responsive Action Process and thus, the burden on initial development and subsequent maintenance of the code base. As noted, the RSPP may include processes similar to the Array Generation Process and Array Responsive Action Process in which a Visual Designator may be the PCPs of a Pane itself. Also as noted, in such a case, a component, similar in function to an AMC, may utilize a Visual Designator, or the immediate association between a Resource and a Pane, directly to affect the intended positioning of a Resource to a Pane of the Canvas Area 1031 of Browser Window 1013. During the processes similar to the Array Generation Process and Array Responsive Action Process in which a Visual Designator may be the PCPs of a Pane itself, this component, in coordination with a RVDMS variant similar to the example RVDMS described in FIGS. 17-21, may track and manage the Rendered Views of one or more groups of Resources.

Figure 22:
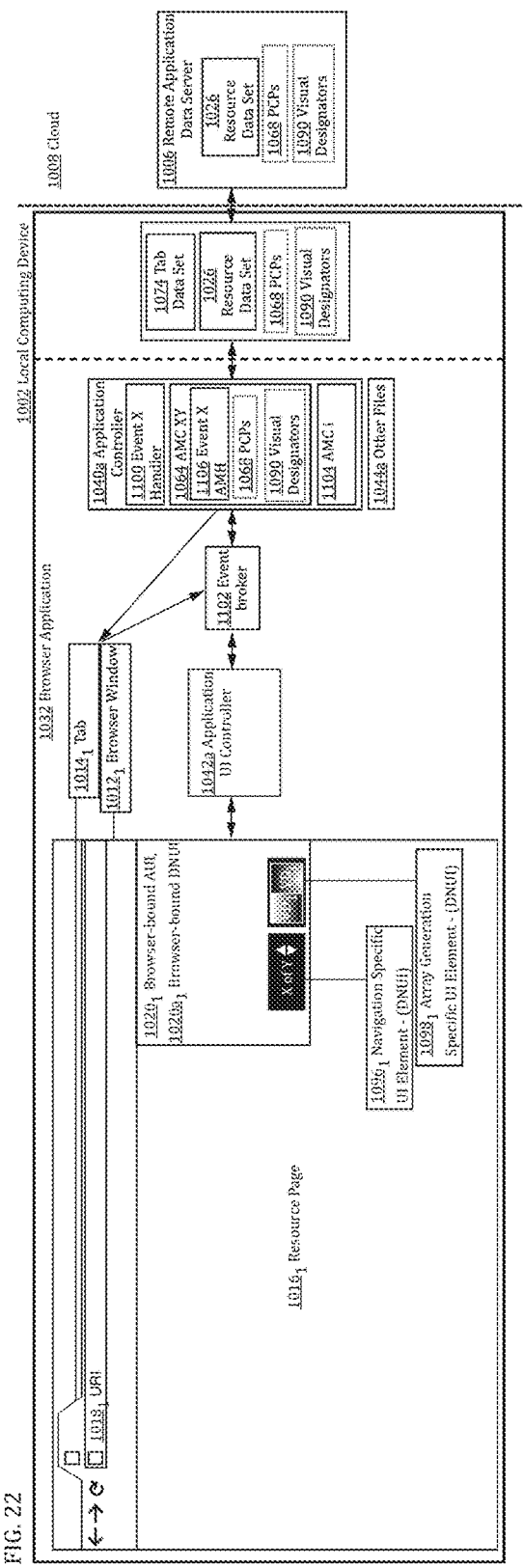
FIG. 22 is a block diagram illustrating a first example embodiment of user interface components, functional modules, and messaging for digital resource navigation and array generation using a browser-bound dynamic navigation user interface in a single browser window.
Figure 23:
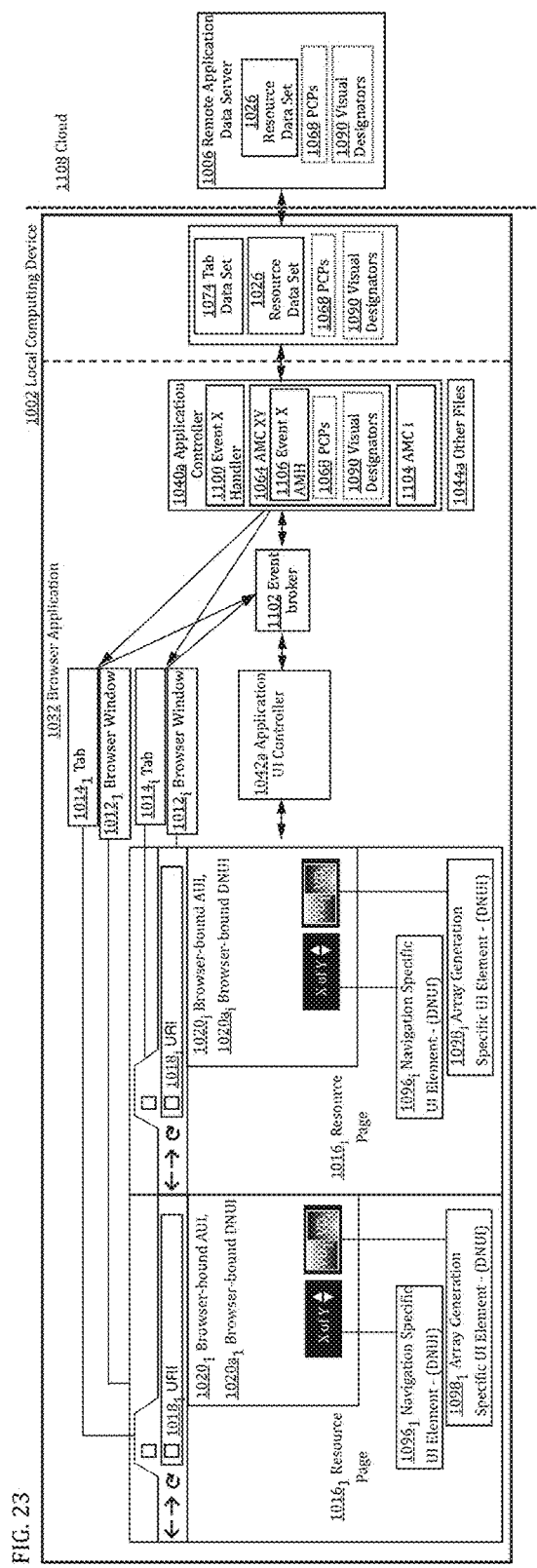
FIG. 23 is a block diagram illustrating a first example embodiment of user interface components, functional modules, and messaging for digital resource navigation, array generation, and responsive action using a browser-bound dynamic navigation user interface in multiple browser windows.

FIGS. 22 and 23 illustrate a "General" example based on system 1000 components of the messaging processes for variants of the Navigation Process, Array Generation Process, and Array Responsive Action Process that include the use of the Browser-bound AUI 1020. While following the "General" example, as indicated by the AMC XY 1064 shown in each figure, the figures illustrate and label many other components, sub-components, and data elements in a more conceptual way in order to represent (within the confines of a reasonably sized figure) the wide variety of Arrays, Array Types and Behavior, and responsive actions that may be incorporated in the messaging processes described below using system 1000. The labeling system is mostly the same as that described in FIG. 1. The subscript "1" will represent the first instance of a component, sub-component, or data element; the subscript "i" will represent one or more additional instances of the same. However, because each AMC may fulfill a different function, the concept of an "i" number of AMCs is represented slightly differently. In keeping with the "General" example, AMC XY 1064 embodies the first instance of an AMC; AMC i represents an "i" number of additional AMCs, each of which may be unique and create, manage, and govern the behavior of one or more Arrays of a unique Array Type.

In this example, the Browser-bound AUI 1020 is shown directly incorporated into the Browser Window 1012 of Display Device 1010 rather than in the Resource Page 1016 displayed in Browser Window 1012. The positioning of the Browser-bound AUI 1020 in the top-right corner of the Browser Window 1012, thus overlapping what would otherwise be the top-right corner of Resource Page 1016 area, is merely for the sake of example and other implementations, positioning, sizing, configurations, etc. are possible. For example, with slight modification of system 1000 components, the AUI represented in these figures as a Browser-bound AUI 1020 could be made to display and behave as a Page-bound AUI 1022 or 1024.

The Browser-bound AUI 1020 may take several forms, including the Dynamic Navigation UI and Resource Formation UI. In this example, two elements that may be part of a DNUI, the Navigation Specific UI Element 1096 and the Array Generation Specific UI Element 1098 (generally, an Array Generation Specific UI Element is an AUI element the selection of which may trigger an event initiating an Array Generation Process), are shown in the Browser-bound AUI 1020 and their communication with other components of system 1000 are described in detail. While the UI elements are often part of the DNUI, the method of communication between these or other similar elements in other AUIs and the Application may utilize the same system components and many of the same processes described herein. For this reason and that these other AUIs are not an essential part of the Navigation Process, Array Generation Process, and Array Responsive Action Process described herein, the description only includes the two AUI elements mentioned above in the example Browser-bound AUI 1020 and its inclusion in the messaging processes for the Navigation Process, Array Generation Process, and Array Responsive Action Process.

Because it offers a simplified view focusing on the elements often part of the Navigation Process, it may be useful to refer to just FIG. 22 for the following paragraph. Once a Resource Page $1016_1$ has been recognized as part of a Resource Set, the Browser-bound AUI $1020_1$, in the form of the Browser-bound DNUI $1020a_1$, may serve as both the starting and ending point of the Navigation Process. The start of the process may begin with the explicit representation on the Browser-bound DNUI $1020a_1$ of the current Resource Page's $1016_1$ place within the scope and sequence of the Resource Set of which the Resource Page is a part. Navigation Specific UI Elements $1096_1$ on the Browser-bound DNUI $1020a_1$, such as a directional arrows or buttons indicating the sequence such as "Next" and "Previous", are displayed in order to provide the means with which one or more Resources in the Resource Set can be accessed according to the Resource Set's creator's intended scope and sequence. One possible example of such a Navigation Specific UI Element 1096 is shown. In this example the "X" represents the displayed Resource's order within the numbered scope of the Resource Set of which the Resource is a part. For example, if the displayed Resource is the third resource within a Resource Set of five Resources, the "X" will be "3" and the "Y" will be "5". The arrows to the right of "X" and "Y" allow the user to access a next Resource with the Resource Set in a single click; this element can be displayed in the same place for each Resource and thus serve as a single point of selection to navigate sequentially, forwards or backwards, through the entire scope of the Resource Set. Upon selection of the Navigation Specific UI Element $1096_1$ the AUI Controller 1042a receives an indication of the event. The AUI Controller 1042a then messages the Application Controller's 1040a Event X Handler 1100 (Navigate Handler) through the Event Broker 1102 indicating a target Resource that the Browser should display based on the selection of the Navigation Specific UI Element $1096_1$. Generally, an Event X Handler may be one or more handlers the functions of which include receiving an Event X Message to continue one or more processes initiated by the Event X Message. Generally, an Event X Message is one or more messages published to initiate a sub-process of the RSPP. "X" represents the concept that there are many different Event Handlers and Messages, each supporting a different function. An Event X Handler may be a Navigate Handler. A Navigate Handler may be one or more handlers that receives the Navigate Message (described in detail below) to continue the Navigation Process. There may be more specific kinds of Navigate Handlers that may affect a specific kind of navigation. For example, to affect a navigation from a single Resource to another within the same Resource Set, a Navigate to Resource Message may be published for receipt by a Navigate to Resource Handler; to affect a navigation from a Resource Set to a different Resource Set, a Navigate to Resource Set Message may be published for receipt by a Navigate to Resource Set Handler. The Event Broker 1102 may represent the Browser Application 1032 messaging API. Upon receiving an indication of the message (a Navigate Message), the Application Controller 1040a changes document URI to that of the target Resource's Resource Page $1016_1$ intended for display in the target tab. A Navigate Message may be one or more messages 1) published upon selection of a Navigation Specific UI Element and/or initiating the Navigation Process; and 2) containing the information indicating the Resource and/or Resource Set to which the Browser Application should navigate and, if needed, the Rendered View or Rendered Views and/or tab or tabs in which to affect the navigation. There may be more specific kinds of Navigate Messages that may affect a specific kind of navigation. For example, to affect a navigation from a single Resource to another within the same Resource Set, a Navigate to Resource Message may used; to affect a navigation from a Resource Set to a different Resource Set, a Navigate to Resource Set Message may used. The Application Controller 1040a retrieves from the Resource Data Set 1026 the Resource Data sufficient to display the intended Resource. The Application Controller 1040a sends the Dynamic Navigation UI View State and Resource Data Message to the AUI Controller 1042a through the Event Broker ultimately resulting in the display of the target Resource's Resource Page $1016_1$ alongside its Browser-bound DNUI $1020a_1$. The process can begin again with the selection of the Navigation Specific UI Element $1096_1$.

Once one or more Resources of a Resource Set have been associated with a Pane of a Pane Layout by virtue of a common Visual Designator, the Browser-bound AUI 1020, frequently the Browser-bound DNUI 1020a, may serve as the starting point of the Array Generation Process. As noted above, while the Array Generation Specific UI Element $1098_1$ shown in this figure may be placed on other Browser-bound AUI, on those other AUIs the element would still use the same system components and methods of communication as shown and described below. Also as noted above, the Array Generation Process may be initiated without the Browser-bound AUI 1020 at all. However, because the Browser-bound AUI 1020 may be used and helps provide a useful visual representation of the first several steps of an Array Generation Process, the Browser-bound AUI 1020 has been included in the figure and description below.

The Array Generation Specific UI Element $1098_1$ on the Browser-bound AUI $1020_1$, to be utilized in an Array Generation Process initiated by Array Generation Event (AGE) triggered upon selection of the Array Generation Specific UI Element $1098_1$, is displayed on the AUI in order to provide the means by which an AGE may be triggered and an Array Generation Process initiated. As shown, it may be useful for the Array Generation Specific UI Element $1098_1$ to reflect something about the Array Type of the Array in which its selection would result; as such $VD_1$, a first Visual Designator, is shown in a box representing a first Pane; $VD_i$, one or more additional Visual Designators, is shown in a box representing one or more additional Panes. Upon selection of the Array Generation Specific UI Element $1098_1$ the AUI Controller 1042a receives an indication of the event. The AUI Controller 1042a then sends an AGM through the Event Broker 1102 to its target AMC and possibly other components of the Application Controller 1040a. In FIGS. 22 and 23, two blocks with "AMC" are shown: one with AMC XY 1064 and the other with AMC i 1104. AMC XY 1064 is a first instance of an AMC in the Application Controller and AMC i 1104 is any number of remaining AMCs an Application Controller may contain. AMC XY 1064 may be thought of as the target AMC for the AGM discussed. Each target AMC may listen for one or more unique AGMs prompted by an AGE intended to initiate an Array Generation Process that will generate an Array Type of the target AMC. The AGM conveys the information to the AMC to continue the Array Generation Process. The AGM may contain all, some, or none of the Resource ID and/or Tab Data Attributes for an AMC to carry out its Array generation and management function; these attributes may include the Resource ID and Tab ID of the Resource Page and Tab in which the AGM triggering Array Generation Specific UI Element $1098_1$ is displayed.

Because it offers a view focusing on additional elements for the Array Generation Process and Array Responsive Action Process, it may be useful to refer to FIG. 23 for the following two paragraphs. In an example implementation of the messaging processes of FIG. 23 the Event Broker may be used to broker messages between components (such as between the AUI Controller 1042a and Application Controller 1040a) even if not expressly described in the process below. Upon receiving an indication of the AGM, the AMC XY 1064 responds, and retrieves and/or recognizes the Resource Data (from the Resource Data Set 1026), Visual Designators and PCPs. In some variants of the Array Generation Process, the AMC XY may maintain a Tab Data Set 1074 by use of a TDMS, as described herein. To maintain the Tab Data Set 1074, the AMC XY may listen for Tab and Browser Window Events. The AMC XY can then "match" each Resource to one or more Panes by virtue of the Resource's and Pane's one or more common Visual Designators to display each Resource intended for display in the Array. The Application Controller 1040*a* and/or AMC XY 1064 causes each Array Resource to be displayed in a Tab 1014 of a Browser Window 1012. To do so, the Application Controller 1040*a* and/or AMC XY 1064 may cause one or more new Tabs $1014_i$ and Browser Windows $1012_i$ to be generated and display an Array Resource in order to fill the intended Array; this may happen in a variety of ways including with the use of a TDMS. Finally, the AMC XY 1064 positions and sizes the Array Browser Window to the Pane with which the Resource is associated by a common Visual Designator. The AMC XY 1064 may affect these actions directly on the Tab and Browser Window as indicated by the directional arrow from Application Controller 1040*a* to each Browser Window 1012 and Tab 1014; alternatively the Application Controller 1040*a* may do so indirectly through the Event Broker 1102. The AMC XY 1064 can detach an Array Tab from a Browser Window if warranted by the same methods. Ultimately, the Array Generation Process using the system components described may result in the display of a first Resource of a Resource Set in a Tab $1014_1$ of a Browser Window $1012_1$ positioned over a first Pane by virtue of one or more Visual Designators, $VD_1$, shared between the first Resource and first Pane and the display of some number of other Resources, each of the same Resource Set and in a Tab 1014; of a Browser Window $1012_i$ positioned over an additional Pane by virtue of one or more Visual Designators, $VD_i$, shared between each additional Resource and each additional Pane.

Continuing with reference to FIG. 23, an Array Responsive Action Process may be initiated by the selection of one of many Browser-bound AUI elements. In many cases an Array Responsive Action Process's responsive action will be that of navigation. In those cases an Array Responsive Action Process may be initiated from an element, including the Navigation Specific UI Element 1096, on either Browser-bound UI shown in FIG. 23. Regardless of the element, selection of the Browser-bound UI element may trigger an Event X, in this case a Navigation Process, for the Tab in which the element was selected. The Navigation Process for this Tab may be carried through to completion. However, when an Array exists, its AMC XY 1064 may listen for events of different actions, including navigation actions, occurring for its Array Resources. Upon receiving an indication such an action has occurred in one Array Resource, the AMC XY 1064 may respond by affecting one or more of actions in one or more of the other Array Resources, Tabs, and/or Browser Windows. In this example implementation, a Navigation Process initiated in a Browser-bound AUI $1020_1$ for the Resource Page $1016_1$ may carry through to completion in Tab $1014_1$. The same Navigate Message published by the AUI Controller 1042*a* received, through the Event Broker 1102 by the Application Controller's Navigate Handler (shown as the Event X Handler 1100) for the initial Navigation Process may also be received by the AMC XY 1064, specifically the AMC XY's Navigate AMR (shown as the Event X AMR 1106) (generally, a Navigate AMR is an Event X AMH responsible for listening for and responding to one or more Navigate Messages). The AMC XY may respond by publishing a Navigate Message for one or more of its Array Resources in an Array Tab $1014_i$ in an Array Browser Window $1012_i$. This Navigate Message would follow the same course through the Event Broker 1102 to the Navigate Handler (shown as the Event X Handler 1100) as part of a new Navigation Process. Upon receipt of the Navigate Message, the Navigate Handler would continue the Navigation Process to completion for each of the Array Tabs $1014_i$. These figures are provided for the sake of clarity and do not imply that the functional components and their respective functions must exist as a single logical structure or in the locations and components shown in these diagrams. In other implementations of the Array Responsive Action Process, other processes, including other navigation processes, may used in place of the Navigation Process to affect the first navigation and subsequent responsive navigations.

Figure 24:
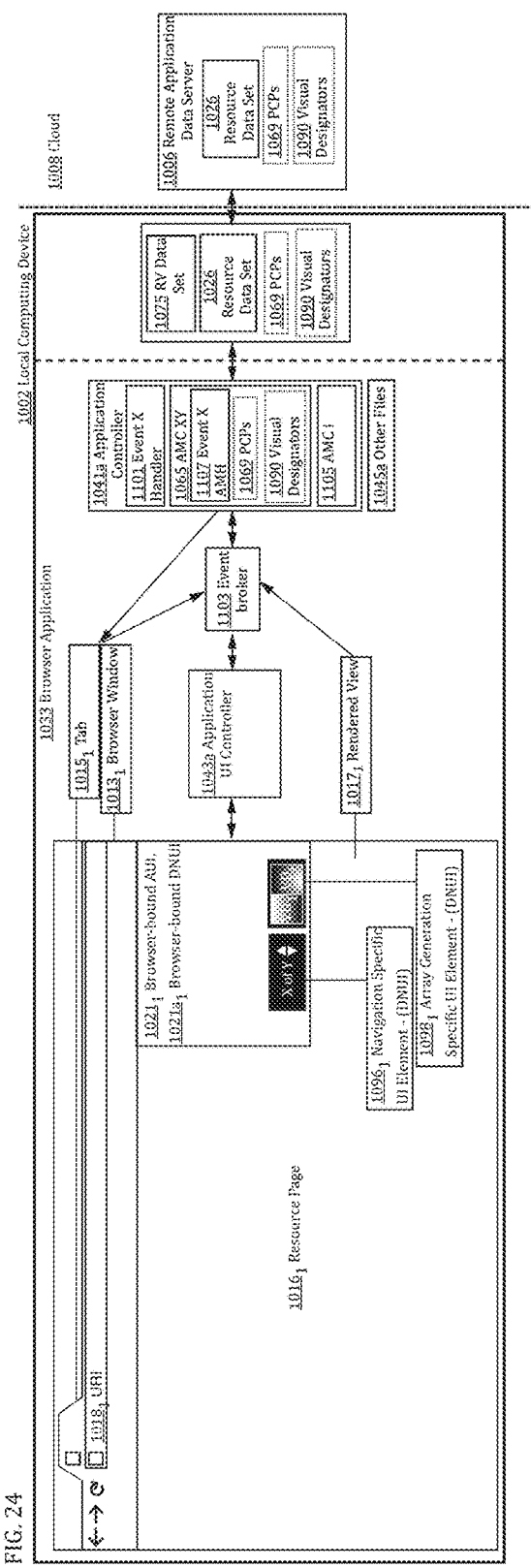
FIG. 24 is a block diagram illustrating a second example embodiment of user interface components, functional modules, and messaging for digital resource navigation and array generation using a browser-bound dynamic navigation user interface in a single browser window.
Figure 25:
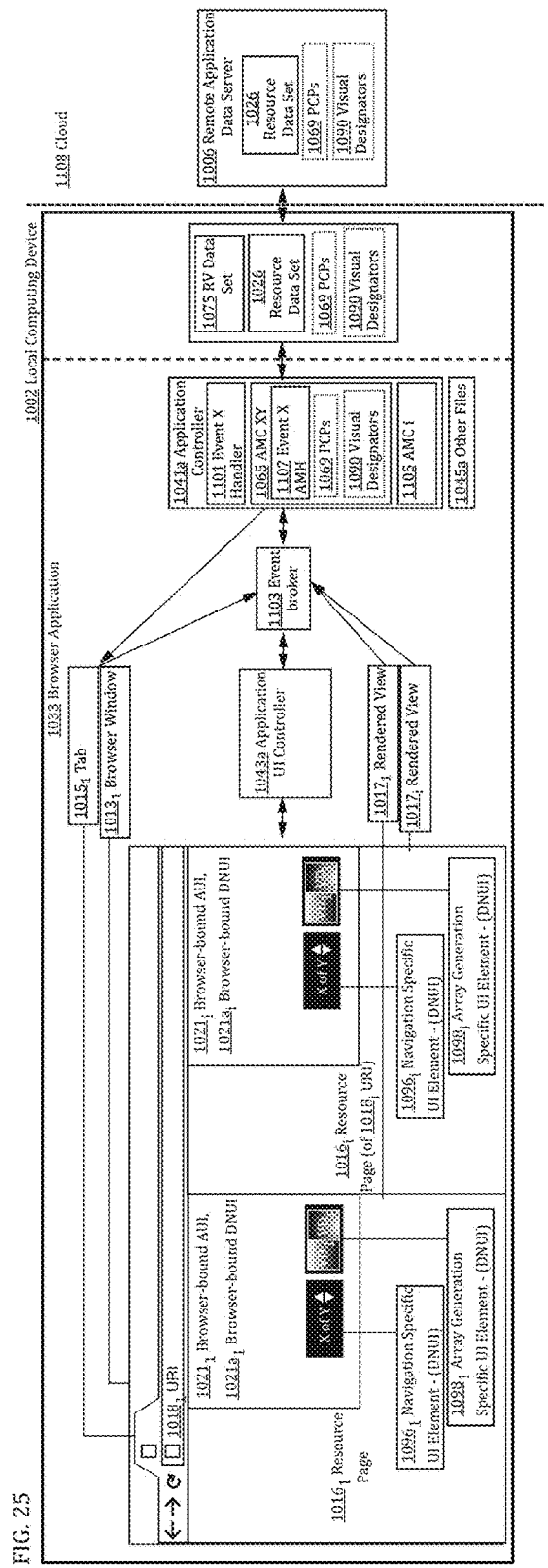
FIG. 25 is a block diagram illustrating a second example embodiment of user interface components, functional modules, and messaging for digital resource navigation, array generation, and responsive action using a browser-bound dynamic navigation user interface in multiple browser windows.

FIGS. 24 and 25 show an example of how, with slight modification, the configuration, components, and messaging system shown following the "General" example of system 1000 in FIGS. 22 and 23 may conform to those of system 1001. The primary difference between the two configurations, components, and messaging systems is the layer necessary to manage one or more Rendered Views 1017 simultaneously displayed within a single Browser Window as shown in FIGS. 24 and 25. As represented by the single directional arrow from Rendered View 1017 to the Event Broker 1103 the Rendered View 1017 may pass Rendered View Events through Event Broker 1103 to the Application Controller 1041*a*. However, the Rendered View Event messages may also be passed from the Rendered View 1017 to the Application Controller 1041*a* through the Application UI Controller 1043*a* before the Event Broker 1103. Other communication between each Rendered View 1017, its associated Resource Page 1016, and Resource Page 1016's associated AUI with the Application Controller 1041*a* may go through the Application UI Controller 1043*a*. As noted in the description herein, the Application UI Controller 1042 and 1043 may exist in multiple instances. These figures are provided for the sake of clarity and do not imply that the functional components and their respective functions must exist as a single logical structure or in the locations and components shown in these diagrams.

Figure 26:
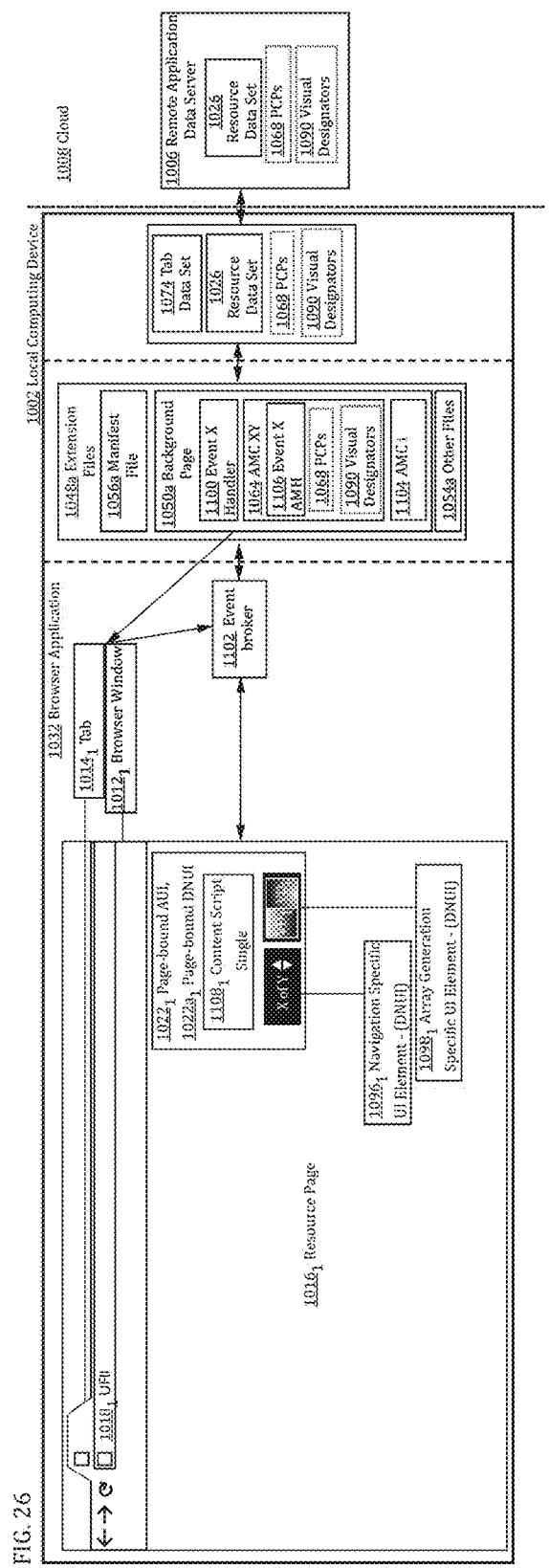
FIG. 26 is a block diagram illustrating a first example embodiment of user interface components, functional modules, and messaging for digital resource navigation and array generation using a page-bound dynamic navigation user interface in a single browser window.
Figure 27:
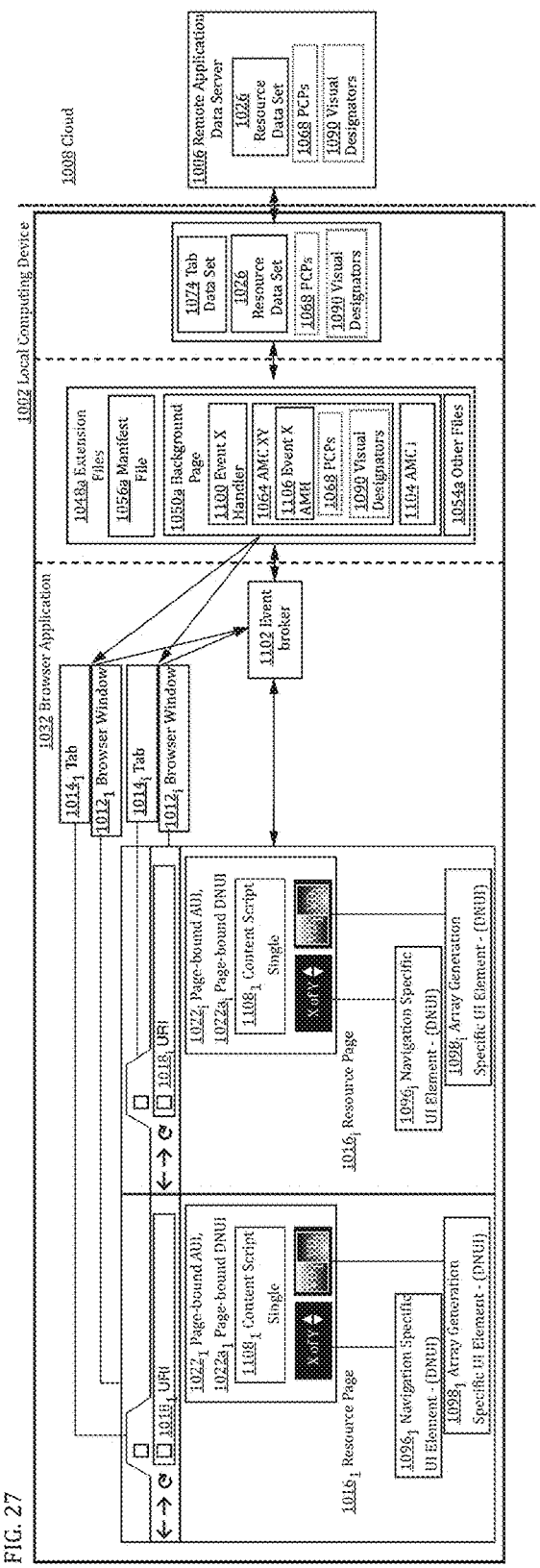
FIG. 27 is a block diagram illustrating a first example embodiment of user interface components, functional modules, and messaging for digital resource navigation, array generation, and responsive action using a page-bound dynamic navigation user interface in multiple browser windows.

FIGS. 26 and 27 are diagrams illustrating a "General" example of the messaging processes for variants of the Navigation Process, Array Generation Process, and Array Responsive Action Process that include the use of a Page-bound AUI 1022. While following the "General" example, as indicated by the AMC XY 1064 shown in each figure, the figures illustrate and label many other components, sub-components, and data elements in a more conceptual way in order to represent (within the confines of a reasonably sized figure) the wide variety of Arrays, Array Types and Behavior, and responsive actions that may be incorporated in the messaging processes described below using system 1000. The labeling system is mostly same as that described in FIG. 1. The subscript "1" will represent the first instance of a component, sub-component, or data element; the subscript "i" will represent one or more additional instances of the same. However, because each AMC may fulfill a different function, the concept of an "i" number of AMCs is represented slightly differently. In keeping with the "General" example, AMC XY embodies the first instance of an AMC; AMC i represents an "i" number of additional AMCs, each of which may be unique and create, manage, and govern the behavior of one or more Arrays of a unique Array Type.

In this example, the Page-Bound AUI 1022 is shown directly incorporated into the Resource Page 1016 displayed in Browser Window 1012 of Display Device 1010. The positioning of the Page-Bound AUI 1022 in the top-right corner of the Resource Page 1016 is merely for the sake of example and other implementations, positioning, sizing, configurations, etc. are possible. For example, the Page-Bound AUI 1022 can be made movable, so that it can be moved to any location on the Resource Page 1016. The process and arrangement of functional components desirable to use the Page-Bound AUI 1022 in the Navigation Process, Array Generation Process, and Array Responsive Action Process are much the same as those desirable to use the Browser-bound AUI 1020 in the Navigation Process, Array Generation Process, and Array Responsive Action Process. However, as shown in the diagram, the AUI Controller is embodied by and inserted directly into the Resource Page 1016 as Content Script Single 1108. As a result, the Content Script Single 1108 may be inserted into each Resource Page of a Resource Set when the Resource Page is initially rendered.

The Page-bound AUI may take several forms, including the Dynamic Navigation UI and Resource Formation UI. In this example, two specific elements that may be part of a DNUI, the Navigation Specific UI Element 1096 and the Array Generation Specific UI Element 1098, are shown in the Page-Bound AUI 1022 and their communication with other components of system 1000 are described in detail. While the UI elements are often part of the DNUI, the method of communication between these or other similar elements in other AUIs and the Application may utilize the same system components and many of the same processes described herein. For this reason and that these other AUIs are not an essential part of the Navigation Process, Array Generation Process, and Array Responsive Action Process described herein, the description only includes the two AUI elements mentioned above in the example Page-Bound AUI 1022 and its inclusion in the messaging processes for the Navigation Process, Array Generation Process, and Array Responsive Action Process.

Because it offers a simplified view focusing on the elements often part of the Navigation Process, it may be useful to refer to just FIG. 26 for the following paragraph. Once a Resource Page 1016$_1$ has been recognized as part of a Resource Set, the Page-Bound AUI 1022$_1$, in the form of the Page-bound DNUI 1022$a_1$, may serve as both the starting and ending point of the Navigation Process. The start of the process may begin with the explicit representation on the Page-Bound DNUI 1022$a_1$ of the current Resource Page's 1016$_1$ place within the scope and sequence of the Resource Set of which the Resource Page is a part. Navigation Specific UI Elements on the Page-Bound DNUI 1022$a_1$, such as a directional arrows or buttons indicating the sequence such as "Next" and "Previous", are displayed in order to provide the means with which one or more Resources in the Resource Set can be accessed according to the Resource Set's creator's intended scope and sequence. One possible example of such a Navigation Specific UI Element 1096 is shown in FIG. 26. In this example the "X" represents the displayed Resource's order within the numbered scope of the Resource Set of which the Resource Set is a part. For example, if the displayed Resource is the third resource within a Resource Set of five Resources, the "X" will be "3" and the "Y" will be "5". The arrows to the right of "X" and "Y" allow the user to access a next Resource with the Resource Set in a single click; this element can be displayed in the same place for each Resource and thus serve as a single point of selection to navigate sequentially, forwards or backwards, through the entire scope of the Resource Set. Upon selection of the Navigation Specific UI Element 1096$_1$ the Content Script Single 1108$_1$ receives an indication of the event. The Content Script Single 1108$_1$ then messages the Background Page's 1050$a$ Navigate Handler (shown as the Event X Handler 1100) through the Event Broker 1102 indicating a target Resource to which the Browser should navigate based on the selection of the Navigation Specific UI Element 1096$_1$. The Event Broker 1102 may represent the Browser Application 1032 messaging API. Upon receiving an indication of the message (Navigate Message), the Background Page 1050$a$ changes the document URI to that of the target Resource's Resource Page 1016$_1$ intended for display in the target tab. The Background Page 1050$a$ retrieves from the Resource Data Set 1026 the Resource Data to display the intended Resource. The Browser Application 1032 injects a Content Script Single 1108$_1$ into the Resource Page 1016$_1$. The Background Page 1050$a$ also sends the Dynamic Navigation UI View State and Resource Data Message to the Content Script Single 1108$_1$ through the Event Broker ultimately resulting in the display of the target Resource's Resource Page 1016$_1$ with its Page-Bound DNUI 1022$a_1$. The process can begin again with the selection of the Navigation Specific UI Element 1096$_1$.

Once one or more Resources of a Resource Set have been associated with a Pane of a Pane Layout by virtue of a common Visual Designator, the Page-Bound AUI 1022, frequently the Page-bound DNUI 1022$a$, may serve as the starting point of the Array Generation Process. As noted above, while the Array Generation Specific UI Element 1098$_1$ shown in this figure may be placed on other Page-bound AUIs, on those other AUIs the element may still use the same system components and methods of communication as shown and described below. Also as noted above, the Array Generation Process may be initiated without using a Page-Bound AUI 1022. However, because the Page-Bound AUI 1022 may be used and helps provide a useful visual representation of the first several steps of the Array Generation Process, the Page-Bound AUI 1022 has been included in the figure and description below.

The Array Generation Specific UI Element 1098$_1$ on the Page-Bound AUI 1022$_1$, to be utilized in an Array Generation Process initiated by Array Generation Event (AGE) triggered upon selection of the Array Generation Specific UI Element 1098$_1$, is displayed on the AUI in order to provide the means by which an AGE can be triggered and an Array Generation Process initiated. As shown, it may be useful for the Array Generation Specific UI Element 1098$_1$ to reflect something about the Array Type of the Array in which its selection would result; as such $VD_1$, a first Visual Designator, is shown in a box representing a first Pane; $VD_i$, one or more additional Visual Designators, is shown in a box representing one or more additional Panes. Upon selection of the Array Generation Specific UI Element 1098$_1$ the Content Script Single 1108$_1$ receives an indication of the event. The Content Script Single 1108$_1$ then sends an AGM through the Event Broker 1102 to its target AMC and possibly other components of the Background Page 1050$a$. In FIGS. 26 and 27, two blocks with "AMC" are shown: one with AMC XY 1064 and the other with AMC i. AMC XY is a first instance of an AMC in the Background Page 1050$a$ and AMC i is any number of remaining AMCs a Background Page 1050$a$ may contain. AMC XY may be thought of as the target AMC for the AGM discussed. Each target AMC may listen for one or more unique AGMs prompted by an AGE intended to initiate an Array Generation Process that will generate an Array Type of the target AMC. The AGM conveys the information to the AMC to continue the Array Generation Process. The AGM may contain all, some, or none of the Resource ID and/or Tab Data Attributes for the AMC to carry out its Array generation and management function; these attributes include the Resource ID and Tab ID of the Resource Page and Tab in which the AGM triggering Array Generation Specific UI Element $1098_1$ is displayed.

Because it offers a view focusing on additional elements for the Array Generation Process and Array Responsive Action Process, it may be useful to refer to FIG. 27 for the following two paragraphs. In an example implementation of the messaging processes of FIG. 27 the Event Broker may be used to broker messages between components (such as between the Content Script Single 1108 and Background Page 1050a) even if not expressly described in the process below. Upon receiving an indication of the AGM, the AMC XY 1064 responds, and retrieves and/or recognizes the Resource Data (from the Resource Data Set 1026), Visual Designators and PCPs. In some variants of the Array Generation Process, the AMC XY may maintain a Tab Data Set 1074 by use of a Tab Data Management System, described herein. To maintain the Tab Data Set 1074, the AMC XY may listen for Tab and Browser Window Events. The AMC XY 1064 can then "match" each Resource to one or more Panes by virtue of the Resource's and Pane's one or more common Visual Designators to display each Resource intended for display in the Array. The Background Page 1050a and/or AMC XY 1064 causes each Array Resource to be displayed in a Tab 1014 of a Browser Window 1012. To do so, the Background Page 1050a and/or AMC XY 1064 may cause one or more new Tabs $1014_i$ and Browser Windows $1012_i$ to be generated and display an Array Resource in order to fill the intended Array. As described herein, this may happen in a variety of ways including with the use of a TDMS. Finally, the AMC XY 1064 positions and sizes the Array Browser Window to the Pane with which the Resource is associated by a common Visual Designator. The AMC XY 1064 may affect these actions directly on the Tab and Browser Window as indicated by the directional arrow from Background Page 1050a to each Browser Window 1012 and Tab 1014; alternatively the Background Page 1050a may do so indirectly through the Event Broker 1102. The AMC XY 1064 can detach an Array Tab from a Browser Window if warranted by the same method. Ultimately, the Array Generation Process using the system components described may result in the display of a first Resource of a Resource Set in a Tab $1014_1$ of a Browser Window $1012_1$ positioned over a first Pane by virtue of one or more Visual Designators, $VD_1$, shared between the first Resource and first Pane and the display of some number of other Resources, each of the same Resource Set and in a Tab $1014_i$ of a Browser Window $1012_i$ positioned over an additional Pane by virtue of one or more Visual Designators, $VD_j$, shared between each additional Resource and each additional Pane.

Continuing with reference to FIG. 27, an Array Responsive Action Process may be initiated by the selection of one of many Page-bound AUI elements. In many cases an Array Responsive Action Process's responsive action will be that of navigation. In those cases an Array Responsive Action Process may be initiated from an element, including the Navigation Specific UI Element 1096, on either Page-bound AUI shown in FIG. 27. Regardless of the element, selection of the Page-bound AUI element may trigger an Event X, in this case a Navigation Process, for the Tab in which the element was selected. The Navigation Process for this Tab may be carried through to completion. However, when an Array exists, its AMC XY 1064 may listen for events of different actions, including navigation actions, occurring for its Array Resources. Upon receiving an indication such an action has occurred in one Array Resource, the AMC XY 1064 may respond by affecting one or more of actions in one or more of the other Array Resources, Tabs, and/or Browser Windows. In this example implementation, a Navigation Process initiated in a Page-bound AUI $1022_1$ for the Resource Page $1016_1$ may carry through to completion in Tab $1014_1$. The same Navigate Message published by the Content Script Single $1108_1$ and received, through the Event Broker 1102, by the Background Page's Navigate Handler (shown as the Event X Handler 1100) for the initial Navigation Process also may be received by the AMC XY 1064, specifically the AMC XY's Navigate AMH, (shown as the Event X AMH 1106). The AMC XY may respond by publishing a Navigate Message for one or more of its Array Resources in an Array Tab $1014_i$ in an Array Browser Window $1012_i$. This Navigate Message would follow the same course through the Event Broker 1102 to the Navigate Handler (shown as the Event X Handler 1100) as part of a new Navigation Process. Upon receipt of the Navigate Message, the Navigate Handler would continue the Navigation Process to completion for each of the Array Tabs $1014_i$. These figures are provided for the sake of clarity and do not imply that the functional components and their respective functions must exist as a single logical structure or in the locations and components shown in these diagrams. In other implementations of the Array Responsive Action Process, other processes, including other navigation processes, may used in place of the Navigation Process to affect the first navigation and subsequent responsive navigations.

Figure 28:
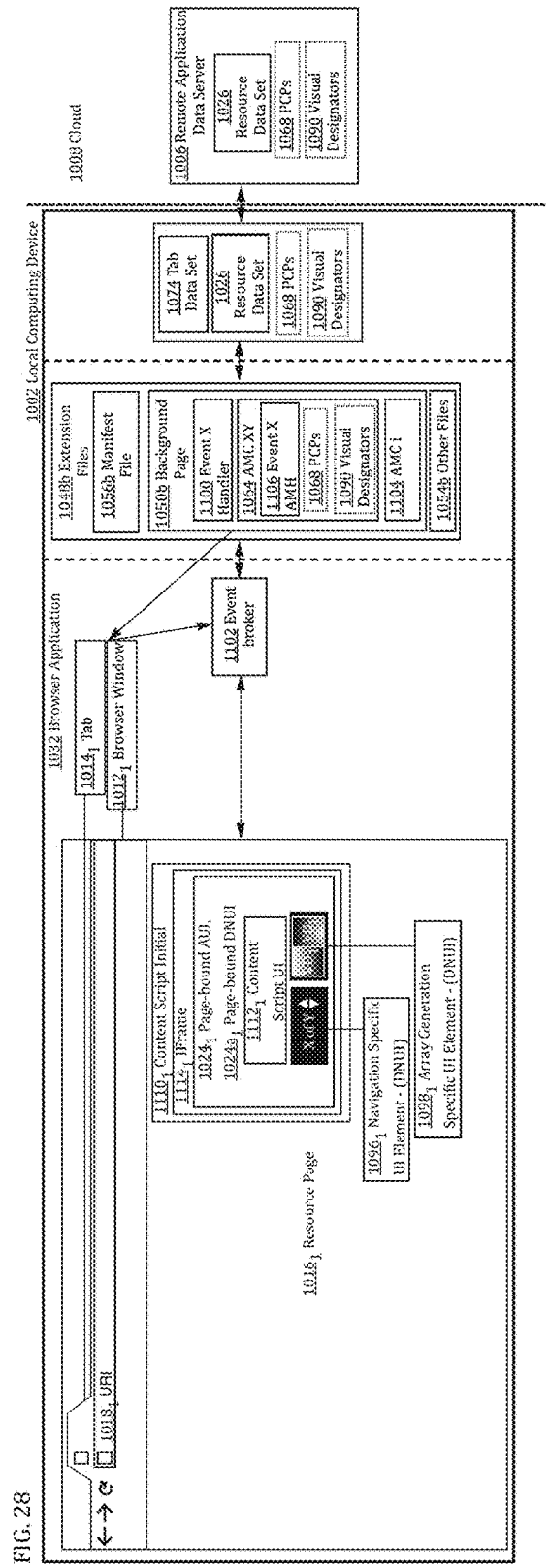
FIG. 28 is a block diagram illustrating a second example embodiment of user interface components, functional modules, and messaging for digital resource navigation and array generation using a page-bound dynamic navigation user interface in a single browser window.
Figure 29:
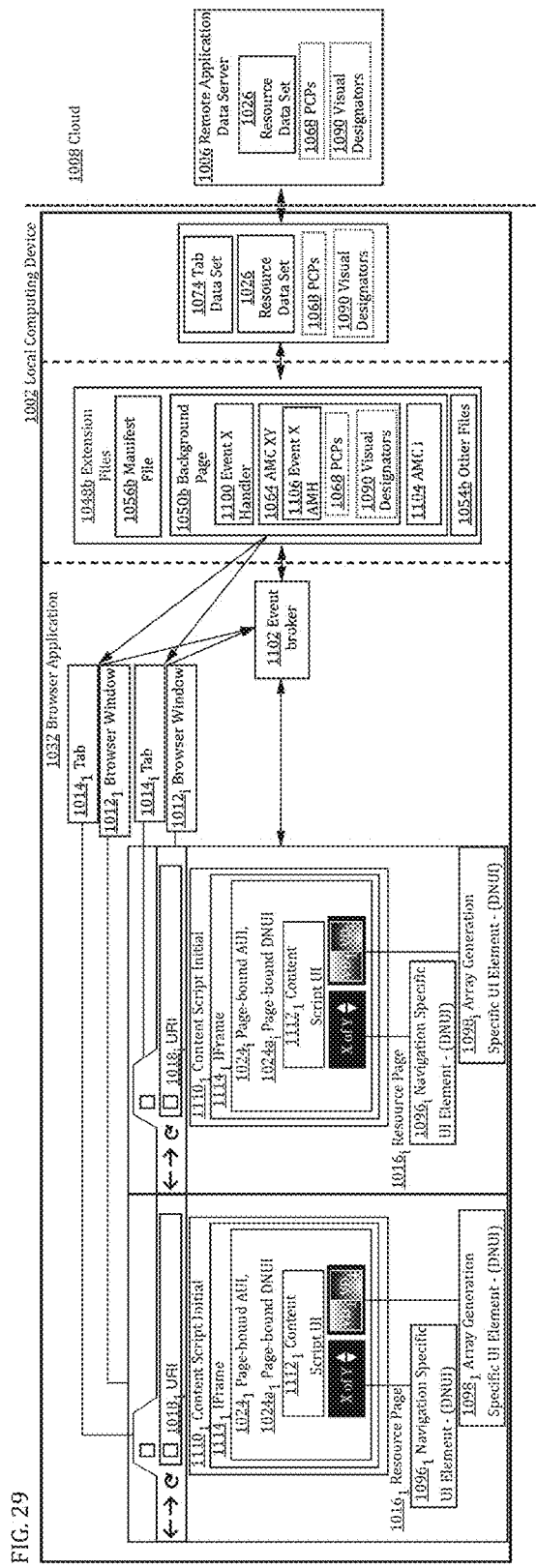
FIG. 29 is a block diagram illustrating a second example embodiment of user interface components, functional modules, and messaging for digital resource navigation, array generation, and responsive action using a page-bound dynamic navigation user interface in multiple browser windows.

FIGS. 28 and 29 are diagrams illustrating a "General" example of the messaging processes for variants of the Navigation Process, Array Generation Process, and Array Responsive Action Process that include the use of a Page-bound AUI 1024. While following the "General" example, as indicated by the AMC XY 1064 shown in each figure, the figures illustrate and label many other components, sub-components, and data elements in a more conceptual way in order to represent (within the confines of a reasonably sized figure) the wide variety of Arrays, Array Types and Behavior, and responsive actions that may be incorporated in the messaging processes described below using system 1000. The labeling system is mostly same as that described in FIG. 1. The subscript "1" will represent the first instance of a component, sub-component, or data element; the subscript "i" will represent one or more additional instances of the same. However, because each AMC may fulfill a different function, the concept of an "i" number of AMCs is represented slightly differently. In keeping with the "General" example, AMC XY embodies the first instance of an AMC; AMC i represents an "i" number of additional AMCs, each of which may be unique and create, manage, and govern the behavior of one or more Arrays of a unique Array Type.

In this example, the Page-bound AUI 1024 is shown directly incorporated into the Resource Page 1016 displayed in Browser Window 1012 of Display Device 1010. The positioning of the Page-bound AUI 1024 in the top-right corner of the Resource Page 1016 is merely for the sake of example and other implementations, positioning, sizing, configurations, etc. are possible. For example, the Page-bound AUI 1024 can be made movable, so that it can be moved to any location on the Resource Page 1016. The process and arrangement of functional components desirable to use the Page-bound AUI 1024 in the Navigation Process, Array Generation Process, and Array Responsive Action Process are much the same as those desirable to use the Browser-bound AUI 1020 in the Navigation Process, Array Generation Process, and Array Responsive Action Process. However, as shown in the diagram, the AUI Controller functions are carried out by Content Script Initial 1110, a content script that has been inserted into Resource Page 1016 and Content Script UI 1112, a content script that has been encapsulated in an IFrame added by Contents Script Initial 1110 that has been inserted into Resource Page 1016. As a result, the Content Script UI 1112 and Content Script Initial 1110 may be inserted into each Resource Page of a Resource Set when the Resource Page is initially rendered.

The Page-bound AUI may take several forms, including the Dynamic Navigation UI and Resource Formation UI. In this example, two specific elements often part of a DNUI, the Navigation Specific UI Element 1096 and the Array Generation Specific UI Element 1098, are shown in the Page-bound AUI 1024 and their communication with other components of system 1000 are described in detail. While the UI elements are often part of the DNUI, the method of communication between these or other similar elements in other AUIs and the Application may utilize the same system components and many of the same processes described herein. For this reason and that these other AUIs are not an essential part of the Navigation Process, Array Generation Process, and Array Responsive Action Process described herein, the description only includes the two AUI elements mentioned above in the example Page-bound AUI 1024 and its inclusion in the messaging processes for the Navigation Process, Array Generation Process, and Array Responsive Action Process.

Because it offers a simplified view focusing on the elements for the Navigation Process, it may be useful to refer to just FIG. 28 for the following paragraph. Once a Resource Page $1016_1$ has been recognized as part of a Resource Set, the Page-bound AUI $1024_1$, in the form of the Page-bound DNUI $1024a_1$, may serve as both the starting and ending point of the Resource Set Navigation Process. The start of the process may begin with the explicit representation on the Page-bound DNUI of the current Resource Page's $1016_1$ place within the scope and sequence of the Resource Set of which the Resource Page is a part. Navigation Specific UI Elements on the Page-bound DNUI, such as a directional arrows or buttons indicating the sequence such as "Next" and "Previous", are displayed in order to provide the means with which one or more Resources in the Resource Set can be accessed according to the Resource Set's creator's intended scope and sequence. One possible example of such a Navigation Specific UI Element 1096 is shown in FIG. 28. In this example the "X" represents the displayed Resource's order within the numbered scope of the Resource Set of which the Resource Set is a part. For example, if the displayed Resource is the third resource within a Resource Set of five Resources, the "X" will be "3" and the "Y" will be "5". The arrows to the right of "X" and "Y" allow the user to access a next Resource with the Resource Set in a single click; this element can be displayed in the same place for each Resource and thus serve as a single point of selection to navigate sequentially, forwards or backwards, through the entire scope of the Resource Set. Upon selection of the Navigation Specific UI Element $1096_1$ the Content Script UI $1112_1$ receives an indication of the event. The Content Script UI $1112_1$ then messages the Background Page's 1050b Navigate Handler (shown as the Event X Handler 1100) through the Event Broker 1102 indicating a target Resource to which the Browser should navigate based on the selection of the Navigation Specific UI Element $1096_1$. The Event Broker 1102 may represent the Browser Application 1032 messaging API. Upon receiving the indication of the message (a Navigate Message), the Background Page 1050b changes the document URI to that of the target Resource's Resource Page intended for display in the target tab. The Background Page 1050b retrieves from the Resource Data Set 1026 the Resource Data sufficient to display the intended Resource. The Browser Application 1032 injects a Content Script Initial $1110_1$ into the Resource Page $1016_1$. This action results in the addition of a Content Script UI $1112_1$ encapsulated in an IFrame $1114_1$ in the Resource Page $1016_1$. The Background Page 1050b publishes the Dynamic Navigation UI View State and Resource Data Message. The Content Script Initial $1110_1$ and Content Script UI $1112_1$ receive the message, ultimately resulting in the display of the target Resource's Resource Page $1016_1$ with its Page-bound DNUI $1024a_1$. The process can begin again with the selection of the Navigation Specific UI Element $1096_1$.

Once one or more Resources of a Resource Set have been associated with a Pane of a Pane Layout by virtue of a common Visual Designator, the Page-bound AUI 1024, frequently the Page-bound DNUI 1024a, may serve as both the starting point of the Array Generation Process. As noted above, while the Array Generation Specific UI Element $1098_1$ shown in this figure may be placed on other Page-bound AUIs 1024, on those other MTh the element may still use the same system components and methods of communication as shown and described below. Also as noted above, the Array Generation Process may be initiated without using a Page-bound AUI 1024. However, because the Page-bound AUI 1024 may be used and helps provide a useful visual representation of the first several steps of the Array Generation Process, the Page-bound AUI 1024 has been included in the figure and description below.

The Array Generation Specific UI Element $1098_1$ on the Page-bound AUI $1024_1$, to be utilized in an Array Generation Process initiated by Array Generation Event (AGE) triggered upon selection of the Array Generation Specific UI Element $1098_1$, is displayed on the AUI in order to provide the means by which an AGE can be triggered and an Array Generation Process initiated. As shown, it may be useful for the Array Generation Specific UI Element $1098_1$ to reflect something about the Array Type of the Array in which its selection would result; as such VD', a first Visual Designator, is shown in a box representing a first Pane; $VD_i$, one or more additional Visual Designators, is shown in a box representing one or more additional Panes. Upon selection of the Array Generation Specific UI Element $1098_1$ the Content Script UI $1112_1$ receives an indication of the event. The Content Script UI 1112 then sends an AGM through the Event Broker 1102 to its target AMC and possibly other components of the Background Page 1050b. In FIGS. 28 and 29, two blocks with "AMC" are shown: one with AMC XY 1064 and the other with AMC i. AMC XY 1064 is a first instance of an AMC in the Background Page 1050b and AMC i is any number of remaining AMCs a Background Page 1050b may contain. AMC XY 1064 may be thought of as the target AMC for the AGM discussed. Each target AMC may listen for one or more unique AGMs prompted by an AGE intended to initiate an Array Generation Process that will generate an Array Type of the target AMC. The AGM conveys the information to the AMC to continue the Array Generation Process. The AGM may contain all, some, or none of the Resource ID and/or Tab Data Attributes sufficient for the AMC to carry out its Array generation and management function; these attributes include the Resource ID and Tab ID of the Resource Page and Tab in which the AGM triggering Array Generation Specific UI Element $1098_1$ is displayed.

Because it offers a view focusing on additional elements for the Array Generation Process and Array Responsive Action Process, it may be useful to refer to FIG. 29 for the following two paragraphs. In an example implementation of the messaging processes of FIG. 29 the Event Broker may be used to broker messages between components (such as between the Content Script Initial 1110, Content Script UI 1112 and Background Page 1050b) even if not expressly described in the process below. Upon receiving an indication of the AGM, the AMC XY 1064 responds, and retrieves and/or recognizes the Resource Data (from the Resource Data Set 1026), Visual Designators and PCPs. In some variants of the Array Generation Process, the AMC XY may maintain a Tab Data Set 1074 by use of a TDMS, described in detail herein. To maintain the Tab Data Set 1074, the AMC XY may listen for Tab and Browser Window Events. The AMC XY 1064 can then "match" each Resource to one or more Panes by virtue of the Resource's and Pane's one or more common Visual Designators to display each Resource intended for display in the Array. The Background Page 1050b and/or AMC XY 1064 causes each Array Resource to be displayed in a Tab 1014 of a Browser Window 1012. To do so, the Background Page 1050b and/or AMC XY 1064 may cause one or more new Tabs $1014_i$ and Browser Windows $1012_i$ to be generated and display an Array Resource in order to fill the intended Array. As described herein, this may happen in a variety of ways including with the use of a TDMS. Finally, the AMC XY 1064 positions and sizes the Array Browser Window to the Pane with which the Resource is associated by a common Visual Designator. The AMC XY 1064 may affect these actions directly on the Tab and Browser Window as indicated by the directional arrow from Background Page 1050b to each Browser Window 1012 and Tab 1014; alternatively the Background Page 1050b may do so indirectly through the Event Broker 1102. The AMC XY 1064 can detach an Array Tab from a Browser Window if warranted by the same method. Ultimately, the Array Generation Process using the system components described may result in the display of a first Resource of a Resource Set in a Tab $1014_1$ of a Browser Window $1012_1$ positioned over a first Pane by virtue of one or more Visual Designators, $VD_1$, shared between the first Resource and first Pane and the display of some number of other Resources, each of the same Resource Set and in a Tab $1014_i$ of a Browser Window $1012_i$ positioned over an additional Pane by virtue of one or more Visual Designators, $VD_i$, shared between each additional Resource and each additional Pane.

Continuing with reference to FIG. 29, an Array Responsive Action Process may be initiated by the selection of one of many Page-bound AUI elements. In many cases an Array Responsive Action Process's responsive action will be that of navigation. In those cases an Array Responsive Action Process may be initiated from an element, including the Navigation Specific UI Element $1096_1$, on either Page-bound AUI shown in FIG. 29. Regardless of the element, selection of the Page-bound AUI element may trigger an Event X, in this case a Navigation Process, for the Tab in which the element was selected. The Navigation Process for this Tab may be carried through to completion. However, when an Array exists, its AMC XY 1064 may listen for events of different actions, including navigation actions, occurring for its Array Resources. Upon receiving an indication such an action has occurred in one Array Resource, the AMC XY 1064 may respond by affecting one or more of actions in one or more of the other Array Resources, Tabs, and/or Browser Windows. In this example implementation, a Navigation Process initiated in Page-bound AUI $1024_1$ for the Resource Page $1016_1$ may carry through to completion in Tab $1014_1$. The same Navigate Message published by the Content Script UI 1112 received, through the Event Broker 1102, by the Background Page's Navigate Handler (shown as the Event X Handler 1100) for the initial Navigation Process may also be received by the AMC XY 1064, specifically the AMC XY's Navigate AMH, (shown as the Event X AMH 1106). The AMC XY may respond by publishing a Navigate Message for one or more of its Array Resources in an Array Tab $1014_i$ in an Array Browser Window $1012_i$. This Navigate Message would follow the same course through the Event Broker 1102 to the Navigate Handler (shown as the Event X Handler 1100) as part of a new Navigation Process. Upon receipt of the Navigate Message, the Navigate Handler would continue the Navigation Process to completion for each of the Array Tabs $1014_i$. These figures are provided for the sake of clarity and do not imply that the functional components and their respective functions must exist as a single logical structure or in the locations and components shown in these diagrams. In other implementations of the Array Responsive Action Process, other processes, including other navigation processes, may used in place of the Navigation Process to affect the first navigation and subsequent responsive navigations.

Figure 30:
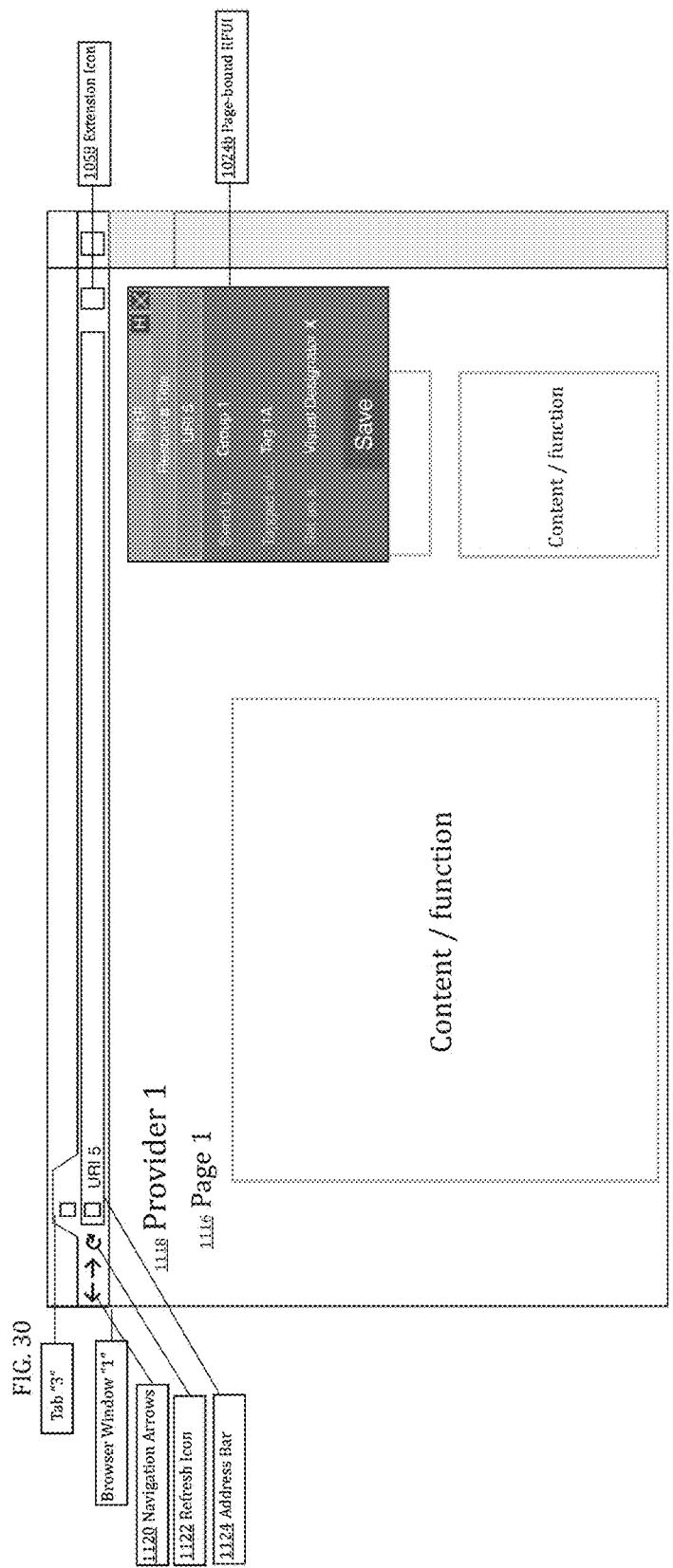
FIG. 30 is a block diagram illustrating a first example embodiment of user interface components and functional modules for implementing digital resource array generation and management using a page-bound dynamic navigation user interface according to a general example.

FIG. 30 is a diagram illustrating a detailed "General" example implementation of a Visual Designation Process step, associating a Visual Designator with a Resource of a Resource Set, utilizing a Page-bound Resource Formation UI (RFUI) 1024b (generally, a RFUI is an AUI the functions of which include the following: 1) the means to create a Resource concept defined by a Resource title; 2) the means to associate one or more URIs to the constituent Pages or Page Selections of the Resource; and 3) the means to associate to a Resource elements of Resource Data in the form of organizational context that may include the Resource's Group, Sub-Group, and one or more Visual Designators) of the system 1000 Extension Files 1048b as discussed previously. Although (as implied in the Visual Designation Process description for FIG. 42) the use of the Page-bound RFUI 1024b is not necessary to accomplish the primary aspect (associating a Resource with a Visual Designator) of the step represented in this figure, the Page-bound RFUI 1024b may be used to do so and is a useful visual aid for the sake of clarity because of its explicit representation of data fields and example values used in the process. In addition, the description of this step implies that another Visual Designation Process step, associating a Visual Designator with a Pane, has already or will take place. While the association between a Visual Designator and a Pane is important to the Visual Designation Process, as mentioned in the description of the summary process, there are a number of ways by which a Pane can be associated with a Visual Designator, including by inclusion in the application code base prior to Resource Formation. For this reason, the process of associating a Visual Designator and a Pane has not been included herein as a separate figure.

As shown in this "General" example, the Page-bound AUI 1024 is a Page-bound RFUI 1024b which displays the fields and entries for Resource formation involving Page 1 1116 of Provider 1 1118. For example the following "field—entry" pairs are shown: "Resource title—Resource Title", "Resource URI(s)—URI 5", "Group—Group 1" (with which to associate the Resource once formed), "tags—Tag 1A" (with which to associate the Resource (once formed) with one or more Sub-Groups), and "Visual Designator—Visual Designator X" (the entry for which can be used to link the Resource (once formed) to a Pane associated with the same Visual Designator). The "Save" button has been selected, saving the entries as Resource Data for what, upon the saving action, will be a newly formed Resource.

The Tab "3" and Browser Window "1" represent the tab and browser associated with Resource 3 (the Resource being saved) as shown in FIGS. 10 and 12-16 that follow the "General" example. The Navigation Arrows 1120 represent standard browser navigation arrows. The Refresh Icon 1122 allows the user to refresh a rendered webpage. The Address Bar 1124 allows the user to enter and view the URI of any webpage or Resource Page displayed. The Extension Icon 1058 represents the extension icon of the Extension Files 1048*b*.

The Page 1 1116 represents any webpage available on a computer network in its original browser rendering. Provider 1 1118 refers to the provider who has made the Page 1 1116 available on a computer network. The "Content/function" elements represent the fact that a Page 1 1116 may contain content or functional elements of any size and located at any place within the Page 1 1116 as rendered in the Browser Window.

Figure 31:
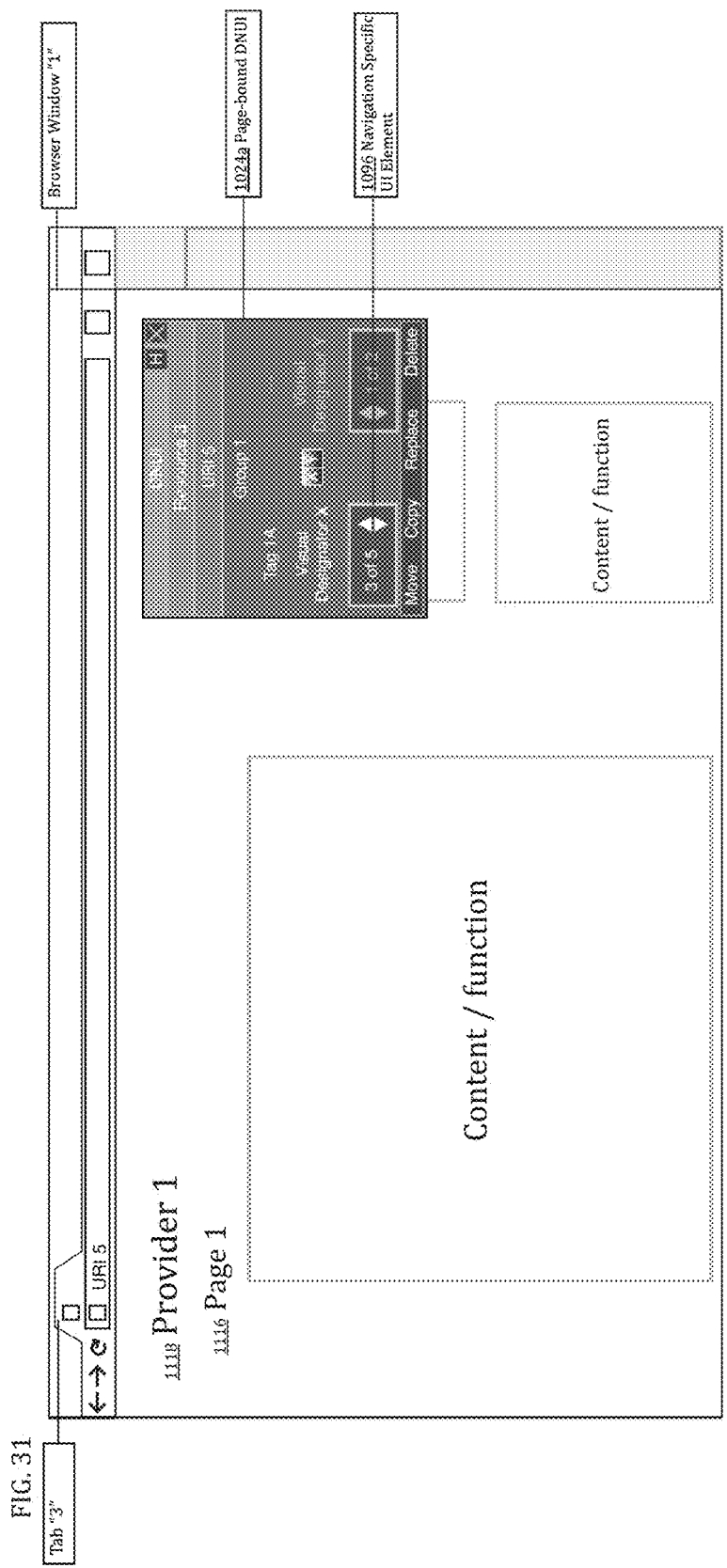
FIG. 31 is a block diagram illustrating a second example embodiment of user interface components and functional modules for implementing digital resource array generation and management using a page-bound dynamic navigation user interface according to a general example.

FIG. 31 is a diagram illustrating a detailed "General" example implementation of the Page-bound DNUI 1024*a* utilizing the system 1000 Extension Files 1048*b* as discussed previously. Once a Resource Page has been recognized as part of a Resource Set, the Page-bound DNUI 1024*a* may become both the starting and ending point of the Navigation Process. As shown in this example, the Page-bound DNUI 1024*a* displays some of the organizational and informational context of the Page 1 1116 with which it is displayed as a Resource; this context is Resource Data. For example "Resource 3" is the Resource title; "URI 5" is the URI of the Resource Page in view; "Group 1" refers to the Group of which the Resource is a part; "Tag 1A" is one of one or more tags with which the Resource has been tagged and defines a Sub-Group of which the Resource is a part; "Visual Designator X" is the Visual Designator with which the Resource has been associated; the container with "3 of 5" and a set of "up" "down" arrows is the Navigation Specific UI Element 1096.

The Tab "3" and Browser Window "1" represent the tab and browser associated with Resource 3 as shown in FIGS. 10 and 12-16. The Page 1 1116 represents any webpage available on a computer network in its original browser rendering. Provider 1 1118 refers to the provider who has made the Page 1 1116 available on a computer network.

Figure 32:
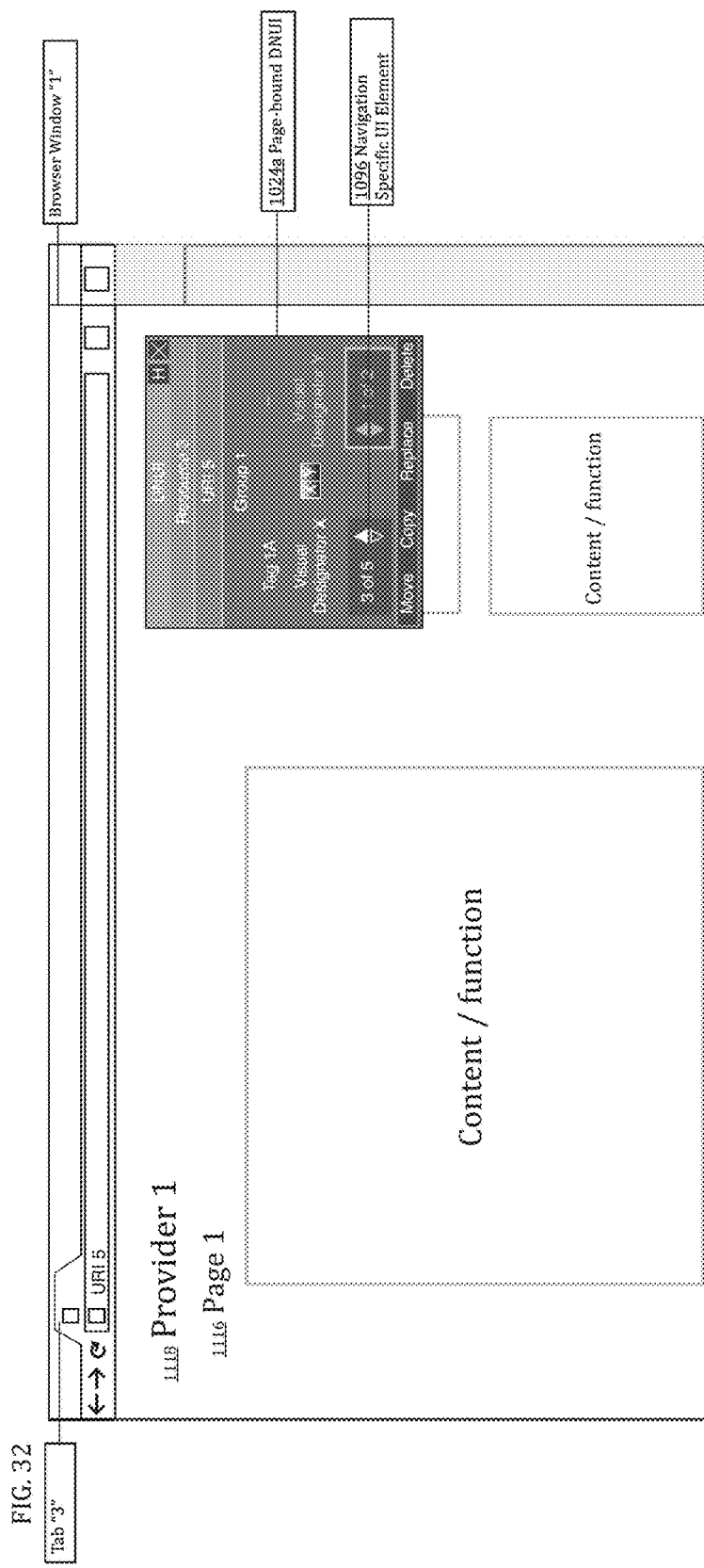
FIG. 32 is a block diagram illustrating a third example embodiment of user interface components and functional modules for implementing digital resource array generation and management using a page-bound dynamic navigation user interface according to a general example.

FIG. 32 is a diagram illustrating a detailed "General" example implementation of the Page-bound DNUI 1024*a* utilizing the system 1000 Extension Files 1048*b* as discussed previously. In this figure, the "down" arrow of the Navigation Specific UI Element 1096 has been selected and thus an example of the Navigation Process, navigating from the third Resource to the fourth Resource within the Resource Set defined by the Group 1, Sub-Group Tag-1A, and Visual Designator X, has begun.

The Tab "3" and Browser Window "1" represent the tab and browser associated with Resource 3 as shown in FIGS. 10 and 12-16. The Page 1 1116 represents any webpage available on a computer network in its original browser rendering. Provider 1 1118 refers to the provider who has made the Page 1 1116 available on a computer network.

Figure 33:
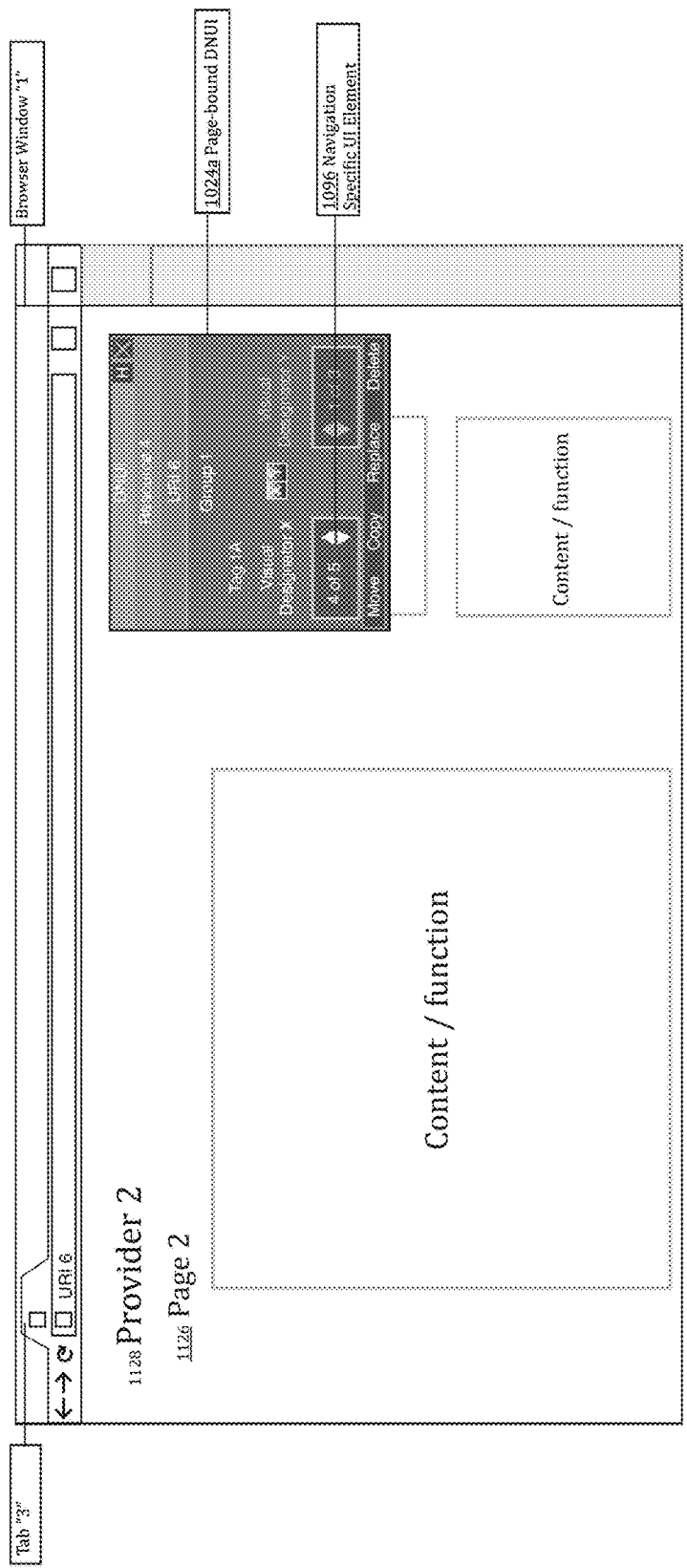
FIG. 33 is a block diagram illustrating a fourth example embodiment of user interface components and functional modules for implementing digital resource array generation and management using a page-bound dynamic navigation user interface according to a general example.

FIG. 33 is a diagram illustrating a detailed "General" example implementation of the Page-bound DNUI 1024*a* utilizing the system 1000 Extension Files 1048*b* as discussed previously. FIG. 33 shows the example of the Navigation Process, navigating from the third Resource to the fourth Resource of the Resource Set defined by Group 1, Sub-Group Tag-1A, and Visual Designator X has completed.

As shown, Page-bound DNUI 1024*a* now displays the Resource Data of the new Resource Page 2 1126 with which it is displayed as Resource 4 of the Resource Set of "Group 1". As shown, "Resource 4" is the Resource title; "URI 6" is the URI of the Resource Page in view; "Group 1" refers to the Group of which the Resource is a part; "Tag 1A" is one of one or more tags with which the Resource has been tagged and defines a Sub-Group of which the Resource is a part; "Visual Designator X" is the Visual Designator with which the Resource has been associated; the container with "4 of 5" and a set of "up" "down" arrows is the Navigation Specific UI Element 1096;

The Tab "3" and Browser Window "1" represent the tab and browser associated with Resource 4 as shown in FIGS. 10 and 12-16. The Resource Page 2 1126 represents any webpage available on a computer network in its original browser rendering. Provider 2 1128 refers to the provider who has made the Resource Page 2 1126 available on a computer network. The "Content/function" elements represent the fact that a Resource Page 2 1126 may contain content or functional elements of any size and located at any place within the Resource Page 2 1126 as rendered in the Browser Window "1".

Figure 34:
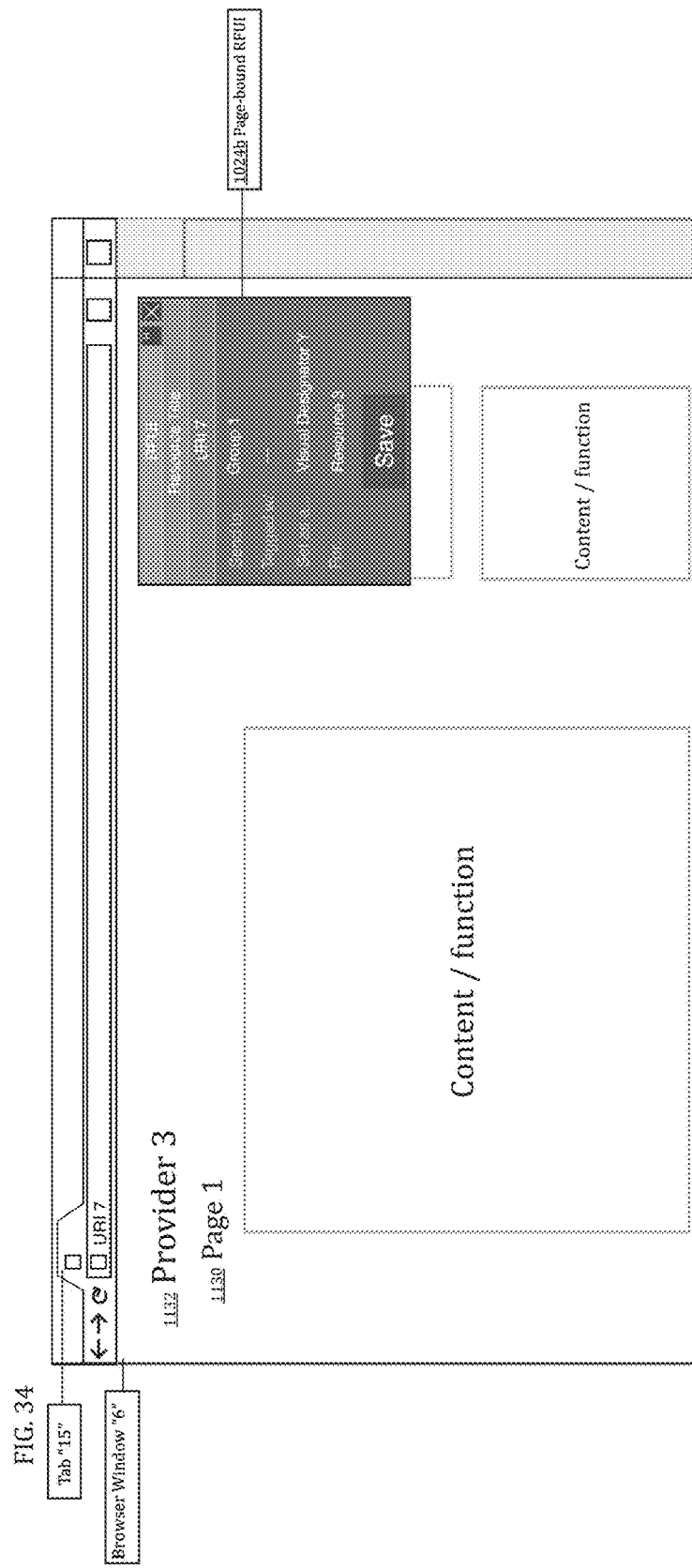
FIG. 34 is a block diagram illustrating a fifth example embodiment of user interface components and functional modules for implementing digital resource array generation and management using a page-bound dynamic navigation user interface according to a general example.

FIG. 34 is a diagram illustrating a "General" example implementation of another Visual Designation Process step, associating a Visual Designator with a Resource of a Resource Set, utilizing a Page-bound RFUI 1024*b* of the system 1000 Extension Files 1048*b* as discussed previously. Although (as implied in the Visual Designation Process summary description for FIG. 42) using the Page-bound RFUI 1024*b* is not necessary to accomplish the primary aspect (associating a Resource with a Visual Designator) of the step represented in this figure, the Page-bound RFUI 1024*b* may be used to do so.

As shown in this example, the Page-bound AUI 1024 is a Page-bound RFUI 1024*b* which displays the fields and entries for Resource formation involving Page 1 1130 of Provider 3 1132. For example the following "field—entry" pairs are shown: "Resource title—Resource Title"; "Resource URI(s)—URI 7"; "Group—Group 1" (with which to associate the Resource once formed); "tags—- - - " (with which to associate the Resource (once formed) with one or more Sub-Groups); "Visual Designator-Visual Designator Y" (the entry for which can be used to link the Resource (once formed) to a Pane associated with the same Visual Designator); and "Resource Association—Resource 3" (Resource 3 is associated with Visual Designator X). The "Save" button has been selected, saving the entries as Resource Data for what, upon the saving action, will be a newly formed Resource.

The Tab "15" and Browser Window "6" represent the tab and browser window associated with Resource 5 (the Resource being saved) as shown in FIGS. 10 and 12-16. The Page 1 1130 represents any webpage available on a computer network in its original browser rendering. Provider 3 1132 refers to the provider who has made the Page 1 1130 available on a computer network.

Figure 35:
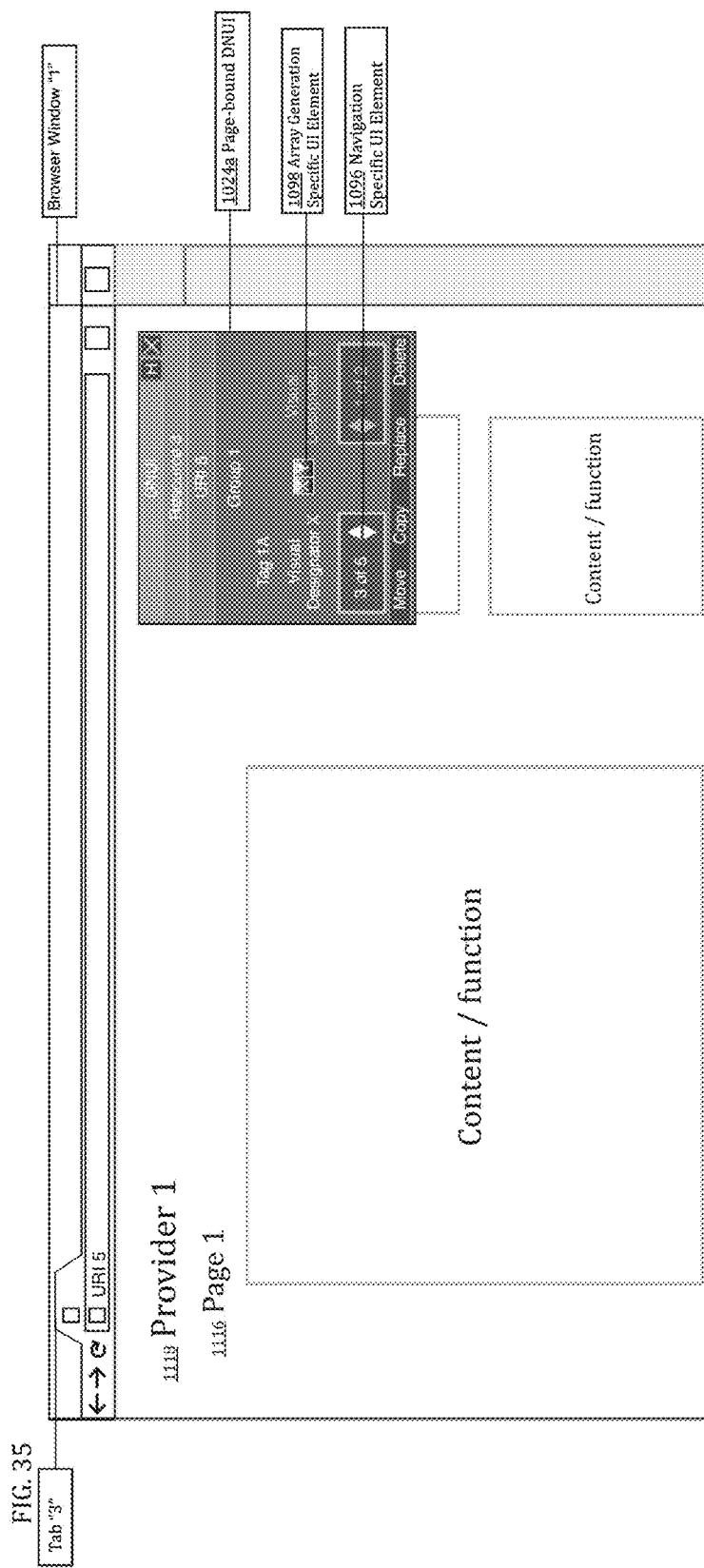
FIG. 35 is a block diagram illustrating a sixth example embodiment of user interface components and functional modules for implementing digital resource array generation and management using a page-bound dynamic navigation user interface according to a general example.

FIG. 35 is a diagram illustrating a detailed "General" example implementation of an Array Generation Process step, initiation of an Array Generation Process by an Array Generation Event (AGE) resulting from the selection of an Array Generation Specific UI Element, utilizing a Page-bound DNUI 1024*a* of the system 1000 Extension Files 1048*b*. Although the use of the Page-bound DNUI 1024*a* is not necessary to trigger an AGE, the Page-bound DNUI 1024*a* may be used to do so. This "General" example assumes the user has navigated back from Resource 4, as shown in FIG. 33, to Resource 3.

As shown, a Page-bound DNUI 1024*a* displays the Resource Data of the Resource Page 1 1116 with which it is displayed as Resource 3 of the Resource Set of Group 1 and Sub-Group Tag 1A. Resource 3 is the Resource title; URI 5 is the URI of the Resource Page in view; Group 1 refers to the Group of which the Resource is a part; Tag 1A is one of one or more tags with which the Resource has been tagged and defines a Sub-Group of which the Resource is a part; Visual Designator X is the Visual Designator with which the Resource has been associated; the container with "3 of 5" and a set of "up" "down" arrows is the Navigation Specific UI Element 1096; the "XY" button in the middle of the DNUI is an Array Generation Specific UI Element 1098 that may be selected to initiate an Array Generation Process, leading directly or indirectly to the publication of an AGM listened for by AMC XY. The following FIG. 36 shows the Array Generation Process initiated in this figure having generated the intended Array, sizing and positioning a Browser Window containing the Tab displaying a Resource Page of Resource 3 over the left half of the Client Area of the Display Device and a Browser Window containing the Tab displaying Resource 5 over the right half of the Client Area of the Display Device.

The Tab "3" and Browser Window "1" represent the tab and browser associated with Resource 3 as shown in FIGS. 10 and 12-16.

The Resource Page 1 1116 represents any webpage available on a computer network in its original browser rendering. Provider 1 1118 refers to the provider who has made the Resource Page 1 1116 available on a computer network.

Figure 36:
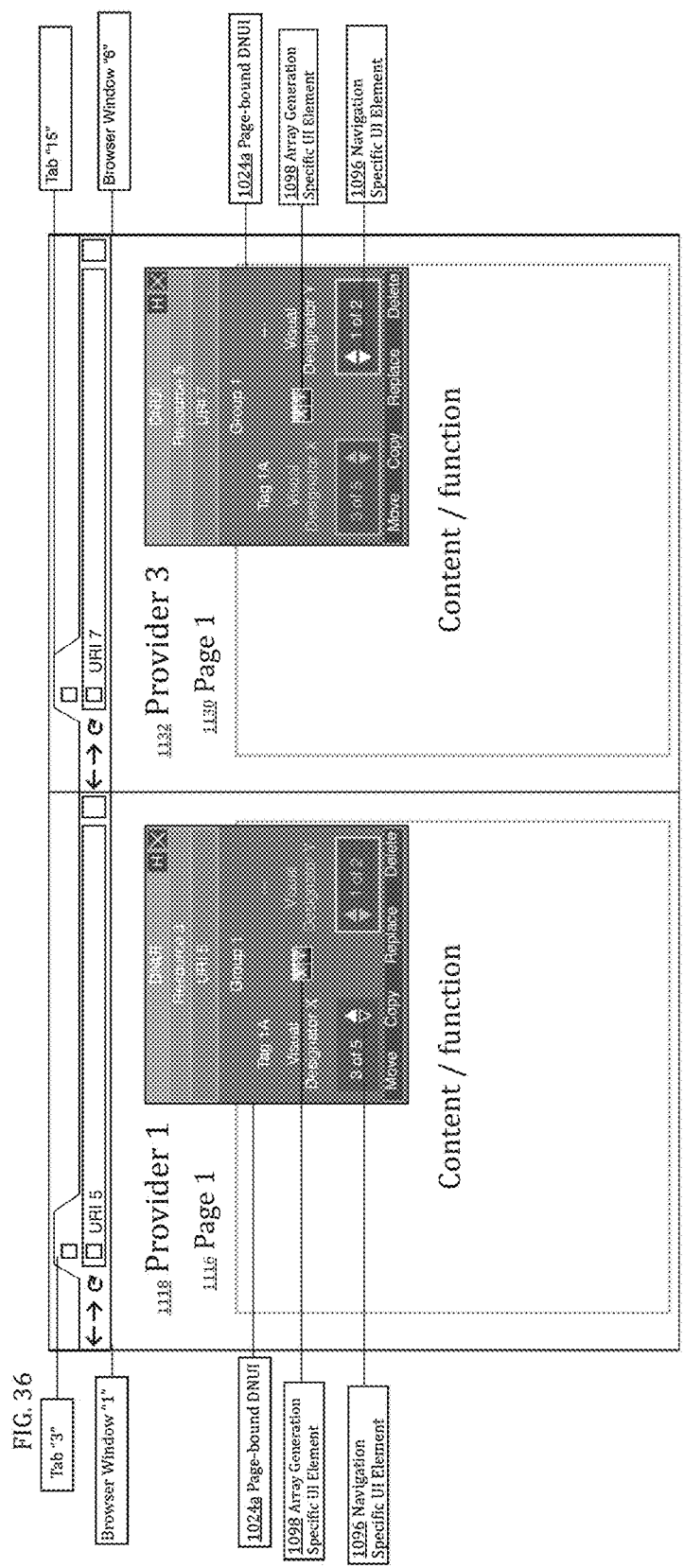
FIG. 36 is a block diagram illustrating a seventh example embodiment of user interface components and functional modules for implementing digital resource array generation and management using a page-bound dynamic navigation user interface according to a general example.

FIG. 36 is a diagram illustrating a detailed "General" example of the result of an Array Generation Process having 1) created an Array of two Resources, each displayed within a Tab 1014 of a Browser Window 1012 that has been sized and positioned to a Pane Layout's Pane associated with the same Visual Designator as the Resource displayed in the Browser Window's 1012 Tab 1014; and 2) utilized, among other elements of the system 1000, an AMC XY 1064, Visual Designator X and Y, Pane Layout 1, 2 defined by PCPs, a Resource 3 of a Resource Set associated with Visual Designator X, and a Resource 5 of a Resource Set associated with both the latter Resource 3 and Visual Designator Y.

As shown, Browser Window "1" is sized and positioned to the left half of the Client Area 1030 of the Display Device 1010 corresponding to the Pane 1 that is also associated with Visual Designator X because Browser Window "1" contains Tab "3" that displays Resource 3 of Group 1 and Sub-Group Tag 1A associated with the Visual Designator X. Browser Window "6" is sized and positioned to the right half of the Client Area 1030 of the Display Device 1010 corresponding to the Pane 2 that is also associated with Visual Designator Y because Browser Window "6" contains Tab "15" that displays Resource 5 of Group 1 and Sub-Group Tag 1A that is associated with both Resource 3 and the Visual Designator Y.

As mentioned in the previous FIG. 35 describing the same "General" example, the Array Generation Process resulting in this Array was initiated by selection of the Array Generation Specific UI Element 1098 leading to the publication of an AGM. This AGM may contain the Tab Data Attributes sufficient to inform its targeted AMC of the Resources to be displayed in the Array. For example, the AGM may contain just the Tab ID of the Tab from which the AGM was generated and, if there is more than one AMC in the system, the targeted AMC ID; the targeted AMC can receive this message and use the Tab ID to retrieve the Tab Data Attributes from the Tab Data Set 1074*a* of FIGS. 12-16. As described in FIG. 13, the AMC XY 1064 may receive the Tab ID of the Tab from which the AGM was generated and use it to retrieve the Resource ID of that tab from the Tab Data Set 1074*a*. Because the Array to be generated involves two Resources of Group 1 and Sub-Group Tag 1A, one associated with the other (that associated with Visual Designator Y associated with that associated with Visual Designator X), the AMC XY 1064 may use the Resource ID retrieved for the AGM initiating tab as the basis for querying the Resource Data Set to retrieve the Resource ID and Visual Designator of its associated Resource. In this example, an AGM is generated from the Array Generation Specific UI Element 1098 displayed in the DNUI of Resource 3 displayed in Tab "3"; the AGM contains Tab ID "3" as shown in FIGS. 12-16; Tab ID "3" is used to retrieve Resource 3's Resource ID 3; Resource ID 3 is used as the basis by the AMC XY 1064 for querying the Resource Data Set to retrieve Resource 3's related Resource's Tab Data Attributes sufficient for completion of the Array Generation Process; Resource 3's related Resource's Tab Data Attributes are Resource ID 5 and Visual Designator Y.

At a point before the AMC XY 1064 sizes and positions the Browser Windows of the Array, the AMC XY will ensure it has access to the most up-to-date PCPs defining the Panes of the Pane Layout underlying the Array the AMC XY governs. Because there are a number of ways by which the AMC XY 1064 can access the PCPs and their associated Visual Designators, this example will assume that step has completed and the AMC XY's Pane Layout's PCPs are up-to-date.

As described in FIG. 13, upon retrieving the Tab Data Attributes for Resource 5 the AMC XY 1064 may query the Tab Data Set 1074*a* to determine whether a TNAT (either a Non-Array Tab exists displaying Resource ID 5 or www.google.com) exists that it can use as the second tab of its Array to avoid needlessly generating a new tab. In this example, such a query identifies Tab "15" as a TNAT and returns that information to the AMC XY 1064. AMC XY then can affect the process to change Tab "15"'s displayed URI to that of a URI of Resource 5 and incorporate Tab "15" into the Array containing Tab "3", ultimately writing to Tab "15"'s Tab Data Attributes the AMC XY's ID, AMC ID XY. In addition, in order to differentiate the Array containing Tabs "3" and "15" from another AMC XY Array (such as that containing Tabs "5" and "8" as shown in FIGS. 12-16), the AMC XY 1064 will also write to Tab "3" that it is related to Tab "15" and to Tab "15" that it is related to Tab "3".

Each Tab, in a different Browser Window, now displays a Resource intended for display. At a point before the AMC XY 1064 sizes and positions the Browser Windows of the Array, the AMC XY may match each Resource intended for display in the Array to a Pane of the AMC's Pane Layout by virtue of the Resource and Pane's common Visual Designator. There are many ways by which this step can take place. This example assumes the matching happens by the AMC XY 1064 matching the Resource ID and Visual Designator of each Resource written in the Tab Data Set 1074*a* to the Pane's PCPs associated with the same Visual Designator and to which the AMC XY 1064 has access.

Once Resources and Panes have been "matched" and at least one Resource to be displayed in the Array has been displayed in a Tab in a unique Browser Window, the AMC XY 1064 can use the PCPs to position and size the Browser Window displaying the Tab displaying the Resource with which the PCP's Pane share a common Visual Designator. In this example, Browser Window "1" displaying Tab "3" displaying Resource 3 gets sized to the left half of the Client Area 1030 of the Display Device 1010 using the PCPs of Pane 1 that have been associated with their common Visual Designator X. The Browser Window "6" displaying Tab "15" displaying Resource 5 gets sized to the right half of the Client Area 1030 of the Display Device 1010 using the PCPs of Pane 2 that have been associated with their common Visual Designator Y.

Each Browser Window and Tab represents any conventional browser window and tab. The Page 1 1116 represents any webpage available on a computer network in its original browser rendering. Provider 1 1118 refers to the provider who has made the Page 1 1116 available on a computer network. The Page 1 1130 represents any webpage available on a computer network in its original browser rendering. Provider 3 1132 refers to the provider who has made the Page 1 1130 available on a computer network.

As shown, the Navigation Specific UI Element 1096 of Resource 3's Page-Bound DNUI 1024a has been selected in this figure. The next figure, FIG. 37, discusses and shows the result of this action that initiates an Array Responsive Action Process.

Figure 37:
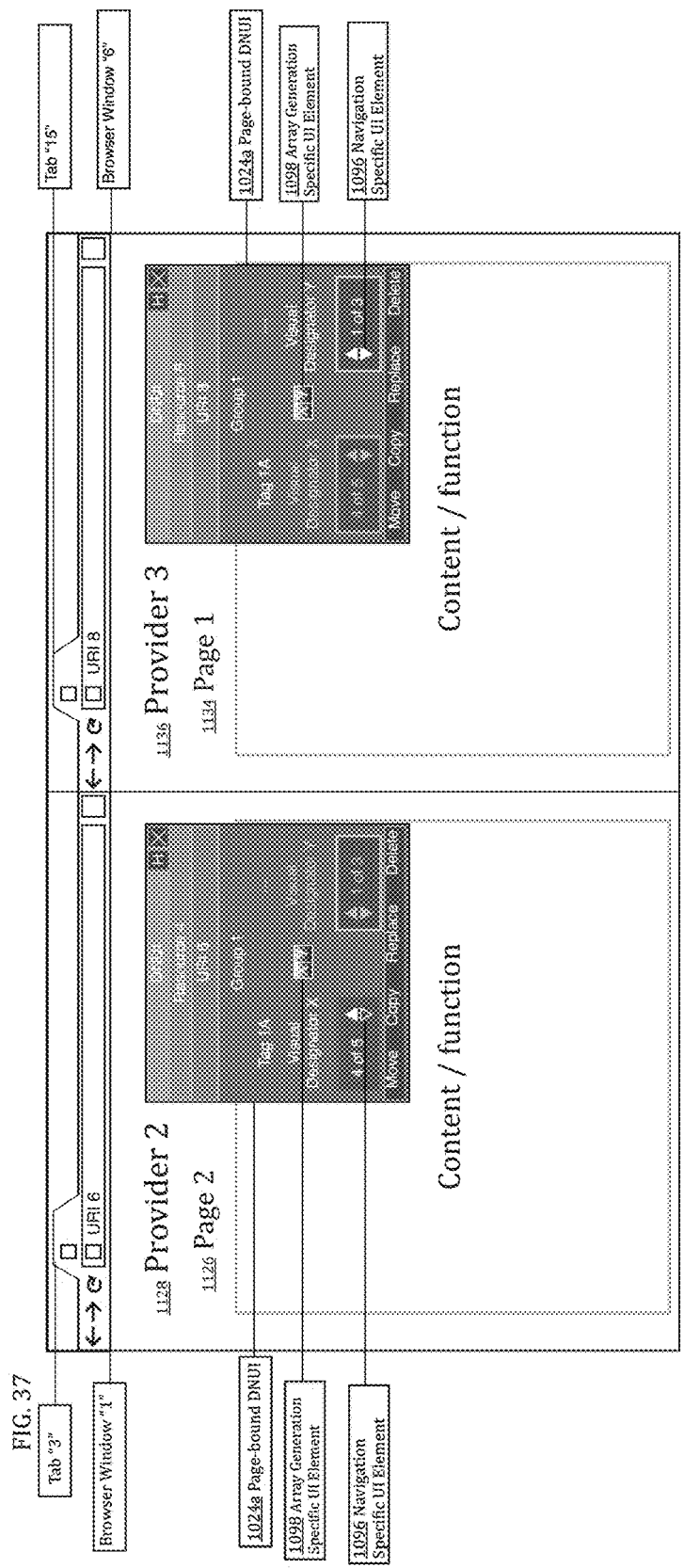
FIG. 37 is a block diagram illustrating a eighth example embodiment of user interface components and functional modules for implementing digital resource array generation and management using a page-bound dynamic navigation user interface according to a general example.

FIG. 37 is a diagram illustrating a detailed "General" example of an Array Responsive Action Process (initiated in the previous figure, FIG. 36) having affected a Navigation Process in both Browser Window "1"'s Tab "3" and Browser Window "6"'s Tab "15" by the single selection action on a Navigation Specific UI Element in Browser Window "1"'s Tab "3"'s Resource 3's Page-Bound DNUI 1024a.

As shown, this figure assumes that some time after the Array Generation Process has been completed for Tab "3" and "15", an Array Responsive Action Process is initiated for the Array by affecting a navigation in Tab "3" from a URI/Resource Page of Resource ID 3 to a URI/Resource Page of Resource ID 4.

Because, in this example, the Resources in the Array associated with VD Y are associated with a specific Resource in the Array associated with VD X, the navigation from a URI/Resource Page of Resource 3 to that of a URI/Resource Page of Resource 4 affects a navigation in Tab "15" from the URI/Resource Page of Resource 5 which is associated specifically to Resource 3 to that of a URI/Resource Page of Resource 6 which is associated specifically to Resource 4. Doing so allows the relationship between linked Resources within the Group 1 and Sub-Group Tag 1A to remain visually consistent as the user moves through Resources of Group 1 and Sub-Group Tag 1A associated with the same Visual Designator. In other words, within Group 1 and Sub-Group Tag 1A, Resources associated with VD Y that are associated with a specific Resource associated with VD X will only be displayed in the right half of the Client Area 1030 of the Display Device 1010 when the specific Resource associated with VD X with which they are associated is displayed in the left half of the Client Area 1030 of the Display Device 1010.

Maintaining the latter visual relationship constitutes a form of Array behavior and may be in part managed by an AMH of the AMC XY 1064, Navigate AMH, constructed for that responsive navigation within the Array. This example assumes the selection of Resource 3's Page-Bound DNUI's 1024a Navigation Specific UI Element 1096 displayed in Tab "3" initiates a Navigation Process in Tab "3" by the publication of a Navigate Message, indicating a Navigation Process has started and containing information indicating the Resource and/or Resource Set (Resource 4 of Group 1 and Sub-Group Tag 1A) to which the Browser Application 1032 should navigate and the tab or tabs (Tab "3" in this example) in which to affect the navigation. To affect the Navigation Process a Navigate Handler of the Background Page 1050b receives this message. Once received by the Navigate Handler (an Event X Handler 1100), the Navigation Process may continue to completion for Tab "3". To affect an Array Responsive Action Process connected with this navigation, the Navigate AMR (an Event X AMR 1106) of the AMC XY 1064 also listens for and receives the Navigate Message. Upon receiving the Navigate Message stemming from selection of Navigation Specific UI Element 1096 of the Resource 3 displayed in Tab "3", the Navigate AMR (an Event X AMR 1106) of AMC XY 1064 publishes a second Navigate Message for receipt by the same Navigate Handler (an Event X Handler 1100) utilized in the Navigation Process for Tab "3". However, the second Navigate Message contains information indicating the Resource and/or Resource Set (Resource 6 of Group 1 and Sub-Group Tag 1A) to which the Browser Application 1032 should affect a navigation in Tab "15"; the Navigate AMR (an Event X AMR 1106) may understand that the Navigate Message should affect Tab "15" by virtue of the Tab Data Attributes available in the Tab Data indicating the association of Tab "15" to Resource 5. From publication of this second Navigate Message by the Navigate AMR (an Event X AMR 1106) of AMC XY 1064, the second navigation associated with this message continues to completion as if initiated from Tab "15". As the events occur that generate data elements constituting the Tab Data Attributes for the Tab Data Attribute Sets for Tab "3" and Tab "15", each is written to the Tab Data, updating the Tab Data to reflect the current state of each Tab, its displayed Resource, and the relationship of both to the Array of which they are a part.

The Page 2 1126 represents any webpage available on a computer network in its original browser rendering. Provider 2 1128 refers to the provider who has made the Page 2 1126 available on a computer network. The Page 1 1134 represents any webpage available on a computer network in its original browser rendering. Provider 3 1136 refers to the provider who has made the Page 1 1134 available on a computer network.

The example above illustrates just a single instance of how the Array Responsive Action Process can be implemented in an Array. The Array Responsive Action Process may be implemented to affect many responsive actions other than that of navigation including keyword search and highlighting, deletion, Application UI opening and closing, and Array Tab open and closing.

FIG. 38 is a diagram illustrating an "Education" example of the initiation of an Array Generation Process. A chapter of an eTextbook on Roman Engineering, is displayed with a DNUI. In the DNUI there is a user interface element, an Array Generation Specific UI Element 1098a, that when selected will initiate an Array Generation Process. For this diagram, the Array Generation Specific UI Element 1098a has been selected. The Array Generation Specific UI Element 1098a displays "FC" to indicate the generated Array will display a Resource associated with Visual Designator Focus on the left and a Resource associated with the Visual Designator Context on the right; in this diagram a Resource associated with Context also is associated with a particular Resource associated with Focus. The webpage in view, a chapter on Roman Engineering provided by an eTextbook Provider, has been associated with the Visual Designator Focus; upon completion of the Array Generation Process this Resource will be positioned on the left half of the display.

FIG. 39 is a diagram that shows the Array Generation Process initiated in FIG. 38 having completed. The Array Generation Process has created a two-window Array of Resources with the page of an eTextbook on Roman Engineering that has been associated with the Visual Designator Focus positioned on the left half of the display and a page showing a map view of the Colosseum that has been associated with both the eTextbook page on Roman Engineering and the Visual Designator Context positioned on the right half of the display. The Navigation Specific UI Element 1096 has been selected, specifically in this case a down arrow, initiating an Array Responsive Action Process which will cause 1) a navigation from the third of five to the fourth of five Resources associated with Focus and of the Group Education and sub-Group Ancient Rome, in this case a navigation from the eTextbook page on Roman Engineering to an educational video on the Roman Forum; and 2) a second navigation from a Context associated with the third of five Resources associated with Focus and of the Group Education and sub-Group Ancient Rome to a Context associated with the fourth of five Resources associated with Focus and of the Group Education and sub-Group Ancient Rome, in this case a navigation from the page showing a map view of the Colosseum to a page showing a map view of the Roman Forum.

FIG. 40 shows the end result of this Array Responsive Action Process, the new Focus Resource is in view and aligned with its associated Context Resource.

Figure 41B:
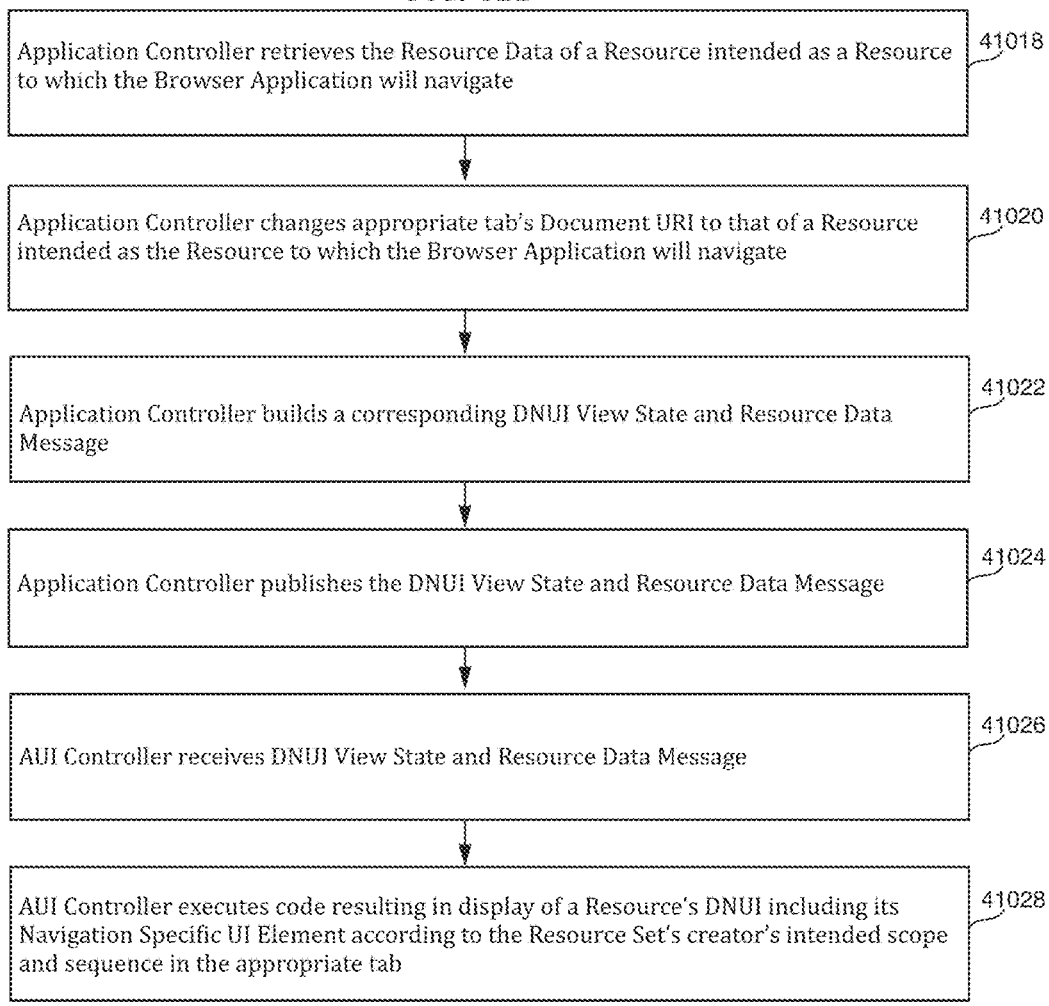

FIGS. 41A and 41B are flowcharts illustrating example operations (41002-41028) of the system 1000 of FIG. 1 executing a Navigation Process, enablement of the repetitive selection of the same Navigation Specific UI Element in the Dynamic Navigation User Interface (DNUI) to result in the display of Resources in a Resource Set according to the Resource Set's creator's intended scope and sequence.

In the example of FIGS. 41A and 41B, in a first instance, the Application Controller detects a page loaded into a tab is a Resource of a Resource Set (41002). The Application Controller retrieves the loaded Resource's Resource Data (41004). The Application Controller builds a DNUI View State and Resource Data Message for that Resource (41006). The Application Controller publishes the DNUI View State and Resource Data Message (41008). An AUI Controller receives the DNUI View State and Resource Data Message (41010). An AUI Controller executes code resulting in the display of a DNUI including Navigation Specific UI Element in or alongside the loaded Resource Page (41012). Upon selection of the displayed Navigation Specific UI Element the AUI Controller publishes a Navigate Message (41014). The Application Controller receives the Navigate Message (41016). The Application Controller retrieves the Resource Data of a Resource intended as a Resource to which the Browser Application will navigate (41018). The Application Controller changes appropriate tab's Document URI to that of a Resource intended as the Resource to which the Browser Application will navigate (41020). The Application Controller builds a corresponding DNUI View State and Resource Data Message (41022). The Application Controller publishes the DNUI View State and Resource Data Message (41024). An AUI Controller receives the DNUI View State and Resource Data Message (41026). The AUI Controller executes code resulting in display of a Resource's DNUI including its Navigation Specific UI Element according to the Resource Set's creator's intended scope and sequence in the appropriate tab (41028).

FIG. 42 is a flowchart illustrating example operations (42002-42008) of a Visual Designation Process. These operations may be accomplished using the Application Controller of Browser Application 1032/1033 or an application acting at a lower, operational system level that may distinguish between and utilize Resources of multiple applications on Local Computing Device 1002.

In the example of FIG. 42, in a first instance, one or more Visual Designators is selected or created and made available for use by the Application Controller (42002). A Pane Layout of one or more Panes defined by Pane Configuration Parameters is created and made available for use by the Application Controller (42004). Each Pane is associated with the one or more Visual Designators, the association of which is made available for use by the Application Controller (42006). One or more Resources of a Resource Set is associated with the same one or more Visual Designators as one or more Panes; the association of which is made available for use by the Application Controller (42008). In another embodiment of the Visual Designation Process, the Visual Designators may be applied directly to the viewing component of "(42008)" in which the Resource is displayed instead of the Resource itself. For example, the Visual Designator may be applied to a Tab displaying a webpage instead of the webpage and/or the URI of the webpage itself.

It is important to note that the RSPP includes the ability to share any Resource Set and associated positional data defining where the digital resource viewing components displaying the Resources should be positioned on the screen or within another viewing component with any number of users.

For example, a user could share any collection of webpages and/or URIs and associated positional data defining where the browser windows displaying the webpages should be positioned on the screen or Rendered Views displaying the webpages should be positioned within a Browser Window with any number of users. The RSPP enables users to share such information with any number of traditional sharing processes, an example of which would be 1) storing the webpages and/or URIs and their positional display data (whether directly associated to the webpages and/or URIs or indirectly associated through the use of Visual Designator common to both the webpages and/or URIs and the positional data for the webpages and/or URIs) and/or Resource Data saved by a first user on a Remote Server; 2) copying the latter webpages and/or URIs and their associated positional data and/or Resource Data and storing the data as a separate, second data set on a Remote Server; 3) alerting one or more users that a set of webpages and/or URIs and their positional display data and/or Resource Data has been shared with them; 4) allowing the one or more other users to access the second, shared data set and display the webpages and/or URIs' associated webpages and/or Resource Data of the second, shared data set according to the positional display data associated with the webpages and/or URIs and/or Resources in Array. Sharing presentations is an aspect of the RSPP.

FIG. 43 illustrates an embodiment of a process for generating a visual array of digital resources. Such a visual array may beneficially enable a viewer to view multiple related resources concurrently with the resources organized into different viewing components (e.g., a browser window, tab, or view) on the screen that are automatically positioned in a manner convenient for viewing. Furthermore, viewing components displaying resources may be automatically positioned (and optionally re-sized) based on a pre-assigned visual designation of the resources with designators such as Focus or Context. Visual designation thus enables information about a resource to be conveyed by the position of the resource on the screen. For example, an array may be generated that automatically positions a Focus resource in a viewing component on the left half of the screen and positions a related Context resource in a viewing component on the right half of the screen, or vice versa. In other examples, an array may position three or more viewing components with different types of resources. In yet another example, a single-element array may automatically position a viewing component based on the type of resource it displays (e.g., automatically positioning a Focus on the left side of the screen).

In the example process of FIG. 43, parameters are stored (43002) defining different viewing areas of a display. For example, the parameters for each viewing area may specify an array of pixel coordinates corresponding to a different defined area of the display (e.g., a left half and right half, top half or bottom half, or other defined area). Identifiers for a plurality of digital resources and associations between the digital resources are also initially stored (43004). For example, resources may be stored in different ordered sets which may each be designated as particular types of resources based on designations such as Contexts or Focuses. Each resource may be associated with a plurality of other resources in a designated relationship. For example, a Focus resource may be associated with a plurality of Context resources that may each provide different contextual information relating to the subject of the Focus resource. Data elements are also stored that associate different digital resources with different viewing areas (43006). For example, for a first ordered set of digital resources designated as Focuses, a data element, such as the visual designator "Focus", may store an association linking these resources to a left viewing area, and for a second ordered set of digital resources designated as Contexts, a data element, such as the visual designator "Context", may store an association linking these resources to a right viewing area. A user interface is displayed that includes a user interface element that when selected, causes a visual array to be automatically generated. Selection of the navigation user interface element is detected (43008) that indicates an instruction to generate the visual array. In response to this selection, the array management component identifies which resources should be included in the visual array. For example, in one embodiment, the array management component identifies resources pre-selected by a user to be included in the array. In another embodiment, the array management component identifies instances of resources that are already open to be included in the visual array. In yet further embodiments, the array management component may select resources for inclusion in the visual array based on the resource type, associations between resources, or other configurable factors. The array management component then identifies the stored data elements associated with each of the resources identified for inclusion in the visual array (43010), and determines to which predefined viewing area each resource is linked based on the respective data elements (43012). Responsive to this determination, the array management component causes respective viewing components displaying each resource to be positioned over their respective associated viewing areas (and optionally re-sized to fit within the defined areas) (43014). For example, one or more viewing components displaying resources designated as Focuses may be positioned over a first viewing area (e.g., on the left side) and one or more viewing components displaying resources designated as Contexts may be positioned over a second viewing area (e.g., on the right side). In one embodiment, if a particular resource is not already open in a viewing component but is otherwise identified for inclusion in the array, the array management component may generate a new viewing component and load the resource in the new viewing component. In other cases, if a particular resource designated for inclusion in the visual array is already open in a viewing component, the viewing component may merely be repositioned over the appropriate viewing area. In an alternative embodiment, viewing components themselves may be associated with particular viewing areas (either directly or via a separate data element). For example, a particular viewing component may be associated with Focuses and another viewing component may be associated with Contexts. Then, instead of relying on the associations of the underlying resources themselves, the array management component may detect the association of the viewing component with a particular viewing area and reposition the viewing component over the viewing area during array generation based on the association.

Figure 44A:
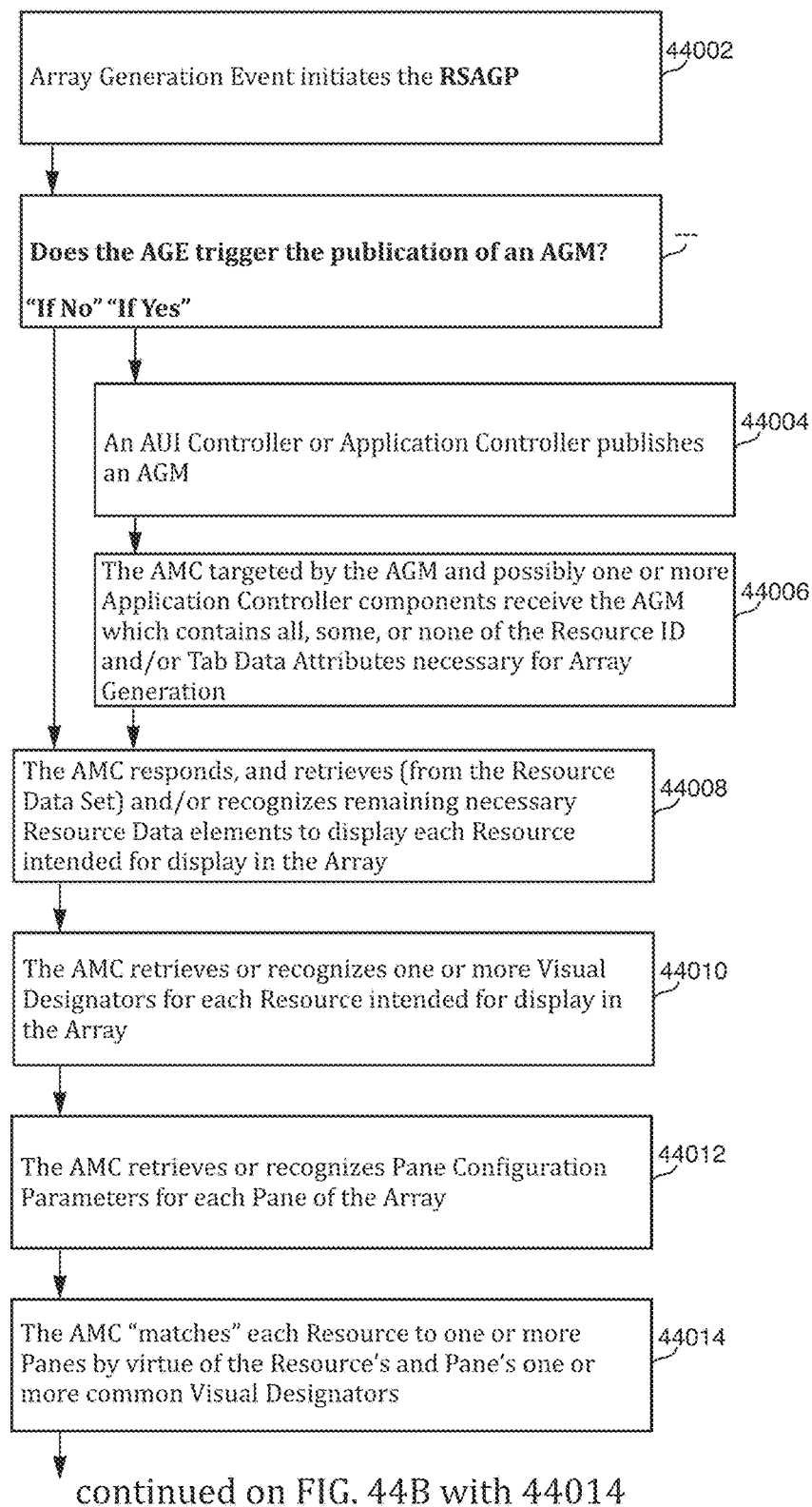
FIGS. 44A-44B are flowcharts illustrating a first embodiment of a second process for generating an array of digital resources.
Figure 44B:
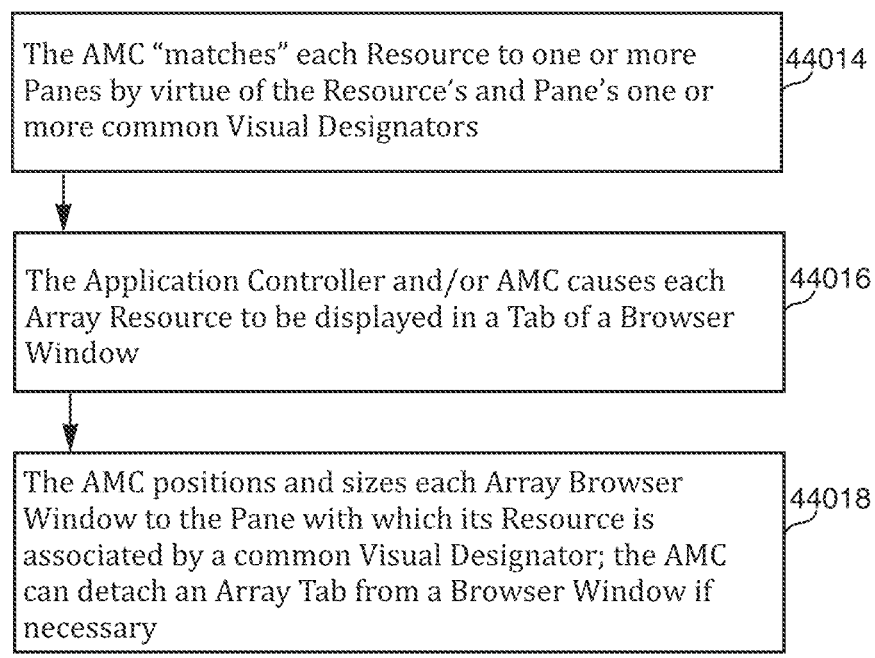

FIGS. 44A and 44B are flowcharts illustrating example operations (44002-44018) of the system 1000 of FIG. 1 executing an Array Generation Process, generation of an Array of one or more Resources, each Resource in the Array being displayed in a Browser Window positioned over a defined area of the Client Area of the Display Device, referred to herein as a Pane, the Pane and Resource having one or more common Visual Designators. Also, as represented in the figures and description herein, an Event Broker may be used for messaging including between the Application Controller 1040 and the AUI Controller 1042 and/or to the Application Controller 1040 upon Tab and Browser Window Events.

In the example of FIGS. 44A and 44B, in a first instance, an Array Generation Event (AGE) initiates the Array Generation Process (44002). In many instances this event is or leads directly to an AUI Controller 1042 or Application Controller 1040 publishing an AGM (44004). If this occurs, the AMC targeted by the AGM and possibly one or more Application Controller 1040 components receive the AGM which contains all, some, or none of the Resource ID and/or Tab Data Attributes for Array Generation (44006). Alternatively, other AGEs may occur that do not require the publication of an AGM in order to activate the function of the AMC as described below. The AMC responds to the AGE and retrieves (from the Resource Data Set 1026) and/or recognizes Resource Data elements to display each Resource intended for display in the Array (44008). The AMC retrieves or recognizes one or more Visual Designators for each Resource intended for display in the Array (44010). The AMC retrieves or recognizes Pane Configuration Parameters for each Pane of the Array (44012). The AMC matches each Resource to one or more Panes by virtue of the Resource's and Pane's one or more common Visual Designators (44014). The Application Controller 1040 and/or AMC causes each Array Resource to be displayed in a Tab 1014 of a Browser Window 1012 (44016). The AMC positions and sizes each Array Browser Window 1012 to the Pane with which its Resource is associated by a common Visual Designator; the AMC may detach an Array Tab 1014 from a Browser Window 1012 if desirable (44018).

Figure 45B:
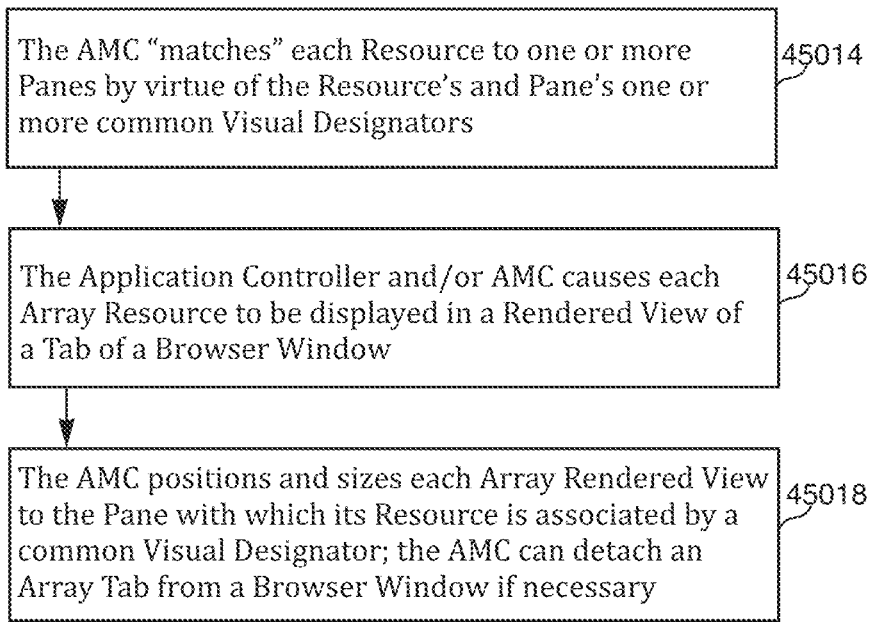
Figure 46C:
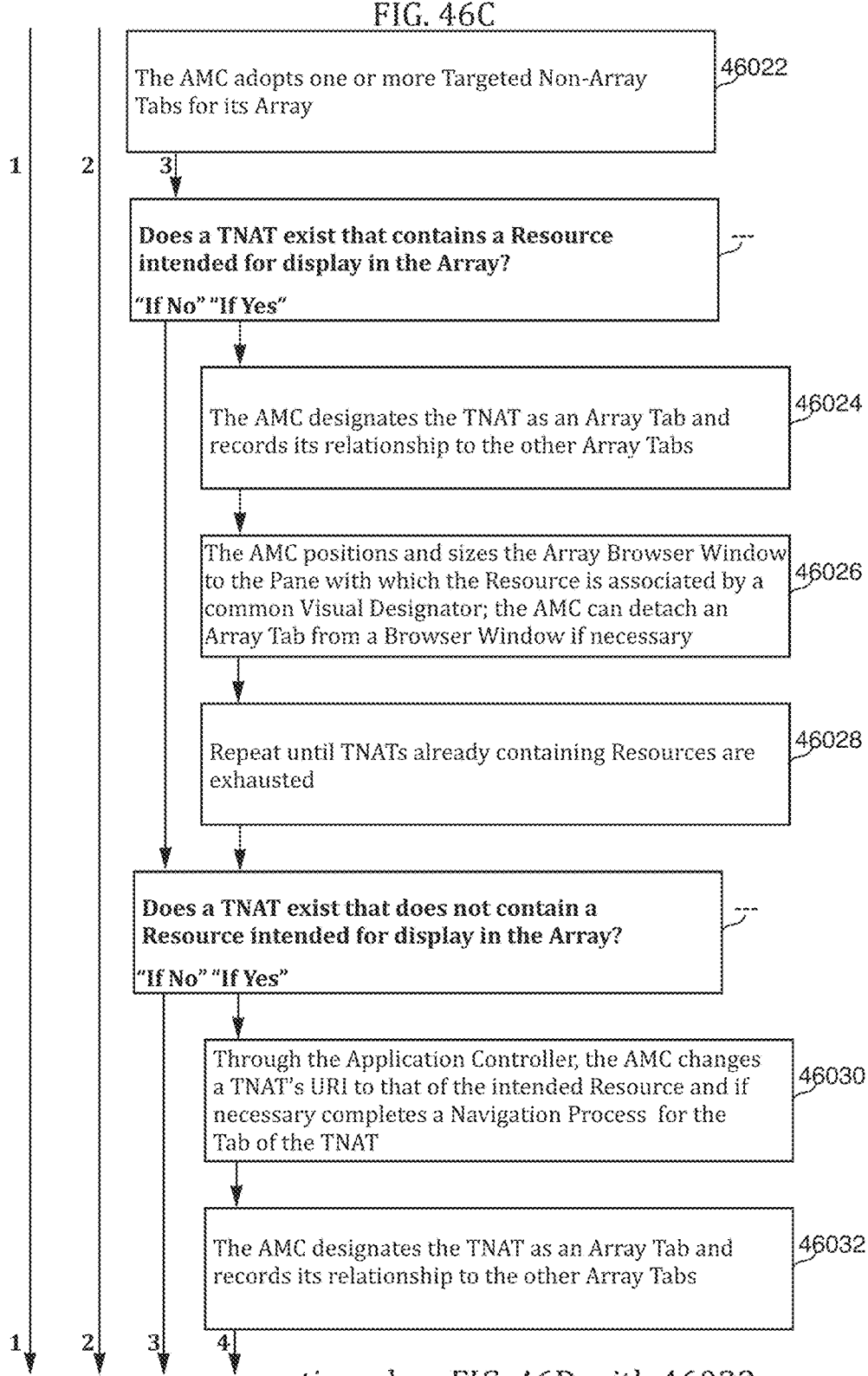
Figure 46E:
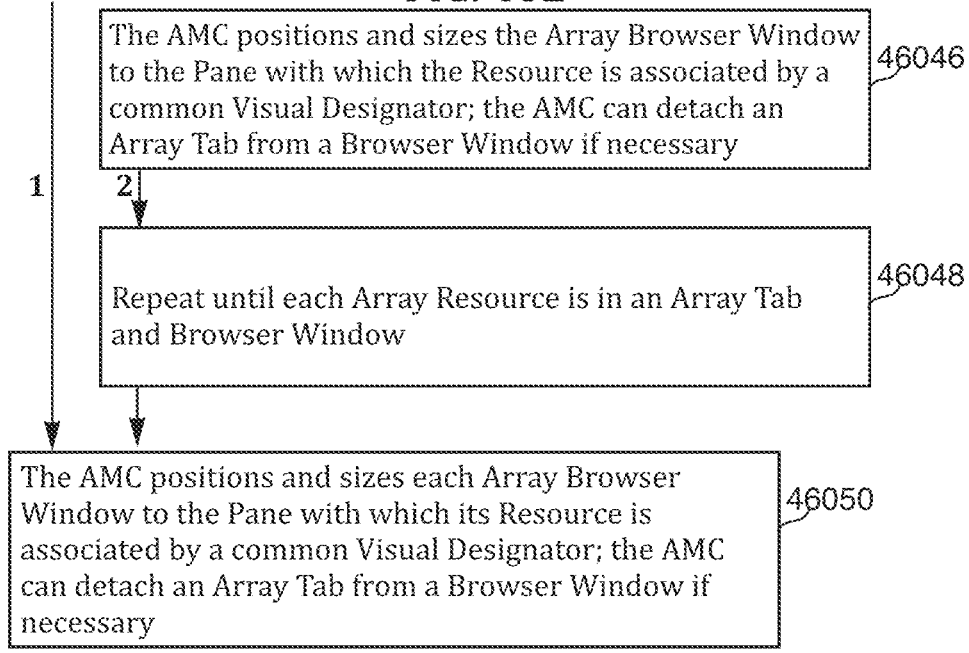
Figure 47A:
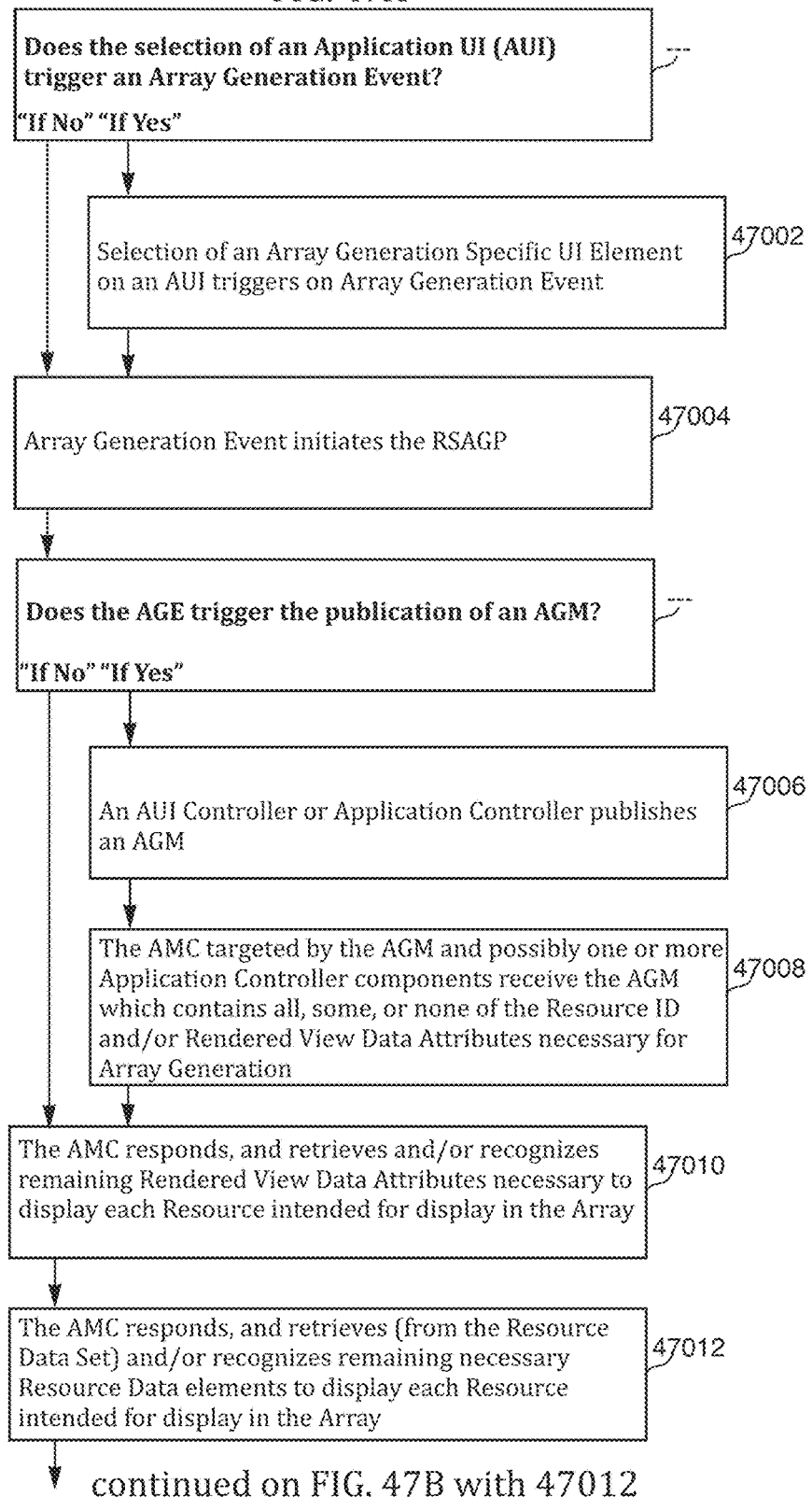
Figure 47E:
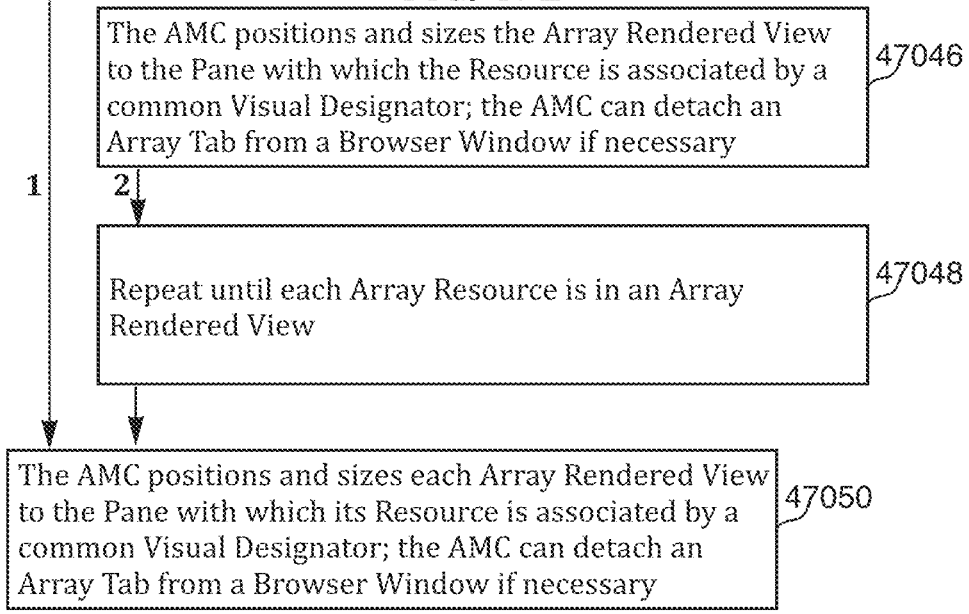

FIGS. 45A and 45B are flowcharts illustrating example operations (45002-45018) of the system 1001 of FIG. 2 executing an Array Generation Process, generation of an Array of one or more Resources, each Resource in the Array being displayed in a Rendered View positioned over a defined area of the Canvas Area of a Browser Window and/or Client Area of the Display Device, referred to herein as a Pane, the Pane and Resource having been associated with one or more common Visual Designators.

In the example of FIGS. 45A and 45B, in a first instance, an Array Generation Event (AGE) initiates the Array Generation Process (45002). In many instances this event is or leads directly to an AUI Controller 1043 or Application Controller 1041 publishing an AGM (45004). If this occurs, the AMC targeted by the AGM and possibly one or more Application Controller 1041 components receive the AGM which contains all, some, or none of the Resource ID and/or Rendered View Data Attributes for Array Generation (45006). Alternatively, other AGEs may occur that do not require the publication of an AGM in order to activate the function of the AMC as described below. The AMC responds to the AGE and retrieves (from the Resource Data Set 1026) and/or recognizes Resource Data elements to display each Resource intended for display in the Array (45008). The AMC retrieves or recognizes one or more Visual Designators for each Resource intended for display in the Array (45010). The AMC retrieves or recognizes Pane Configuration Parameters for each Pane of the Array (45012). The AMC matches each Resource to one or more Panes by virtue of the Resource's and Pane's one or more common Visual Designators (45014). The Application Controller 1041 and/or AMC causes each Array Resource to be displayed in a Rendered View 1017 of Tab 1015 of a Browser Window 1013 (45016). The AMC positions and sizes each Array Rendered Views 1017 to the Pane with which its Resource is associated by a common Visual Designator; the AMC may detach an Array Tab 1015 from a Browser Window 1013 if desirable (45018).

FIGS. 46A, 46B, 46C, 46D, and 46E are flowcharts illustrating detailed example operations (46002-46050) of the system 1000 of FIG. 1 executing an Array Generation Process, generation of an Array of one or more Resources, each Resource in the Array being displayed in a Browser Window positioned over a defined area of the Client Area of the Display Device, referred to herein as a Pane, the Pane and Resource having one or more common Visual Designators. In addition, this process implies, and by explicit references to a Tab Data Set 1074 assumes, the use of a Tab Data Management System (TDMS) that includes one or more of a TDMS' functions as described in FIGS. 12-16. Also as represented in the figures and description herein, an Event Broker may be used for messaging including between the Application Controller 1040 and the AUI Controller 1042 and/or to the Application Controller 1040 upon Tab and Browser Window Events. For the sake of brevity, one may read an alternative implementation of operations (46002-46050) by substituting Background Page 1050 in place of Application Controller 1040 and Content Script 1052 in place of AUI Controller 1042.

In the example of FIGS. 46A, 46B, 46C, 46D, and 46E, in a first instance, selection of an Array Generation Specific UI Element on an AUI may trigger an Array Generation Event (AGE). If this capability exists and such a selection occurs, an AGE is triggered (46002). If not, an AGE may be triggered by a wide variety of other methods. The AGE initiates the Array Generation Process (46004). In many instances this event is or leads directly to an AUI Controller 1042 or Application Controller 1040 publishing an AGM (46006). If this occurs, the AMC targeted by the AGM and possibly one or more Application Controller 1040 components receive the AGM which contains all, some, or none of the Resource ID and/or Tab Data Attributes for Array Generation (46008). Alternatively, other AGEs may occur that do not require the publication of an AGM in order to activate the function of the AMC as described below. The AMC responds, and retrieves and/or recognizes remaining Tab Data Attributes useful to display each Resource intended for display in the Array (this may occur at one or more instances throughout the Array Generation Process) (46010). The AMC responds, and retrieves (from the Resource Data Set 1026) and/or recognizes remaining Resource Data elements to display each Resource intended for display in the Array (this may occur at one or more instances throughout the Array Generation Process) (46012). The AMC retrieves or recognizes one or more Visual Designators for each Resource intended for display in the Array (this may occur at one or more instances throughout the Array Generation Process) (46014). The AMC retrieves or recognizes Pane Configuration Parameters for each Pane of the Array (this may occur at one or more instances throughout the Array Generation Process) (46016). The AMC "matches" each Resource to one or more Panes by virtue of the Resource's and Pane's one or more common Visual Designators (46018). The AMC may determine it will need to create one or more new Browser Windows to display one or more Resources intended for display in the Array. If the AMC does, the AMC may check Tab Data Set 1074 for available Targeted Non-Array Tabs (46020). If one or more TNATs exist for the AMC, the AMC may adopt one or more Targeted Non-Array Tabs for its Array (46022). If a TNAT exists that contains a Resource intended for display in the Array, the AMC may designate the TNAT as an Array Tab and record its relationship to the other Array Tabs (46024). The AMC positions and sizes the Array Browser Window 1012 to the Pane with which the Resource is associated by a common Visual Designator; the AMC can detach an Array Tab 1014 from a Browser Window 1012 if warranted (46026). These steps may be repeated until the Array is full or TNATs already containing Resources are exhausted (46028). If the Array is not full and TNATs already containing Resources have been exhausted then if a TNAT exists that does not contain a Resource intended for display in the Array the AMC, through the Application Controller 1040, may change a TNAT's URI to that of the intended Resource and, if warranted, completes a navigation process for the Tab 1014 of the TNAT (46030). The AMC designates the TNAT as an Array Tab 1014 and records its relationship to the other Array Tabs 1014 (46032). The AMC positions and sizes the Array Browser Window 1012 to the Pane with which the Resource is associated by a common Visual Designator; the AMC may detach an Array Tab 1014 from a Browser Window 1012 if warranted (46034). These steps may be repeated until the Array is full or the TNATs are exhausted (46036). If one or more TNATs do not exist for the AMC, the AMC may determine there are no TNATs available for use in the Array (46038). The AMC initiates the creation of a new Browser Window 1012 and Tab 1014 (46040). Through the Application Controller 1040, the AMC changes the new Browser Window's Tab's URI to that of the intended Resource and if warranted completes a navigation process for that Tab 1014 (46042). The AMC designates the Tab 1014 as an Array Tab and records its relationship to the other Array Tabs (46044). The AMC positions and sizes the Array Browser Window 1012 to the Pane with which the Resource is associated by a common Visual Designator; the AMC may detach an Array Tab 1014 from a Browser Window 1012 if warranted (46046). These steps may be repeated until each Array Resource is in an Array Tab 1014 and Browser Window 1012 (46048). If the AMC determines it will not need to create one or more new Browser Windows to display one or more Resources intended for display in the Array, the AMC positions and sizes each Array Browser Window 1012 to the Pane with which its Resource is associated by a common Visual Designator; the AMC may detach an Array Tab 1014 from a Browser Window 1012 if warranted (46050).

FIGS. 47A, 47B, 47C, 47D, and 47E are flowcharts illustrating detailed example operations (47002-47050) of the system 1001 of FIG. 2 executing an Array Generation Process, generation of an Array of one or more Resources, each Resource in the Array being displayed in a Rendered View positioned over a defined area of the Canvas Area of a Browser Window and/or Client Area of the Display Device, referred to herein as a Pane, the Pane and Resource having been associated with one or more common Visual Designators. In addition, this process implies, and by explicit references to a Rendered View Data Set 1075 assumes, the use of a Rendered View Data Management System (RVDMS) that includes one or more of a RVDMS' functions as described in FIGS. 17-21. Also as represented in the figures and description herein, an Event Broker may be used for messaging including between the Application Controller 1041 and the AUI Controller 1043 and/or to the Application Controller 1041 upon Rendered View, Tab, and Browser Window Events. For the sake of brevity, one may read an alternative implementation of operations (47002-47050) by substituting Background Page 1051 in place of Application Controller 1041 and Content Script 1053 in place of AUI Controller 1043.

In the example of FIGS. 47A, 47B, 47C, 47D, and 47E, in a first instance, selection of an Array Generation Specific UI Element on an AUI may trigger an Array Generation Event (AGE). If this capability exists and such a selection occurs, an AGE is triggered (47002). If not an AGE may be triggered by a wide variety of other methods. The AGE initiates the Array Generation Process (47004). In many instances this event is or leads directly to an AUI Controller 1043 or Application Controller 1041 publishing an AGM (47006). If this occurs, the AMC targeted by the AGM and possibly one or more Application Controller 1041 components receive the AGM which contains all, some, or none of the Resource ID and/or Rendered View Data Attributes for Array Generation (47008). Alternatively, other AGEs may occur that do not require the publication of an AGM in order to activate the function of the AMC as described below. The AMC responds, and retrieves and/or recognizes remaining Rendered View Data Attributes useful to display each Resource intended for display in the Array (this may occur at one or more instances throughout the Array Generation Process) (47010). The AMC responds, and retrieves (from the Resource Data Set 1026) and/or recognizes remaining Resource Data elements to display each Resource intended for display in the Array (this may occur at one or more instances throughout the Array Generation Process) (47012). The AMC retrieves or recognizes one or more Visual Designators for each Resource intended for display in the Array (this may occur at one or more instances throughout the Array Generation Process) (47014). The AMC retrieves or recognizes Pane Configuration Parameters for each Pane of the Array (this may occur at one or more instances throughout the Array Generation Process) (47016). The AMC "matches" each Resource to one or more Panes by virtue of the Resource's and Pane's one or more common Visual Designators (47018). The AMC may determine it will need to create one or more new Rendered Views to display one or more Resources intended for display in the Array. If the AMC does, the AMC checks Rendered View Data 1075 for available Targeted Non-Array Rendered Views (47020). If one or more TNARVs exist for the AMC, the AMC may adopt one or more Targeted Non-Array Rendered Views for its Array (47022). If a TNARV exists that contains a Resource intended for display in the Array, the AMC may designate the TNARV as an Array Rendered View and record its relationship to the other Array Rendered Views (47024). The AMC positions and sizes the Array Rendered View 1017 to the Pane with which the Resource is associated by a common Visual Designator; the AMC may detach an Array Tab 1015 from a Browser Window 1013 if warranted (47026). These steps may be repeated until the Array is full or until TNARVs already containing Resources are exhausted (47028). If the Array is not full and TNATs already containing Resources have been exhausted then if a TNARV exists that does not contain a Resource intended for display in the Array the AMC, through the Application Controller 1041, may change a TNARV's URI to that of the intended Resource and, if warranted, may complete a navigation process for the Rendered View of the TNARV (47030). The AMC designates the TNARV as an Array Rendered View 1017 and records its relationship to the other Array Rendered Views (47032). The AMC positions and sizes the Array Rendered View 1017 to the Pane with which the Resource is associated by a common Visual Designator; the AMC may detach an Array Tab 1015 from a Browser Window 1013 if warranted (47034). These steps may be repeated until the Array is full or TNARVs are exhausted (47036). If one or more TNARVs do not exist for the AMC, the AMC may determine there are no TNARVs available for use in the Array (47038). The AMC initiates the creation of a new Browser Window, Tab, and/or Rendered View (47040). Through the Application Controller 1041, the AMC changes the new Browser Window's Tab's Rendered View's URI to that of the intended Resource and if warranted completes a navigation process for that Rendered View 1017 (47042). The AMC designates the Rendered View as an Array Rendered View and records its relationship to the other Array Rendered Views (47044). The AMC positions and sizes the Array Rendered View 1017 to the Pane with which the Resource is associated by a common Visual Designator; the AMC may detach an Array Tab 1015 from a Browser Window 1013 if warranted (47046). These steps may be repeated until each Array Resource is in an Array Rendered View 1017 and Browser Window 1013 (47048). If the AMC determines it will not need to create one or more new Rendered Views to display one or more Resources intended for display in the Array, the AMC positions and sizes each Array Rendered View 1017 to the Pane with which its Resource is associated by a common Visual Designator; the AMC can detach an Array Tab 1015 from a Browser Window 1013 if warranted (47050).

Figure 48:
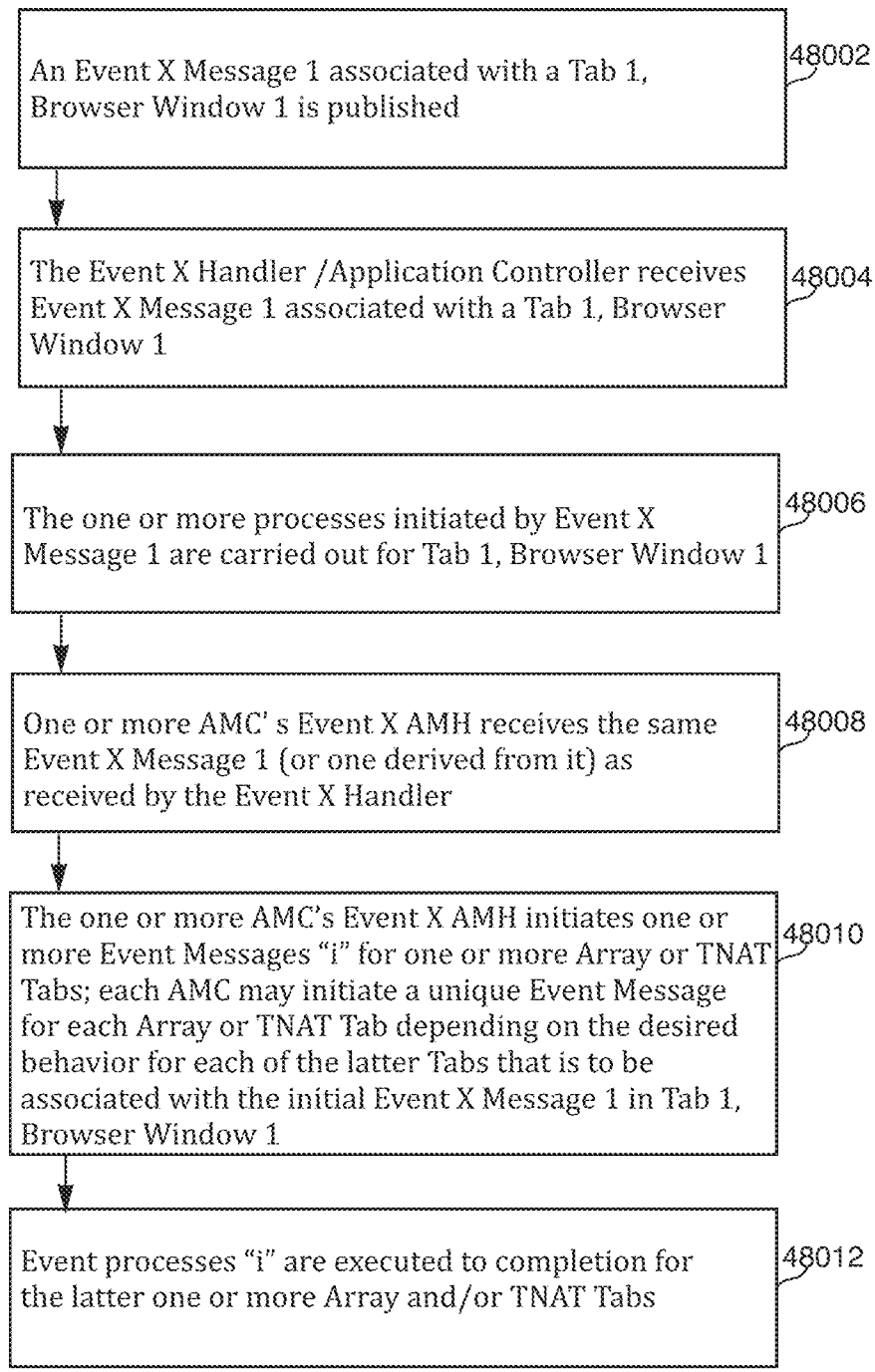
FIG. 48 is a flowchart illustrating an embodiment of a process for creating and managing responsive actions between digital resources.

FIG. 48 is a flowchart illustrating example operations (48002-48012) of the system 1000 of FIG. 1 executing an Array Responsive Action Process, enablement of an event affecting the display of an Array Resource and/or its Tab and/or its Browser Window to affect the display of another Array Resource and/or its Tab and/or its Browser Window.

In the example of FIG. 48, in a first instance, an Event X Message 1 associated with a Tab 1, Browser Window 1 is published (for this example, the "1" in Event X Message 1 represents that Event X Message 1 is the first instance of any number of possible Event X Messages in the description. The "1" in both Tab 1 and Browser Window 1 represents any open Tab 1014 and Browser Window 1012 of a Browser Application 1032) (48002). The Event X Handler 1100/Application Controller 1040 receives Event X Message 1 associated with a Tab 1, Browser Window 1 (48004). The one or more processes initiated by Event X Message 1 are carried out for Tab 1, Browser Window 1 (48006). One or more AMCs' Event X AMH 1106 receives the same Event X Message 1 (or one derived from it) as received by the Event X Handler (48008). The one or more AMCs' Event X AMH 1106 initiates one or more Event Messages "i" for one or more Array or TNAT Tabs 1014; each AMC may initiate a unique Event Message for each Array or TNAT Tab 1014 depending on the desired behavior for each of the latter Tabs that is to be associated with the initial Event X Message 1 in Tab 1, Browser Window 1 (because one or more of the Event Messages generated by the Event X AMH may be one or more other instances of an Event X Message, the range of all possible Event Messages generated by the Event X AMH is represented as Event Messages "i"; therefore Event Messages "i" represents any number of Event X Messages and/or other kinds of Event Messages; by extension of the same logic, Event processes "i" has been used instead of Event X processes "i" to represent the range of processes that may be executed to completion upon generation of the corresponding Event Message for each) (48010). Event processes "i" are executed to completion for the latter one or more Array and/or TNAT Tabs 1014 (48012). As noted, the RSPP may include processes similar to the Array Responsive Action Process in which a Visual Designator may be the PCPs of a Pane itself. In such a case, a component, similar in function to an AMC, may manage the responsive actions between associated tabs and/or the Resources displayed in them.

The processes described herein are generally described in a sequential manner. However, it may be appreciated that the steps may execute in a partially or completely overlapping (e.g., parallel) manner. Further, the steps may occur in an order different than that shown, may include additional or different operations not specifically illustrated, and/or may omit illustrated steps. Further, it should be noted and as implied earlier in the description, several steps in these figures may be accomplished by a number of ways by varying the location of the data elements and degree of programmatic function of one or more steps.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a non-transitory computer-readable storage medium containing computer-executable instructions which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

The invention claimed is:

1. A method for generating a visual array of digital resources, the visual array specifying a layout of the digital resources on a display, wherein each of the digital resources comprises digital content displayable on the display, the method executing on a client device in a networked computer environment, the method comprising:
   storing, by a memory of the client device, a data structure including:
      first pane configuration parameters defining a first viewing area of the display associated with a first visual designator;
      second pane configuration parameters defining a second viewing area of the display associated with a second visual designator;
      a first ordered set of identifiers for first digital resources each tagged with the first visual designator, the first ordered set of identifiers including at least a first identifier for a first web page;
      a second ordered set of identifiers for second digital resources each tagged with the second visual designator, the second ordered set of identifiers including at least a second identifier for a second web page;
      a resource mapping data structure mapping the first identifier for the first web page to the second ordered set of identifiers for the second digital resources to indicate that the second digital resources are each contextually related to the first web page;

detecting navigation of a web browser to the first web page having the first identifier;
responsive to detecting the navigation of the web browser to the first web page:
  detecting, based on the data structure, that the first identifier for the first web page is tagged with the first visual designator;
  responsive to detecting that the first identifier for the first web is tagged with the first visual designator, rendering the first web page to fit in the first viewing area of the display defined by the first pane configuration parameters associated with the first viewing area;
  automatically identifying, based on the resource mapping data structure, the second ordered set of identifiers for the second digital resources that are contextually related to the first web page;
  providing the second identifier of the second web page to the web browser to cause the web browser to load the second web page;
  detecting, based on the data structure, that the second identifier for the second web page is tagged with the second visual designator;
  responsive to detecting that the second identifier for the second web page is tagged with the second visual designator, rendering the second web page to fit in the second viewing area of the display defined by the second pane configuration parameters associated with the second viewing area;
  rendering a user interface element that includes a first navigation element to enable navigation between the first digital resources in the first viewing area of the display according to ordering of the first ordered set of identifiers, and a second navigation element to enable navigation between the second digital resources in the second viewing area of the display according to ordering of the second ordered set of identifiers.

2. The method of claim 1, wherein the first web page is hosted at first origin domain and wherein the second web page is hosted at a second origin domain unique from the first origin domain.

3. The method of claim 1, further comprising:
receiving, by the client device, an instruction to share the visual array;
sending, by the client device, the data structure to a remote server for accessing by another client device in the networked computer environment.

4. The method of claim 1, wherein causing the web browser to load the second web page comprises:
instantiating a new web browser window; and
loading the second web page in the new web browser window.

5. The method of claim 1, wherein causing the web browser to load the second web page comprises:
instantiating a new web browser tab; and
loading the second web page in the new web browser tab.

6. The method of claim 1, wherein causing the web browser to load the second web page comprises:
instantiating a new web browser pane within a same browser window as the first web page; and
loading the second web page in the new web browser pane.

7. The method of claim 1, wherein causing the web browser to load the second web page comprises:
loading the second web page in an existing web browser window, tab, or pane.

8. A non-transitory computer-readable storage medium storing instruction for generating a visual array of digital resources, the visual array specifying a layout of the digital resources on a display, wherein each of the digital resources comprises digital content displayable on the display, the instructions when executed by a processor causing the processor to perform steps including:
storing a data structure including:
  first pane configuration parameters defining a first viewing area of the display associated with a first visual designator;
  second pane configuration parameters defining a second viewing area of the display associated with a second visual designator;
  a first ordered set of identifiers for first digital resources each tagged with the first visual designator, the first ordered set of identifiers including at least a first identifier for a first web page;
  a second ordered set of identifiers for second digital resources each tagged with the second visual designator, the second ordered set of identifiers including at least a second identifier for a second web page;
  a resource mapping data structure mapping the first identifier for the first web page to the second ordered set of identifiers for the second digital resources to indicate that the second digital resources are each contextually related to the first web page;
a resource mapping data structure mapping the first identifier for the first web page to the second ordered set of identifiers for the second digital resources to indicate that the second digital resources are each contextually related to the first web page;
detecting navigation of a web browser to the first web page having the first identifier;
responsive to detecting the navigation of the web browser to the first web page:
  detecting, based on the data structure, that the first identifier for the first web page is tagged with the first visual designator;
  responsive to detecting that the first identifier for the first web in the data structure is tagged with the first visual designator, rendering the first web in the data structure to fit in the first viewing area of the display defined by the first pane configuration parameters associated with the first viewing area;
  automatically identifying, based on the resource mapping data structure, the second ordered set of identifiers for the second digital resources that are contextually related to the first web page;
  providing the second identifier of the second web page to the web browser to cause the web browser to load the second web page;
  detecting, based on the data structure, that the second identifier for the second web page is tagged with the second visual designator;
  responsive to detecting that the second identifier for the second web page is tagged with the second visual designator, rendering the second web page to fit in the second viewing area of the display defined by the second pane configuration parameters associated with the second viewing area;
  rendering a user interface element that includes a first navigation element to enable navigation between the first digital resources in the first viewing area of the display according to ordering of the first ordered set of identifiers, and a second navigation element to enable navigation between the second digital resources in the second viewing area of the display according to ordering of the second ordered set of identifiers.

9. The non-transitory computer-readable storage medium of claim 8, further comprising:
receiving, by the client device, an instruction to share the visual array;
sending, by the client device, the data structure to a remote server for accessing by another client device in the networked computer environment.

10. The non-transitory computer readable storage medium of claim 8, wherein causing the web browser to load the second web page comprises:
instantiating a new web browser window; and
loading the second web page in the new web browser window.

11. The non-transitory computer readable storage medium of claim 8, wherein causing the web browser to load the second web page comprises:
instantiating a new web browser tab; and
loading the second web page in the new web browser tab.

12. The non-transitory computer readable storage medium of claim 8, wherein causing the web browser to load the second web page comprises:
instantiating a new web browser pane within a same browser window as the first web page; and
loading the second web page in the new web browser pane.

13. The non-transitory computer readable storage medium of claim 8, wherein causing the web browser to load the second web page comprises:
loading the second web page in an existing web browser window, tab, or pane.

14. The non-transitory computer readable storage medium of claim 8, wherein the first web page is hosted by at first origin domain and wherein the second web page is hosted at a second origin domain unique from the first origin domain.

15. A computer system comprising:
a processor; and
a non-transitory computer-readable storage medium storing instruction for generating a visual array of digital resources, the visual array specifying a layout of the digital resources on a display, wherein each of the digital resources comprises digital content displayable on the display, the instructions when executed by the processor causing the processor to perform steps including:
storing a data structure including:
first pane configuration parameters defining a first viewing area of the display associated with a first visual designator;
second pane configuration parameters defining a second viewing area of the display associated with a second visual designator;
a first ordered set of identifiers for first digital resources each tagged with the first visual designator, the first ordered set of identifiers including at least a first identifier for a first web page;
a second ordered set of identifiers for second digital resources each tagged with the second visual designator, the second ordered set of identifiers including at least a second identifier for a second web page;
a resource mapping data structure mapping the first identifier for the first web page to the second ordered set of identifiers for the second digital resources to indicate that the second digital resources are each contextually related to the first web page;
a resource mapping data structure mapping the first identifier for the first web page to the second ordered set of identifiers for the second digital resources to indicate that the second digital resources are each contextually related to the first web page;
detecting navigation of a web browser to the first web page having the first identifier;
responsive to detecting the navigation of the web browser to the first web page:
detecting, based on the data structure, that the first identifier for the first web page is tagged with the first visual designator;
responsive to detecting that the first identifier for the first web in the data structure is tagged with the first visual designator, rendering the first web in the data structure to fit in the first viewing area of the display defined by the first pane configuration parameters associated with the first viewing area;
automatically identifying, based on the resource mapping data structure, the second ordered set of identifiers for the second digital resources that are contextually related to the first web page;
providing the second identifier of the second web page to the web browser to cause the web browser to load the second web page;
detecting, based on the data structure, that the second identifier for the second web page is tagged with the second visual designator;
responsive to detecting that the second identifier for the second web page is tagged with the second visual designator, rendering the second web page to fit in the second viewing area of the display defined by the second pane configuration parameters associated with the second viewing area;
rendering a user interface element that includes a first navigation element to enable navigation between the first digital resources in the first viewing area of the display according to ordering of the first ordered set of identifiers, and a second navigation element to enable navigation between the second digital resources in the second viewing area of the display according to ordering of the second ordered set of identifiers.

16. The computer system of claim 15, wherein causing the web browser to load the second web page comprises:
instantiating a new web browser window; and
loading the second web page in the new web browser window.

17. The computer system of claim 15, wherein causing the web browser to load the second web page comprises:
instantiating a new web browser tab; and
loading the second web page in the new web browser tab.

18. The computer system of claim 15, wherein causing the web browser to load the second web page comprises:
instantiating a new web browser pane within a same browser window as the first web page; and
loading the second web page in the new web browser pane.

19. The computer system of claim 15, wherein causing the web browser to load the second web page comprises:
loading the second web page in an existing web browser window, tab, or pane.

20. The computer system of claim 15, further comprising:
receiving, by the client device, an instruction to share the visual array;
sending, by the client device, the data structure to a remote server for accessing by another client device in the networked computer environment.

* * * * *

UNITED STATES PATENT AND TRADEMARK OFFICE
CERTIFICATE OF CORRECTION

PATENT NO. : 10,200,298 B2
APPLICATION NO. : 15/334241
DATED : February 5, 2019
INVENTOR(S) : Jean-Paul Sylvain Boodhoo and Will McGarrett Harper It is certified that error appears in the above-identified patent and that said Letters Patent is hereby corrected as shown below:

In the Claims

Claim 1, Column 65, Line 9, delete "first web" and insert --first web page--.
Claim 8, Column 66, Line 41, delete "first web" and insert --first web page--.
Claim 8, Column 66, Line 42, delete "first web" and insert --first web page--.
Claim 15, Column 68, Line 17, delete "first web" and insert --first web page--.
Claim 15, Column 68, Line 18, delete "first web" and insert --first web page--.

Signed and Sealed this
Twenty-fifth Day of June, 2019

Andrei Iancu
*Director of the United States Patent and Trademark Office*